United States Patent
Ji et al.

(10) Patent No.: US 12,381,681 B2
(45) Date of Patent: Aug. 5, 2025

(54) METHOD AND APPARATUS FOR TRANSMITTING OR RECEIVING REFERENCE SIGNAL IN WIRELESS COMMUNICATION SYSTEM

(71) Applicant: Samsung Electronics Co., Ltd., Suwon-si (KR)

(72) Inventors: Hyoungju Ji, Suwon-si (KR); Hoondong Noh, Suwon-si (KR); Jinhyun Park, Suwon-si (KR); Youngrok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 343 days.

(21) Appl. No.: 17/758,505

(22) PCT Filed: Jan. 8, 2021

(86) PCT No.: PCT/KR2021/000261
§ 371 (c)(1),
(2) Date: Jul. 7, 2022

(87) PCT Pub. No.: WO2021/141444
PCT Pub. Date: Jul. 15, 2021

(65) Prior Publication Data
US 2023/0080106 A1 Mar. 16, 2023

(30) Foreign Application Priority Data
Jan. 10, 2020 (KR) .................. 10-2020-0003684

(51) Int. Cl.
*H04W 4/00* (2018.01)
*H04L 5/00* (2006.01)
*H04W 72/23* (2023.01)

(52) U.S. Cl.
CPC .......... *H04L 5/0051* (2013.01); *H04L 5/0094* (2013.01); *H04W 72/23* (2023.01)

(58) Field of Classification Search
CPC ... H04L 5/0051; H04L 5/0094; H04L 1/0013; H04L 1/0025; H04L 5/0005;
(Continued)

(56) References Cited

U.S. PATENT DOCUMENTS 10,819,408 B2 * 10/2020 Park ................ H04B 7/065
2013/0215811 A1 * 8/2013 Takaoka ............. H04W 52/30
370/311
(Continued)

FOREIGN PATENT DOCUMENTS

KR  10-2019-0133042 A  11/2019
WO  2019245236 A1  12/2019

OTHER PUBLICATIONS

Samsung, "On Rate Matching", 3GPP TSG RAN WG1 Meeting 90bis, Oct. 9-13, 2017, R1-1717677, 9 pages.
(Continued)

*Primary Examiner* — Phuongchau Ba Nguyen

(57) ABSTRACT

The present disclosure relates to a method by a base station and a terminal in a wireless communication system. A method by a terminal according to an embodiment may comprise the steps of: receiving, from a base station, bandwidth part configuration information and higher-layer signaling including uplink rate matching configuration information or uplink puncturing configuration information; receiving, from the base station, downlink control information for scheduling transmission of uplink data; identifying a resource for transmission of the uplink data on the basis of the uplink rate matching configuration information or uplink
(Continued)

puncturing configuration information, and transmitting the uplink data to the base station through the identified resource.

15 Claims, 27 Drawing Sheets

(58) Field of Classification Search
CPC ... H04L 5/0007; H04L 5/0092; H04L 5/0048; H04W 72/23; H04W 72/20; H04W 72/0446; H04W 88/08; H04W 72/0453; H04W 24/00; Y02D 30/70
See application file for complete search history.

(56) References Cited

U.S. PATENT DOCUMENTS

| | | | | |
|---|---|---|---|---|
| 2018/0287739 A1* | 10/2018 | Kim | ................. | H04J 11/0023 |
| 2019/0045490 A1* | 2/2019 | Davydov | .............. | H04L 5/0053 |
| 2019/0342944 A1 | 11/2019 | Chatterjee et al. | | |
| 2019/0349998 A1* | 11/2019 | Bhattad | ................. | H04L 1/0013 |
| 2019/0393989 A1* | 12/2019 | Jung | ..................... | H04W 24/02 |
| 2020/0067676 A1* | 2/2020 | Yi | ......................... | H04W 72/23 |
| 2021/0144582 A1* | 5/2021 | Yi | ......................... | H04W 72/23 |
| 2021/0336820 A1* | 10/2021 | Lim | ...................... | H04W 72/23 |
| 2024/0090035 A1* | 3/2024 | Moon | ................... | H04L 5/0053 |

OTHER PUBLICATIONS

Supplementary European Search Report dated Dec. 19, 2022 in connection with European Patent Application No. 21 73 8953, 10 pages.
International Search Report and Written Opinion of the International Searching Authority dated Apr. 16, 2021, in connection with International Application No. PCT/KR2021/000261, 11 pages.
3GPP TS 38.214 V15.7.0 (Sep. 2019), Technical Specification, 3rd Generation Partnership Project; Technical Specification Group Radio Access Network; NR; Physical layer procedures for data (Release 15), Sep. 2019, 106 pages.
3GPP TS 38.331 V15.8.0 (Dec. 2019), Technical Specification, 3rd Generation Partnership Project; Technical Specification Group Radio Access Network; NR; Radio Resource Control (RRC) protocol specification (Release 15), Dec. 2019, 532 pages.
LG Electronics, "Summary on wide-band operation for NR-U," R1-1912394, 3GPP TSG RAN WG1 #99, Reno, USA, Nov. 18-22, 2019, 21 pages.
Nokia, et al., "On TRS muting," R1-1913277 (rev. of R1-1913061), 3GPP TSG-RAN WG1 Meeting #99, Reno, Nevada, USA, Nov. 18-22, 2019, 4 pages.
Office Action dated Dec. 1, 2023, in connection with Korean Application No. 10-2020-0003684, 10 pages.

* cited by examiner

METHOD AND APPARATUS FOR TRANSMITTING OR RECEIVING REFERENCE SIGNAL IN WIRELESS COMMUNICATION SYSTEM

CROSS-REFERENCE TO RELATED APPLICATIONS

This application is a 371 National Stage of International Application No. PCT/KR2021/000261, filed Jan. 8, 2021, which claims priority to Korean Patent Application No. 10-2020-0003684, filed Jan. 10, 2020, the disclosures of which are herein incorporated by reference in their entirety.

BACKGROUND

1. Field

The disclosure relates to a method and an apparatus for transmitting or receiving a reference signal in a wireless communication system.

2. Description of Related Art

To meet the increasing demand for wireless data traffic since the deployment of 4G communication systems, efforts have been made to develop an improved 5G or pre-5G communication system. Therefore, the 5G or pre-5G communication system is also called a "beyond 4G network" communication system or a "post LTE system." Implementation of the 5G communication system in ultrahigh frequency (mmWave) bands, e.g., 60 GHz bands, is being considered in order to accomplish higher data rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems. In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like. In addition, in the 5G system, hybrid FSK and QAM modulation (FQAM) and sliding window superposition coding (SWSC), as advanced coding modulation (ACM) systems, and filter bank multi carrier (FBMC), non-orthogonal multiple access(NOMA), and sparse code multiple access (SCMA), as advanced access technologies, have been developed.

On the other hand, the Internet is evolving from a human-centered connection network where humans generate and consume information to an Internet of Things (IoT) network that exchanges and processes information between distributed components such as things. The Internet of everything (IoE), which is a combination of IoT technology and big data processing technology through connection with a cloud server, has also emerged. Technology elements, such as "sensing technology", "wired/wireless communication and network infrastructure", "service interface technology", and "security technology" have been demanded for IoT implementation; therefore, technologies, such as a sensor network, machine-to-machine (M2M) communication, machine type communication (MTC) for a connection between things, are recently being studied. Such an IoT environment may provide intelligent Internet technology (IT) services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by beamforming, MIMO, and array antennas, which correspond to 5G communication technology. Application of a cloud radio access network (cloud RAN) as the above-described big data processing technology may also be considered to be an example of convergence between the 5G technology and the IoT technology.

Further, for various services, a method and an apparatus for operating efficient uplink transmission/reception and downlink transmission/reception have been developed.

SUMMARY

A technical subject to be achieved by the disclosure is to provide a method and an apparatus for transmitting or receiving a reference signal for efficient uplink or downlink transmission/reception operations for various services in a mobile communication system.

According to an embodiment of the disclosure, a method by a base station in a wireless communication system includes: transmitting, to a UE, an upper layer signaling including bandwidth part configuration information and uplink rate matching configuration information or uplink puncturing configuration information; transmitting, to the UE, downlink control information for scheduling transmission of uplink data; and receiving the uplink data from the UE, wherein rate matching or puncturing in accordance with the uplink rate matching configuration information or the uplink puncturing configuration information is applied to a resource on which the uplink data is received, and wherein the uplink rate matching configuration information or the uplink puncturing configuration information includes at least one of information on a downlink reference signal pattern and a bitmap indicating time and frequency resources.

Further, a method by a UE in a wireless communication system includes: receiving, from a base station, an upper layer signaling including bandwidth part configuration information and uplink rate matching configuration information or uplink puncturing configuration information; receiving, from the base station, downlink control information for scheduling transmission of uplink data; identifying a resource on which the uplink data is to be transmitted based on the uplink rate matching configuration information or the uplink puncturing configuration information; and transmitting, to the base station, the uplink data on the identified resource, wherein the uplink rate matching configuration information or the uplink puncturing configuration information includes at least one of information on a downlink reference signal pattern and a bitmap indicating time and frequency resources.

Further, a base station in a wireless communication system includes: a transceiver; and a controller configured to control the transceiver to: transmit, to a UE, an upper layer signaling including bandwidth part configuration information and uplink rate matching configuration information or uplink puncturing configuration information, transmit, to the UE, downlink control information for scheduling transmission of uplink data, and receive the uplink data from the UE, wherein rate matching or puncturing in accordance with the uplink rate matching configuration information or the uplink puncturing configuration information is applied to a resource on which the uplink data is received, and wherein the uplink rate matching configuration information or the uplink puncturing configuration information includes at least one of information on a downlink reference signal pattern and a bitmap indicating time and frequency resources.

Further, a UE in a wireless communication system includes: a transceiver; and a controller configured to control the transceiver to: receive, from a base station, an upper layer signaling including bandwidth part configuration information and uplink rate matching configuration information or uplink puncturing configuration information, receive, from the base station, downlink control information for scheduling transmission of uplink data, identify a resource on which the uplink data is to be transmitted based on the uplink rate matching configuration information or the uplink puncturing configuration information, and transmit, to the base station, the uplink data on the identified resource, wherein the uplink rate matching configuration information or the uplink puncturing configuration information includes at least one of information on a downlink reference signal pattern and a bitmap indicating time and frequency resources.

An embodiment described in the disclosure provides a method and an apparatus for transmitting or receiving a reference signal for efficient uplink or downlink transmission/reception in a mobile communication system.

DETAILED DESCRIPTION

Figure 1:
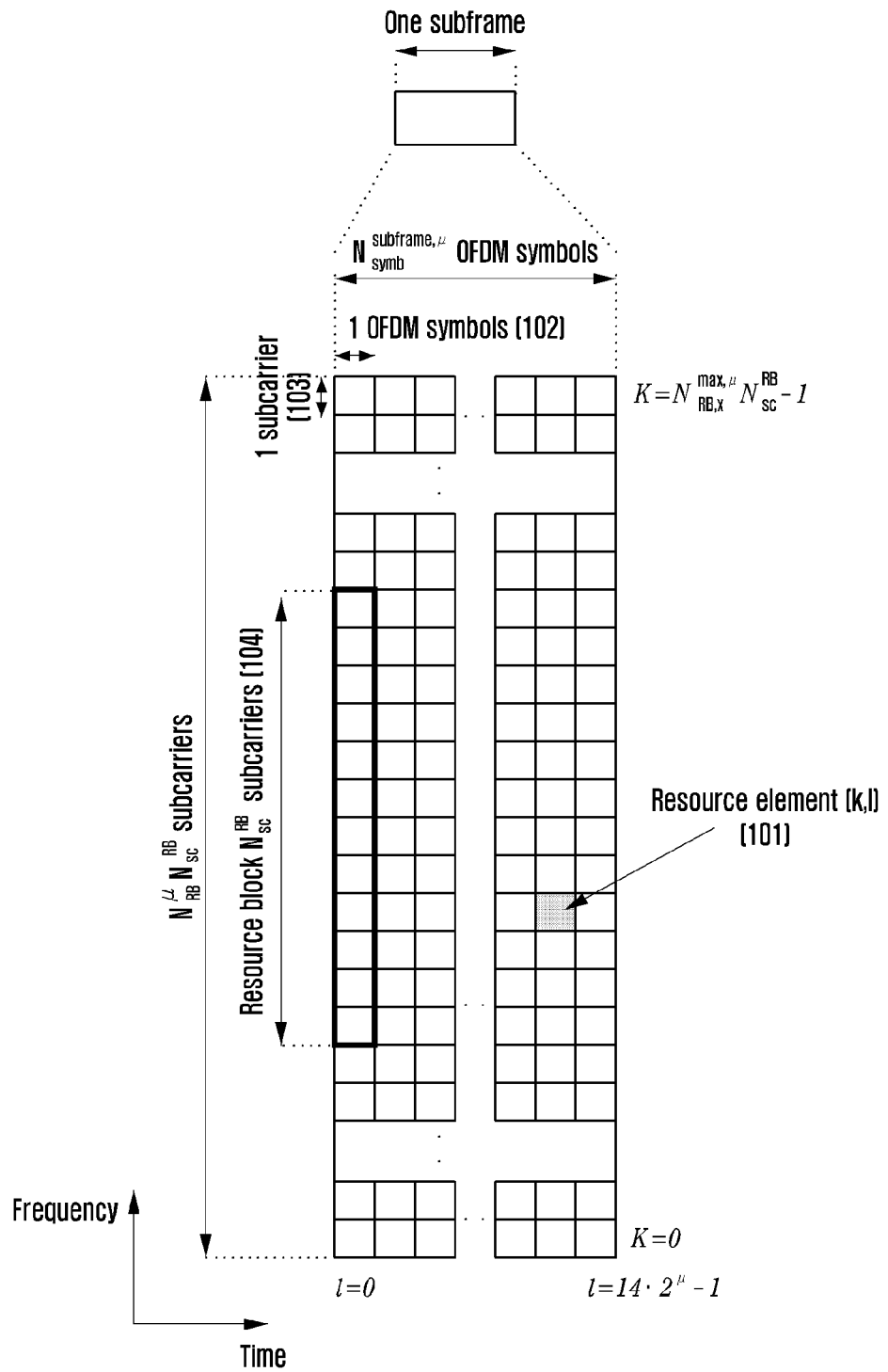
FIG. 1 is a diagram illustrating a basic structure of a time-frequency domain that is a radio resource region of a 5G system according to an embodiment of the disclosure.

FIG. 1 is a diagram illustrating a basic structure of a time-frequency domain that is a wireless resource region of a 5G system according to an embodiment of the disclosure.

Figure 2:
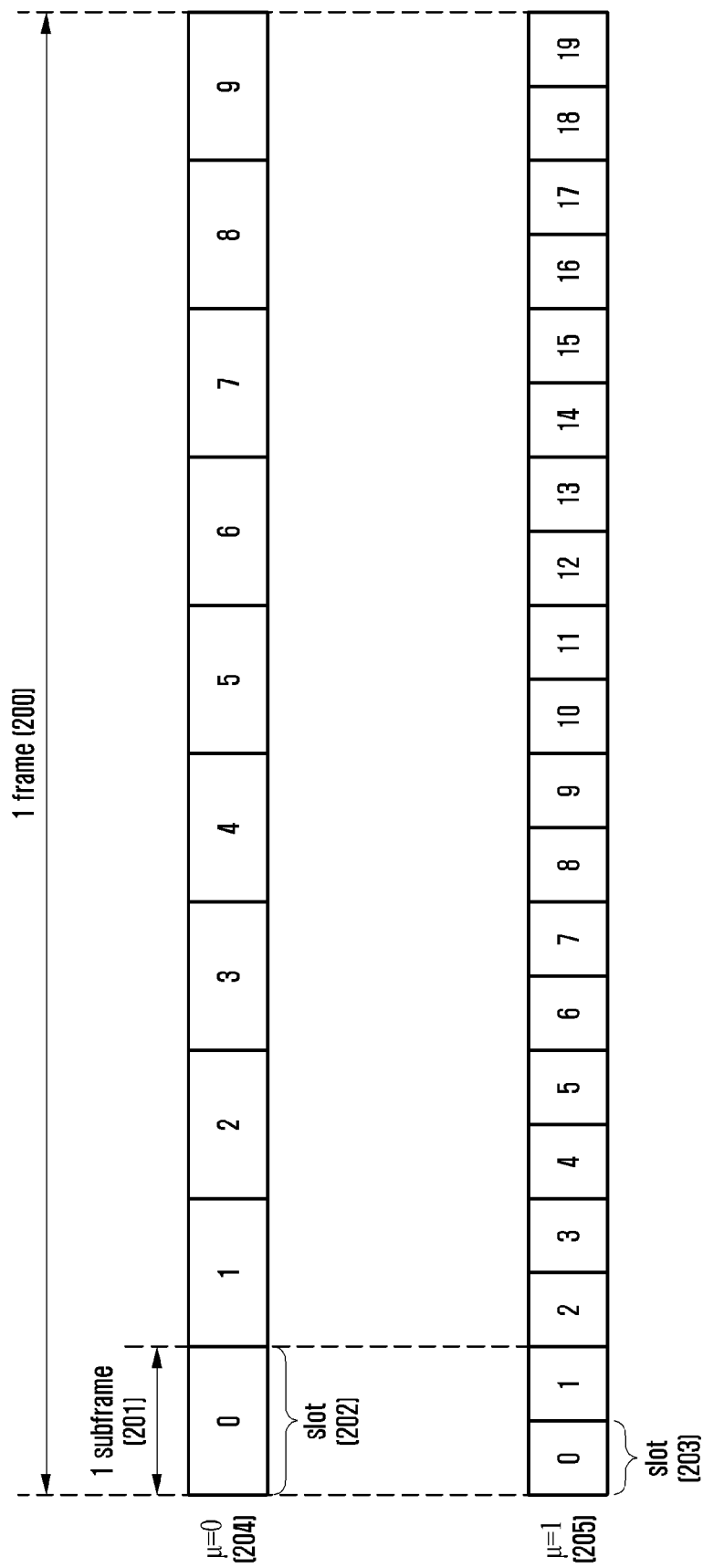
FIG. 2 is a diagram illustrating a slot structure being considered in a 5G system according to an embodiment of the disclosure.

FIG. 2 is a diagram illustrating a slot structure being considered in a 5G system according to an embodiment of the disclosure.

Figure 3:
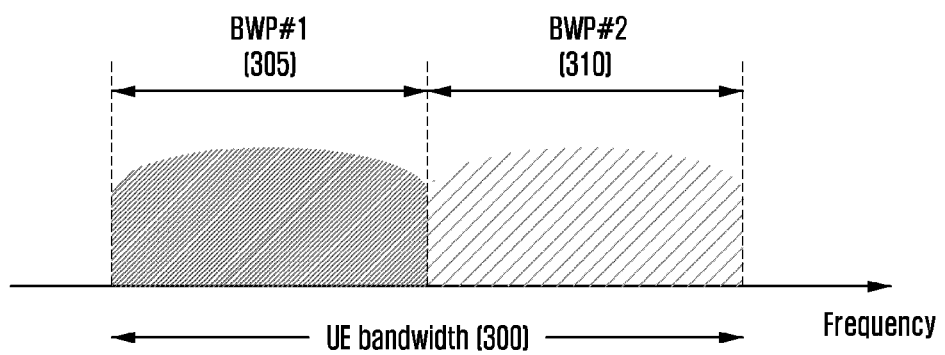
FIG. 3 is a diagram illustrating an example of a configuration for a bandwidth part in a 5G communication system according to an embodiment of the disclosure.

FIG. 3 is a diagram illustrating an example of a configuration for a bandwidth part in a 5G communication system according to an embodiment of the disclosure.

Figure 4:
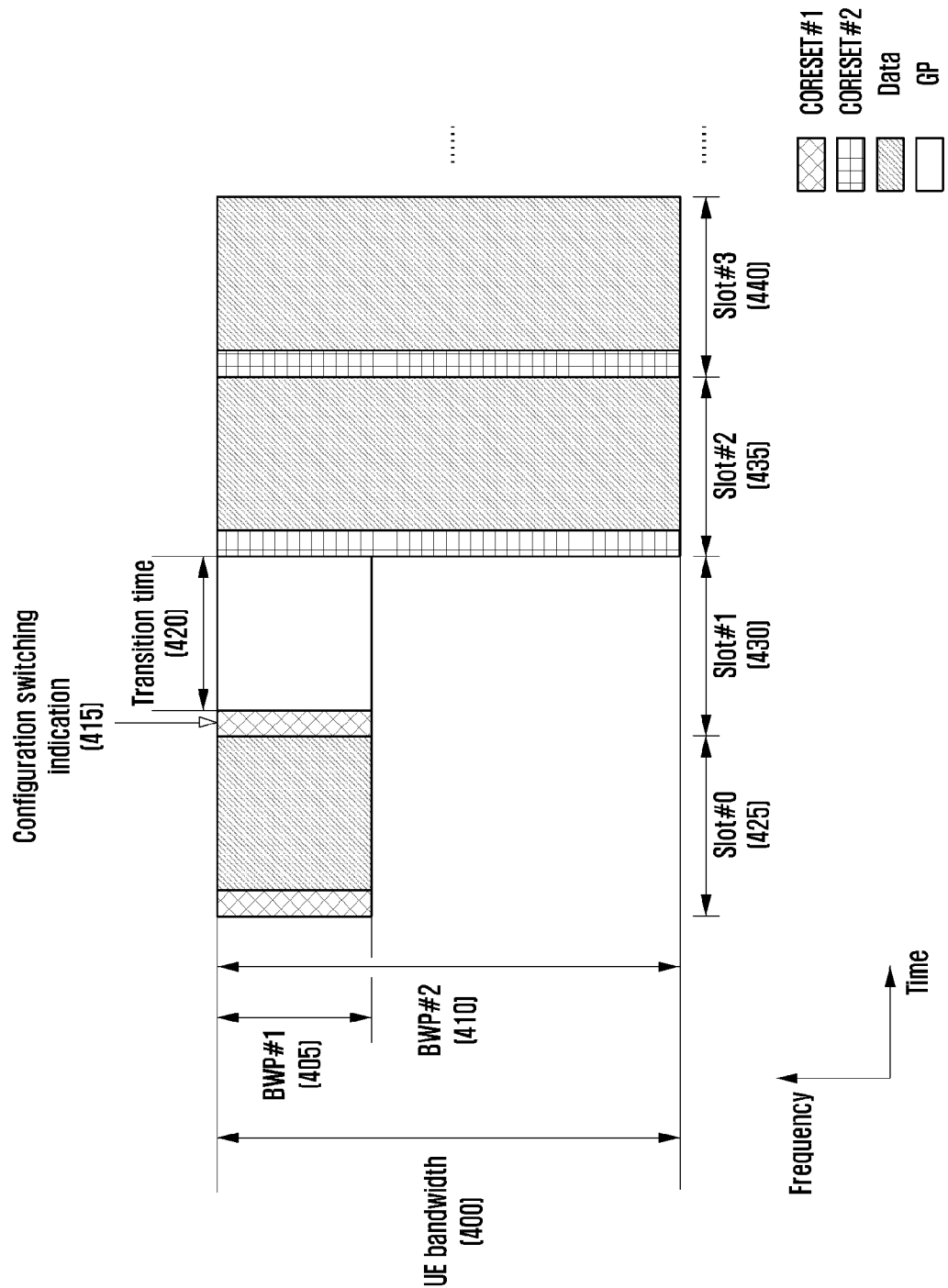
FIG. 4 is a diagram illustrating an example of a bandwidth part changing procedure in a 5G communication system according to an embodiment of the disclosure.

FIG. 4 is a diagram illustrating an example of a bandwidth part changing procedure in a 5G communication system according to an embodiment of the disclosure.

Figure 5:
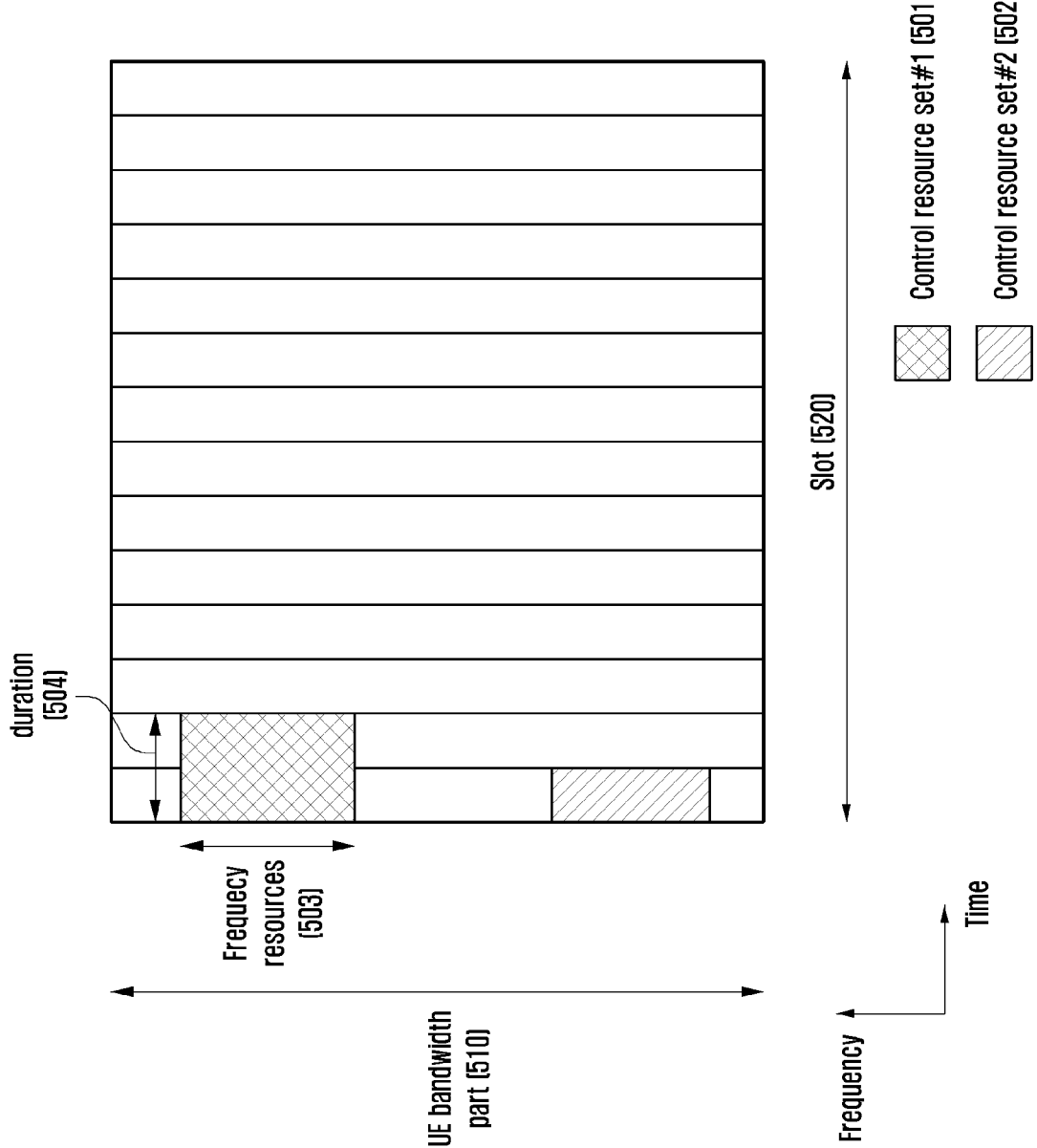
FIG. 5 is a diagram illustrating an example of CORESET on which a downlink control channel is transmitted in a 5G communication system according to an embodiment of the disclosure.

FIG. 5 is a diagram illustrating an example of CORESET on which a downlink control channel is transmitted in a 5G communication system according to an embodiment of the disclosure.

Figure 6:
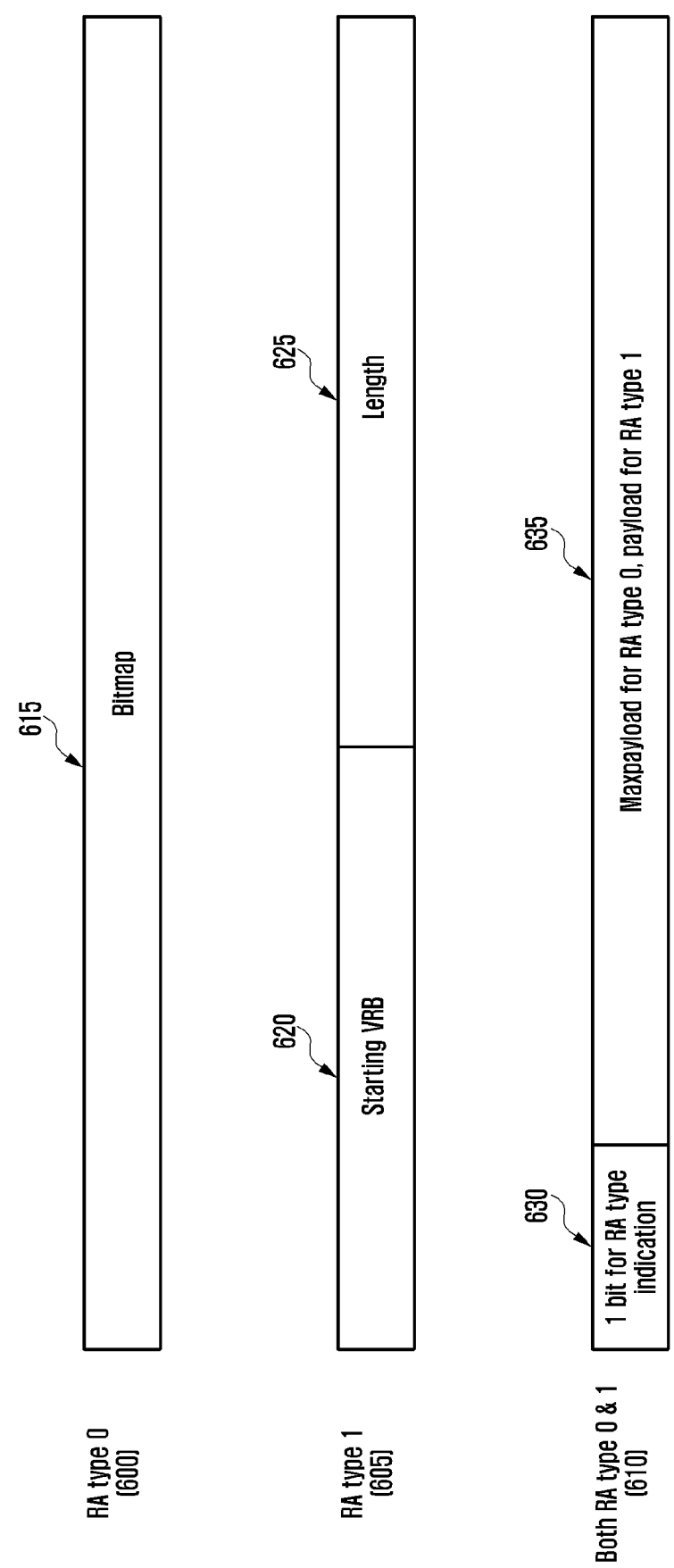
FIG. 6 is a diagram illustrating methods for assigning frequency axis resources in a 5G communication system according to an embodiment of the disclosure.

FIG. 6 is a diagram illustrating methods for assigning frequency axis resources in a 5G communication system according to an embodiment of the disclosure.

Figure 7:
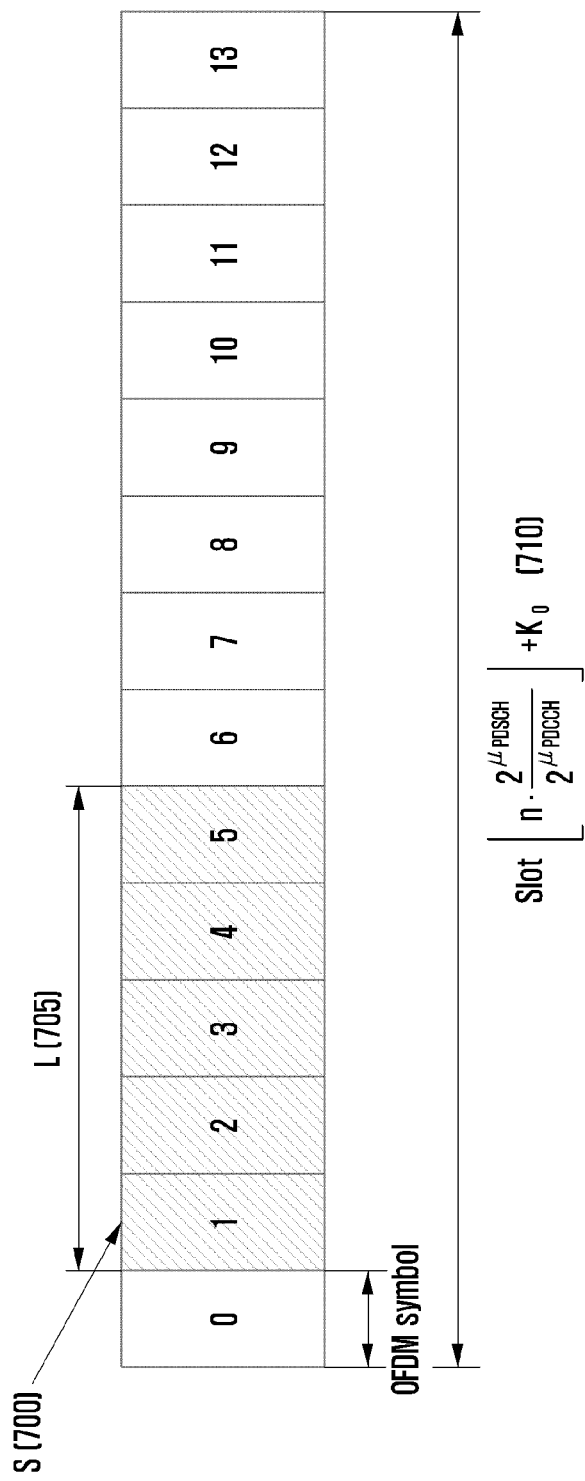
FIG. 7 is a diagram illustrating an example of time axis resource assignment of a 5G communication system according to an embodiment of the disclosure.

FIG. 7 is a diagram illustrating an example of time axis resource assignment of a 5G communication system according to an embodiment of the disclosure.

Figure 8:
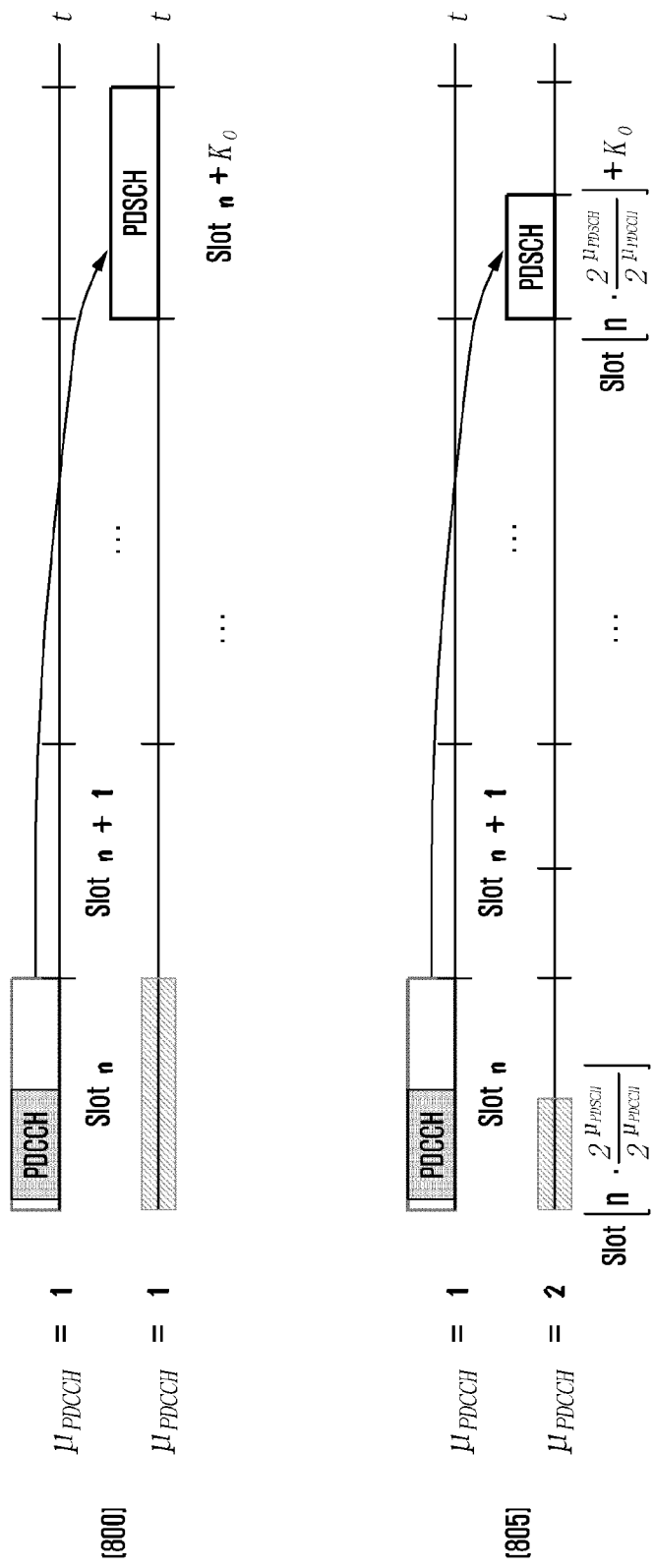
FIG. 8 is a diagram illustrating an example of time axis resource assignment in accordance with subcarrier spacings of a data channel and a control channel in a 5G communication system according to an embodiment of the disclosure.

FIG. 8 is a diagram illustrating an example of time axis resource assignment in accordance with subcarrier spacings of a data channel and a control channel in a 5G communication system according to an embodiment of the disclosure.

Figure 9:
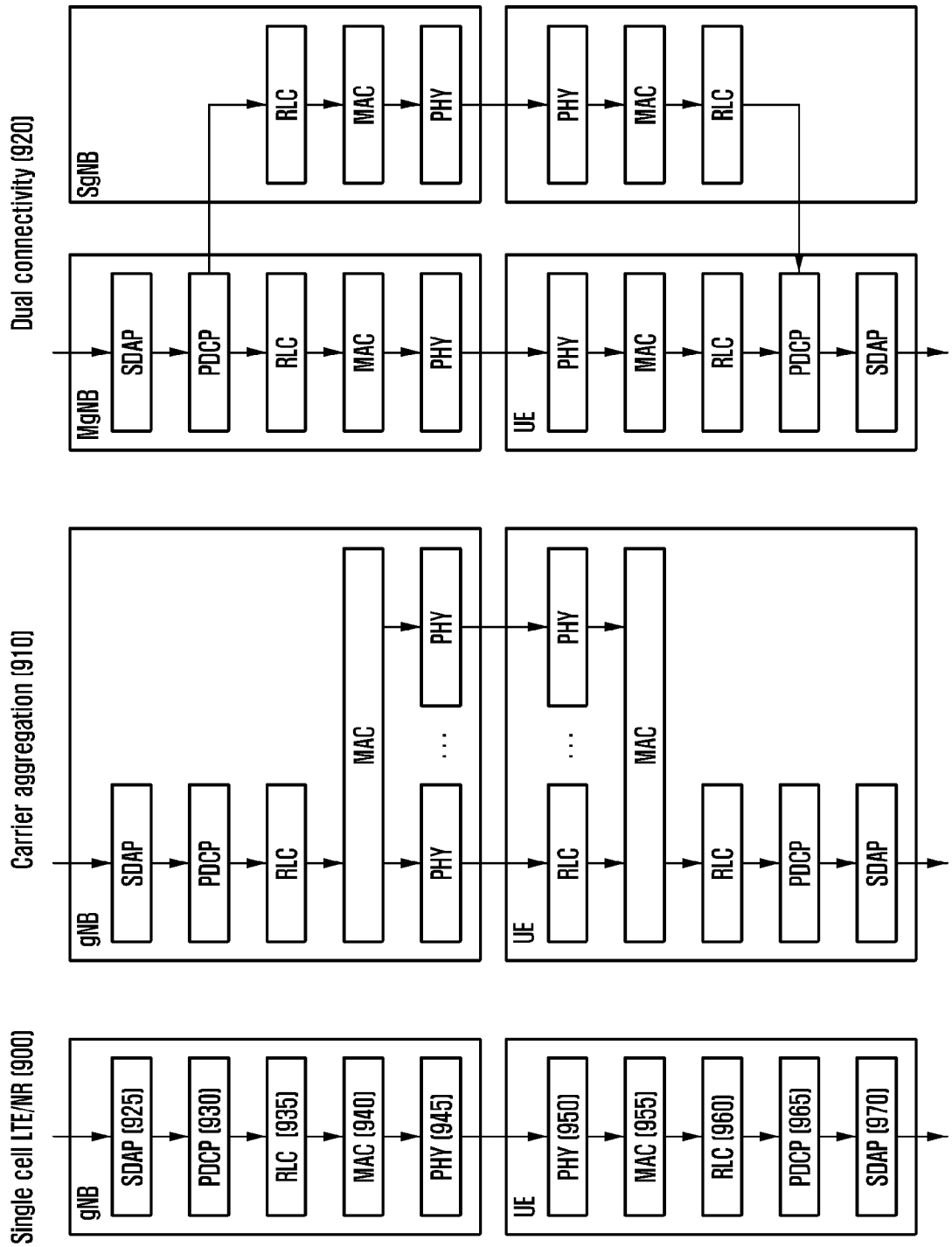
FIG. 9 is a diagram illustrating a wireless protocol structure of a base station and a UE in case of performing single cell, carrier aggregation, and double access according to an embodiment of the disclosure.

FIG. 9 is a diagram illustrating a wireless protocol structure of a base station and a UE in case of performing single cell, carrier aggregation, and double access according to an embodiment of the disclosure.

Figure 10:
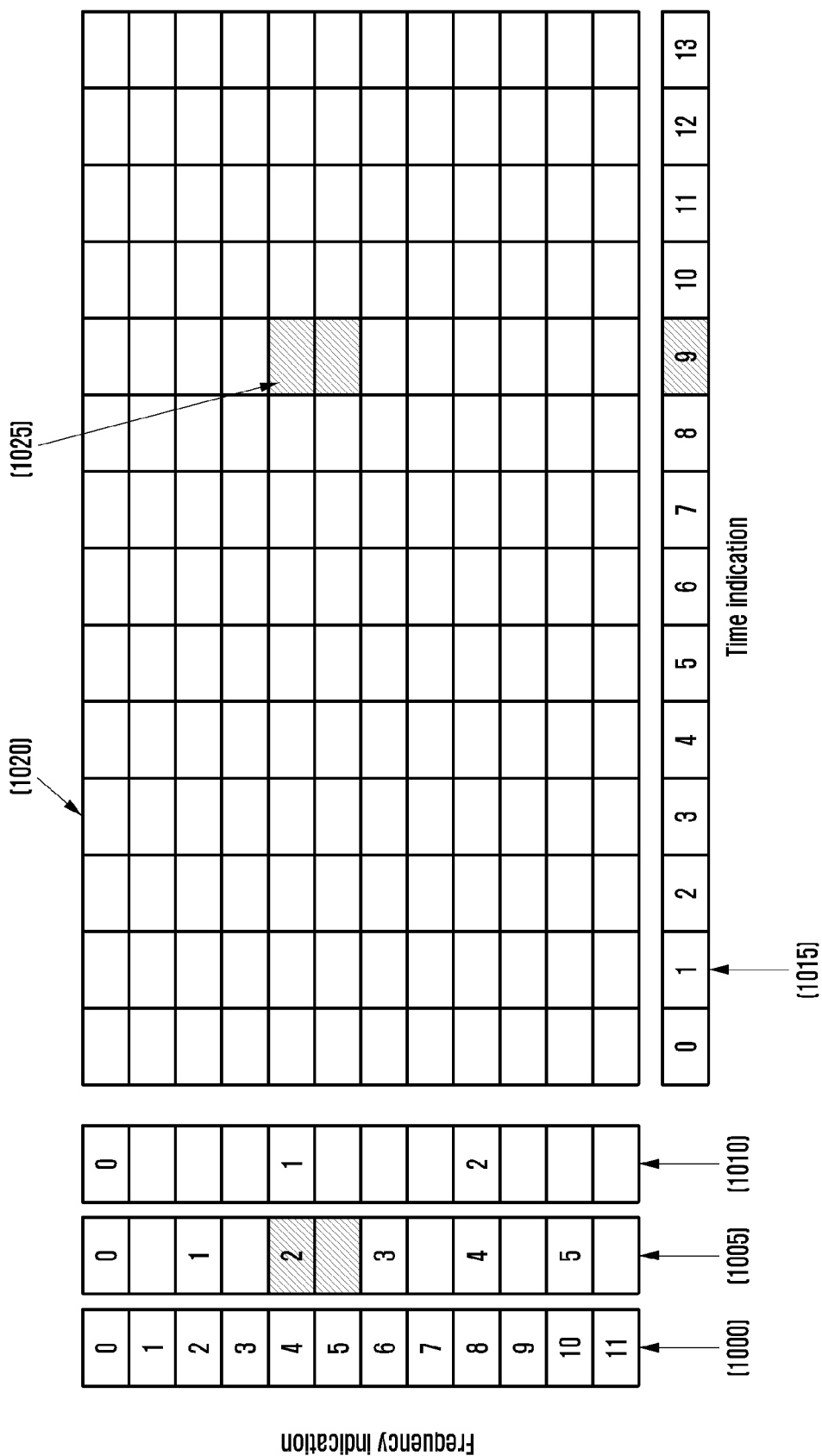
FIG. 10 is a diagram explaining an example of CSI-RS configuration according to an embodiment of the disclosure.

FIG. 10 is a diagram explaining an example of CSI-RS configuration according to an embodiment of the disclosure.

Figure 11:
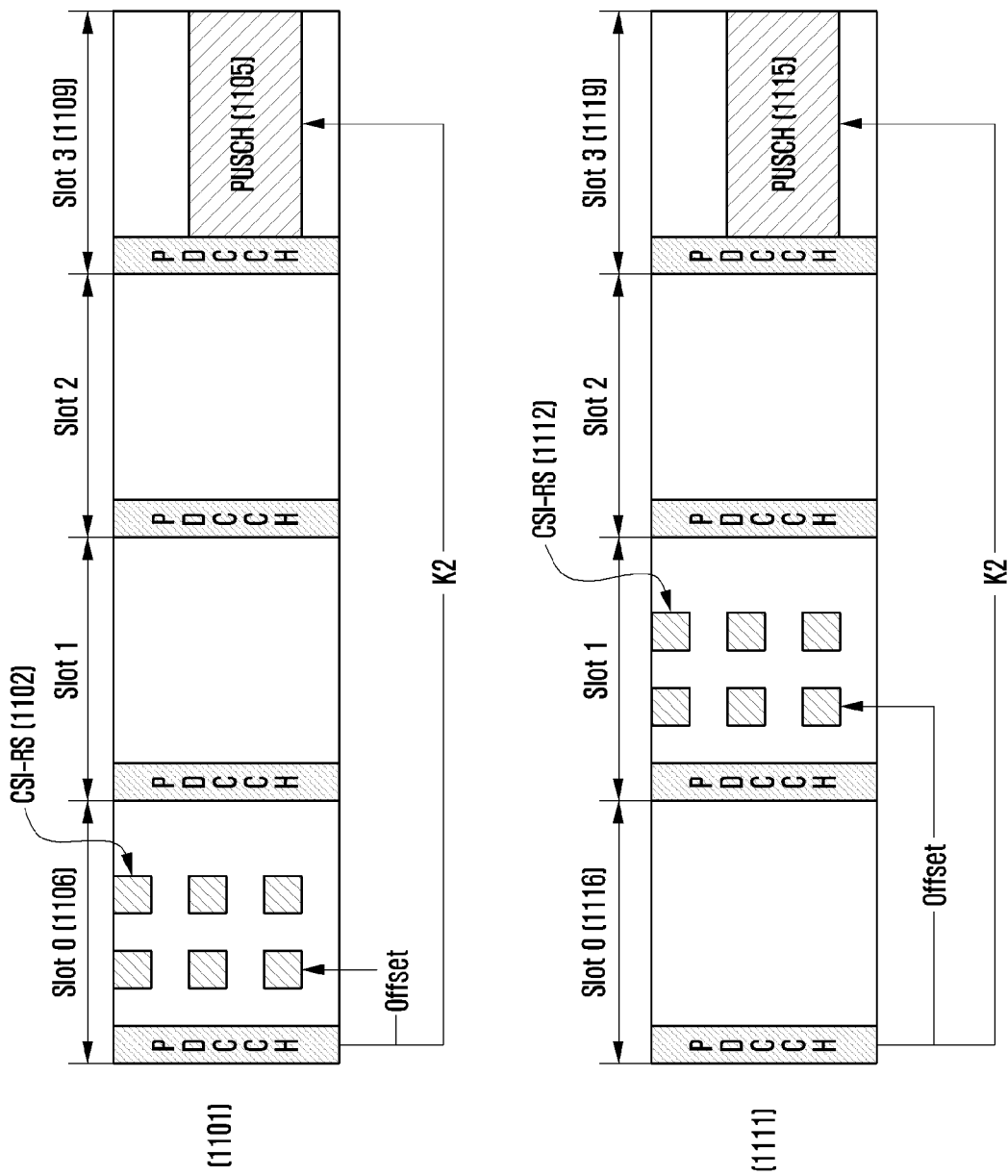
FIG. 11 is a diagram illustrating an example of an aperiodic channel status report method according to an embodiment of the disclosure.

FIG. 11 is a diagram illustrating an example of an aperiodic channel status report method according to an embodiment of the disclosure.

Figure 12:
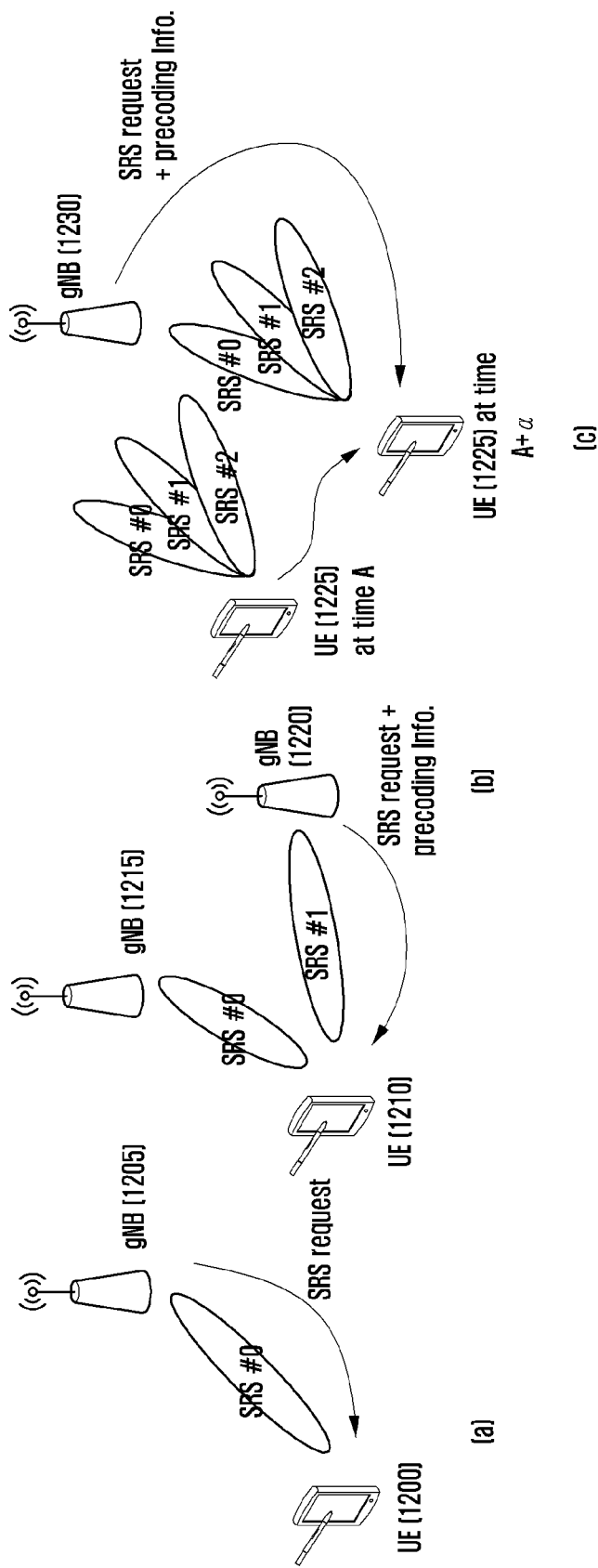
FIG. 12 is a diagram explaining an example of SRS for various operational scenarios according to an embodiment of the disclosure.

FIG. 12 is a diagram explaining an example of SRS for various operational scenarios according to an embodiment of the disclosure.

Figure 13:
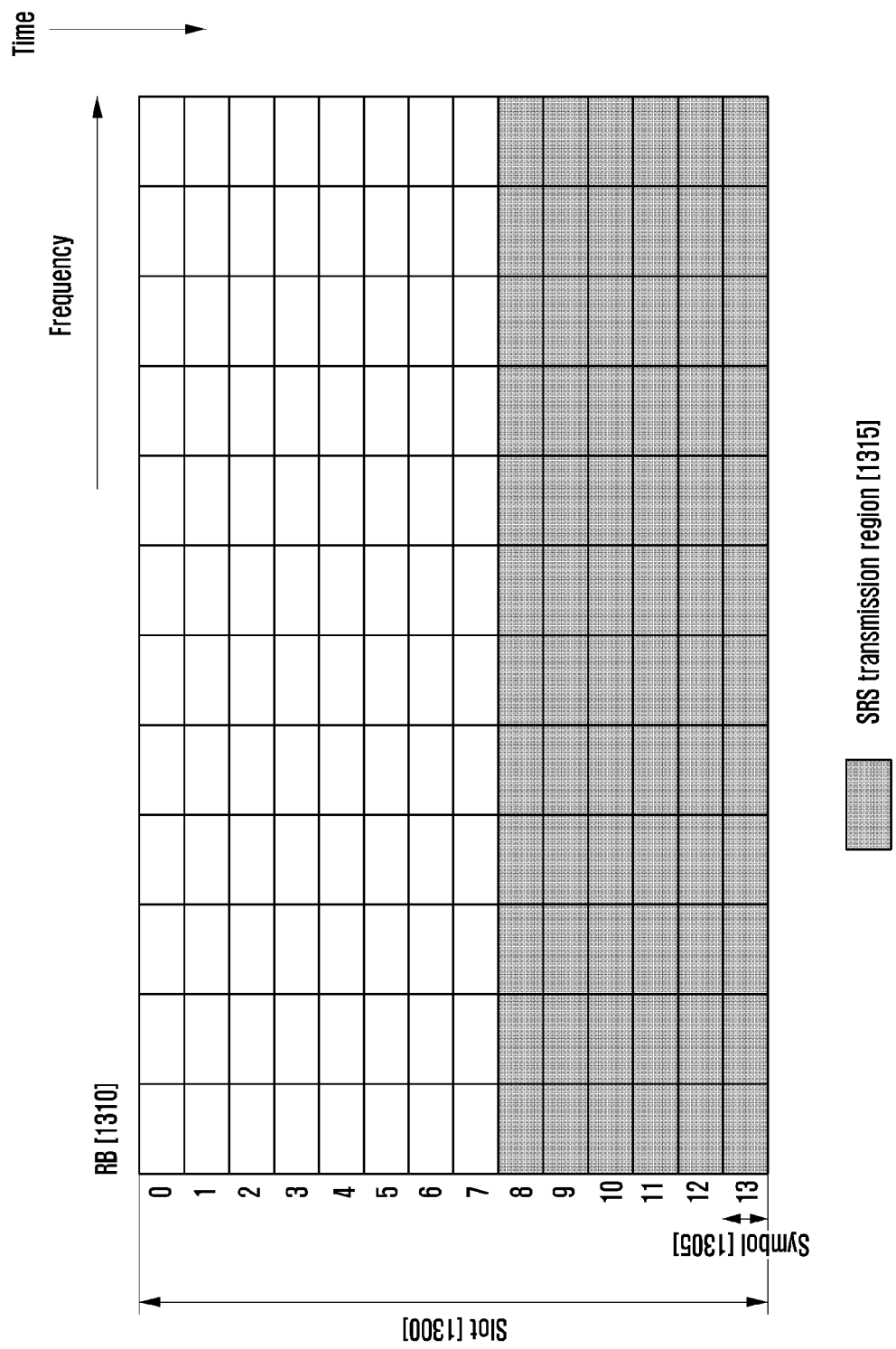
FIG. 13 is a diagram illustrating an uplink transmission structure of a 5G communication system according to an embodiment of the disclosure.

FIG. 13 is a diagram illustrating an uplink transmission structure of a 5G communication system according to an embodiment of the disclosure.

Figure 14:
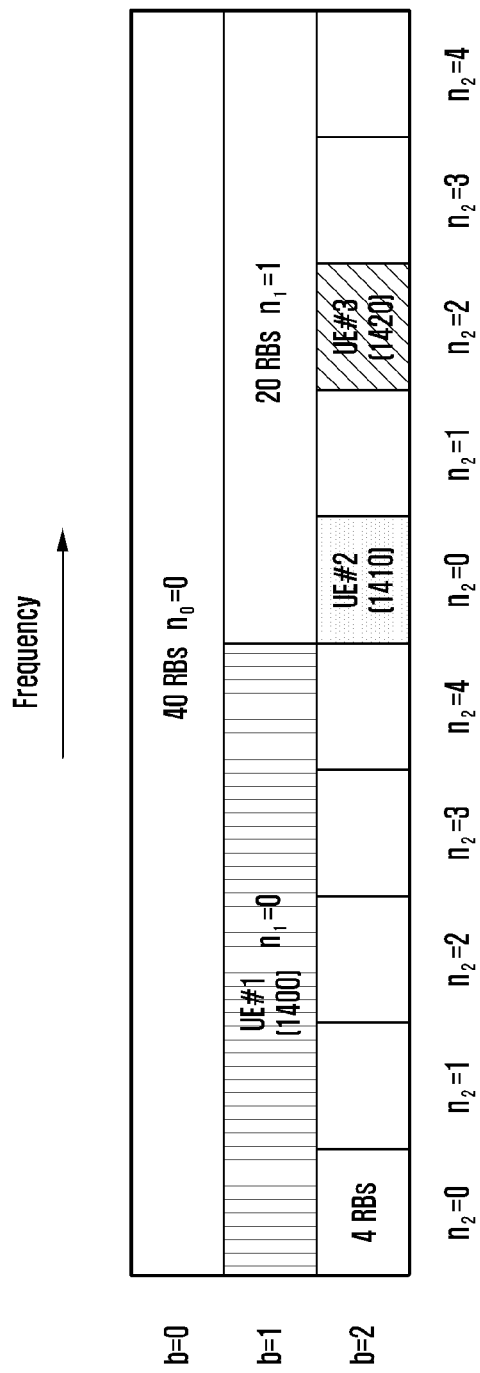
FIG. 14 is a diagram illustrating a structure in which SRS is assigned for each subband according to an embodiment of the disclosure.

FIG. 14 is a diagram illustrating a structure in which SRS is assigned for each subband according to an embodiment of the disclosure.

Figure 15:
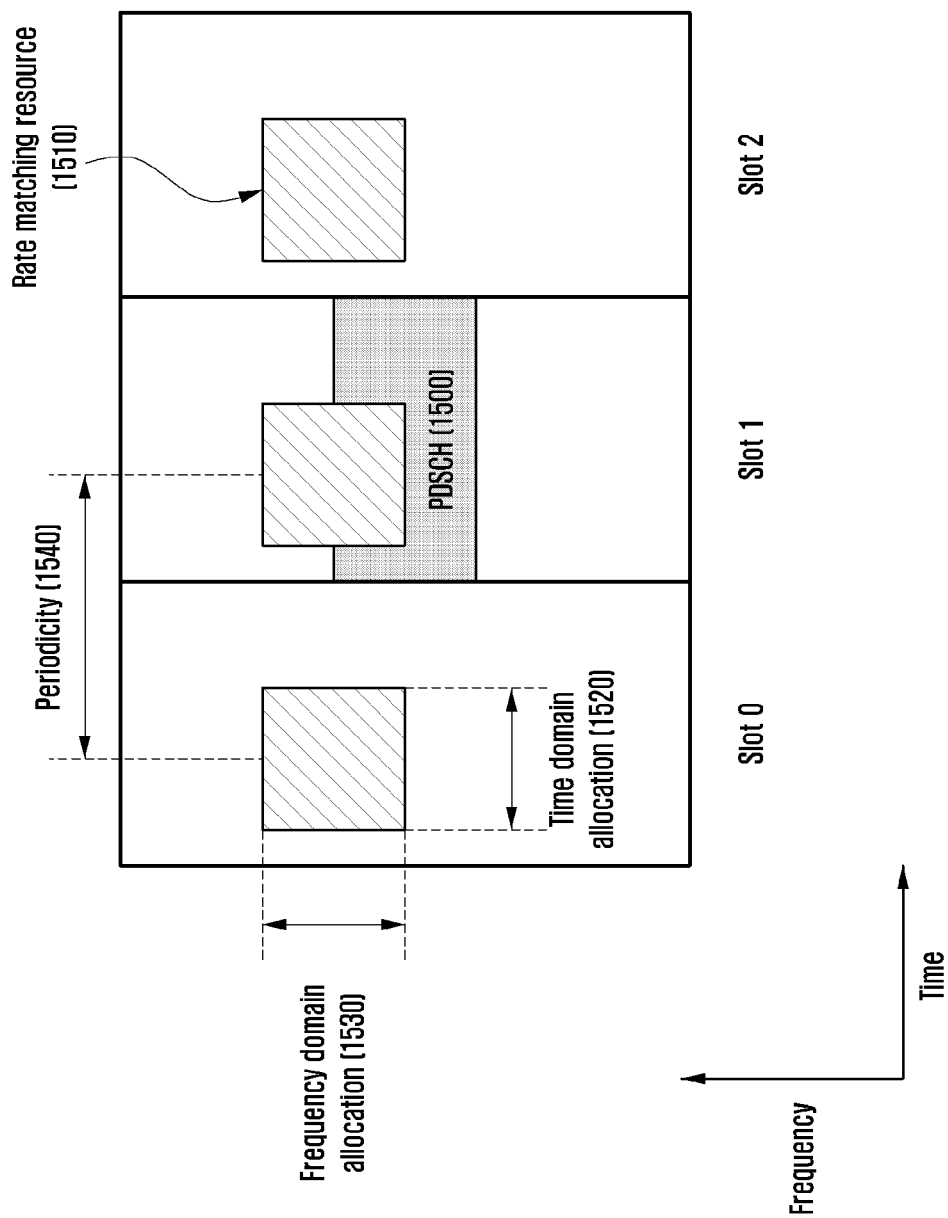
FIG. 15 is a diagram explaining a method in which a base station and a UE transmit or receive data in consideration of a downlink data channel and a rate matching resource according to an embodiment of the disclosure.

FIG. 15 is a diagram explaining a method in which a base station and a UE transmit or receive data in consideration of a downlink data channel and a rate matching resource according to an embodiment of the disclosure.

Figure 16:
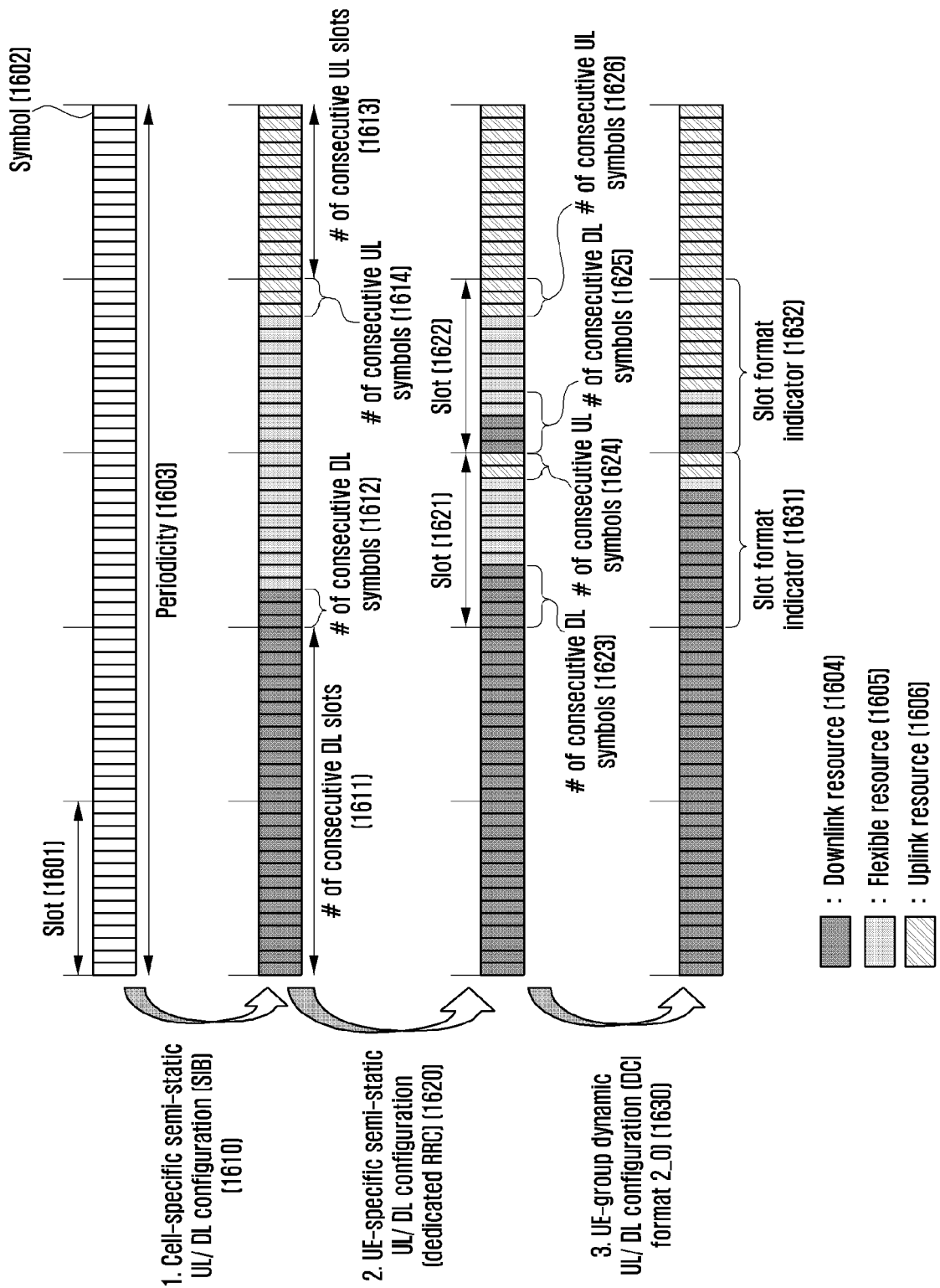
FIG. 16 is a diagram illustrating an example of uplink-downlink configuration being considered in a 5G communication system.

FIG. 16 is a diagram illustrating an example of uplink-downlink configuration being considered in a 5G communication system.

Figure 17:
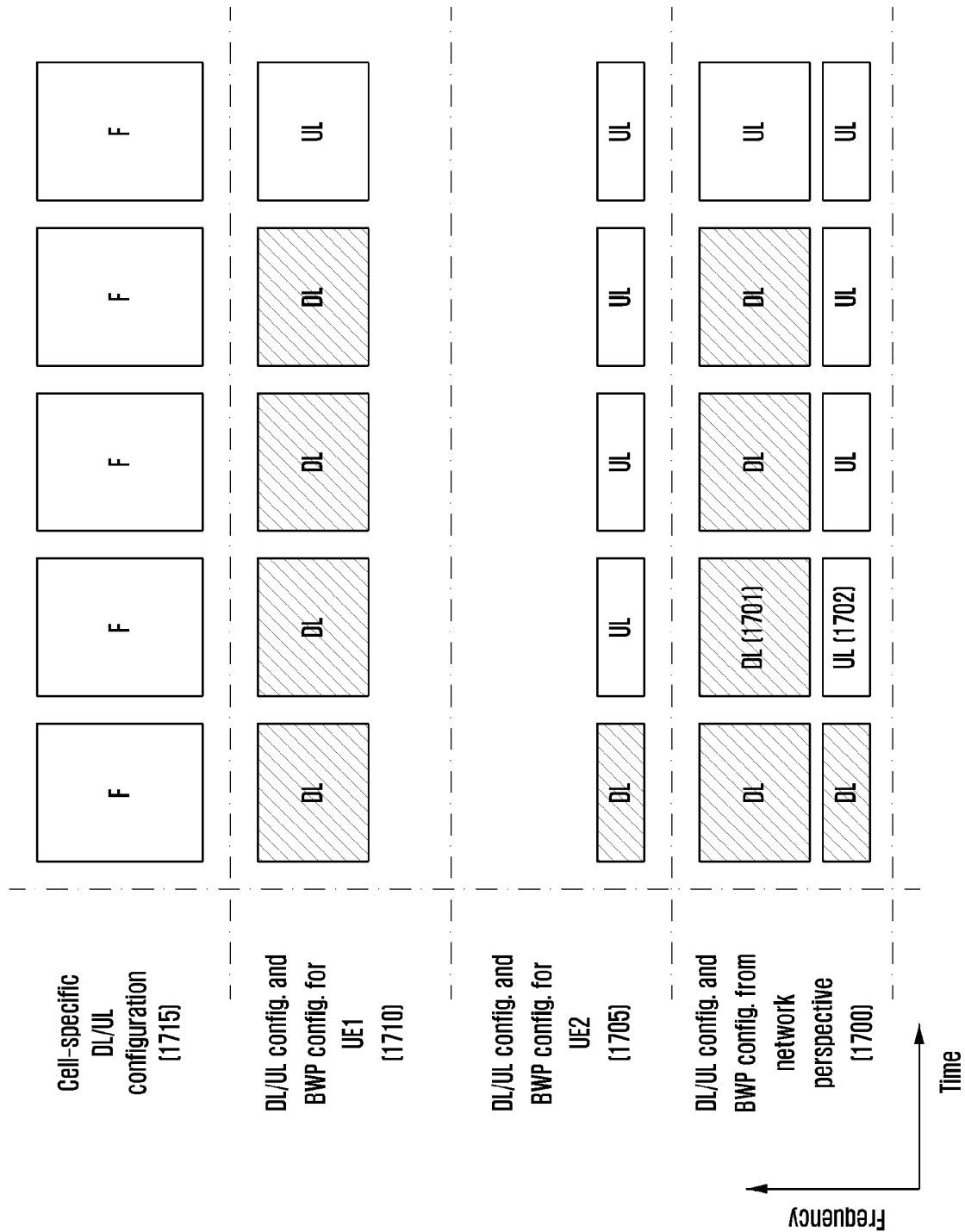
FIG. 17 is a diagram illustrating an example of uplink-downlink configuration of an XDD system.

FIG. 17 is a diagram illustrating an example of uplink-downlink configuration of an XDD system.

Figure 18:
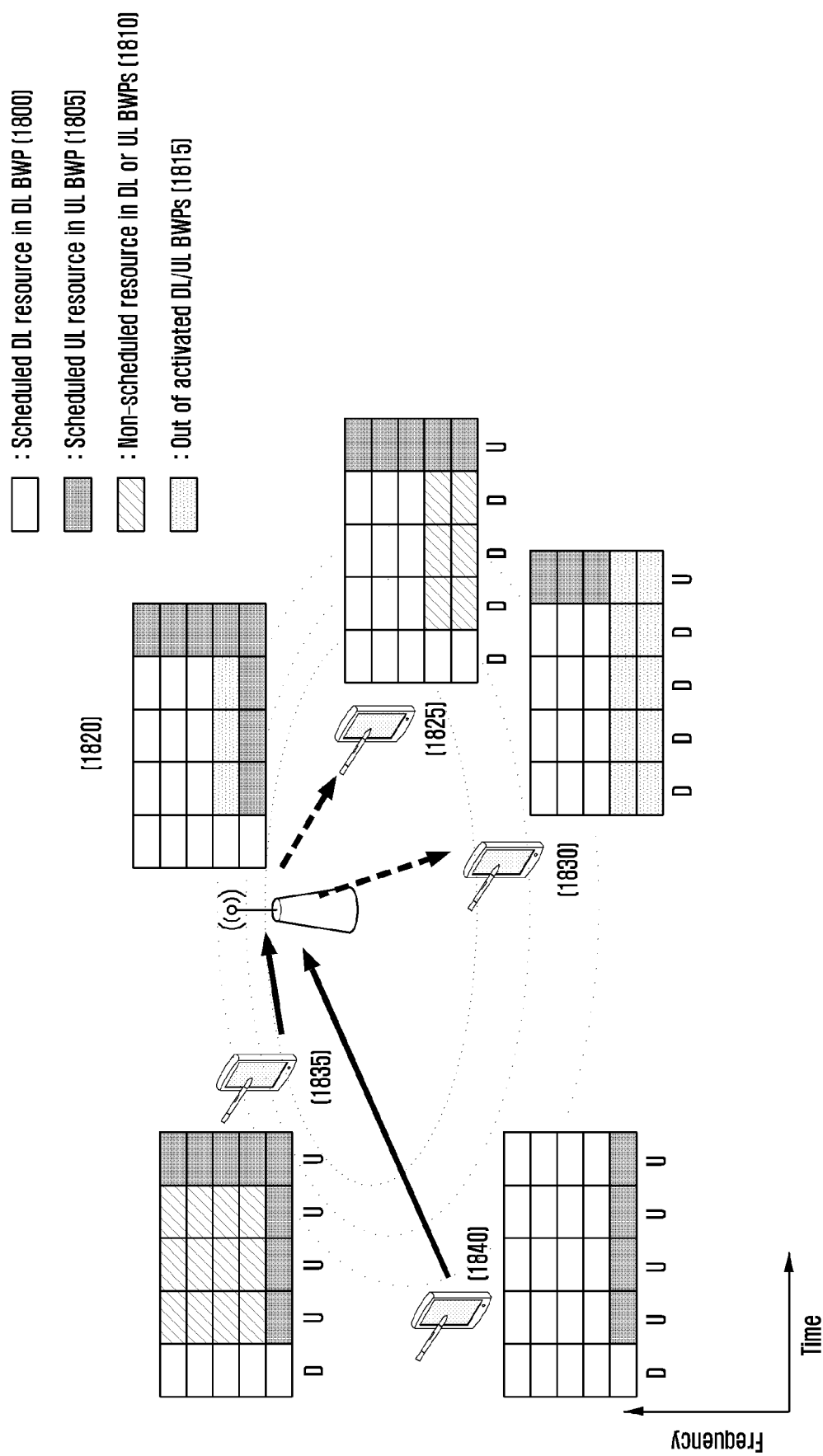
FIG. 18 is a diagram illustrating another example of uplink-downlink configuration of an XDD system.

FIG. 18 is a diagram illustrating another example of uplink-downlink configuration of an XDD system.

Figure 19:
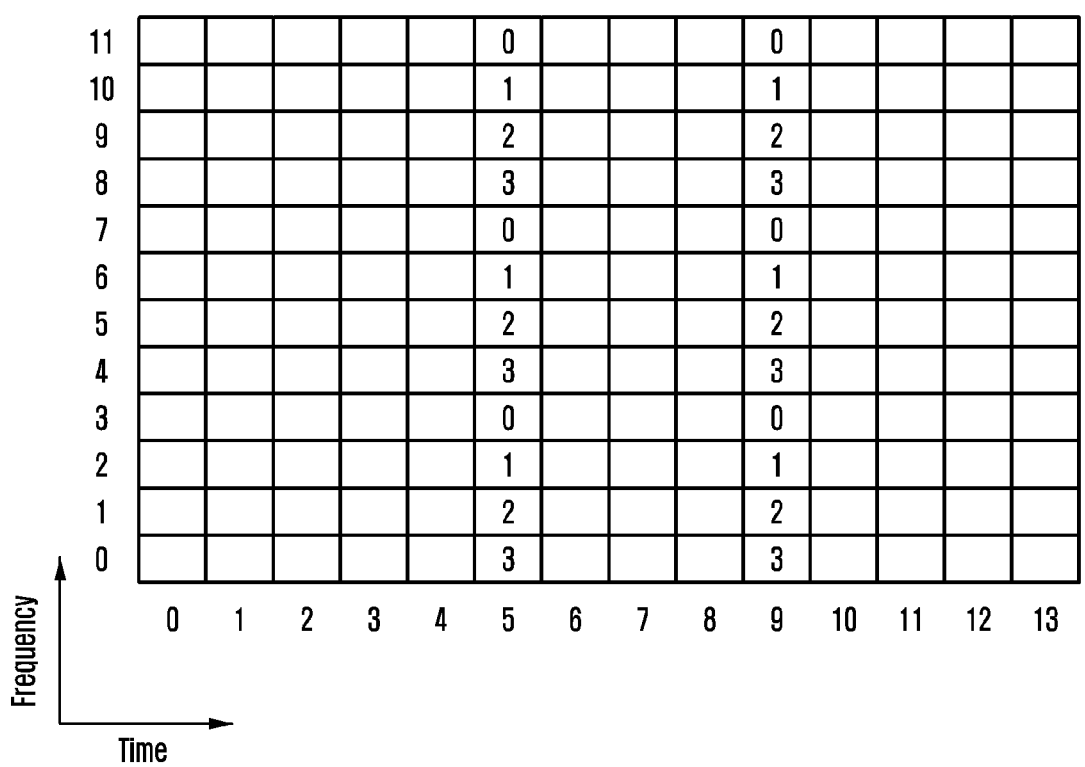
FIG. 19 is a diagram illustrating an example of a TRS pattern according to an embodiment of the disclosure.

FIG. 19 is a diagram illustrating an example of a TRS pattern according to an embodiment of the disclosure.

Figure 20A:
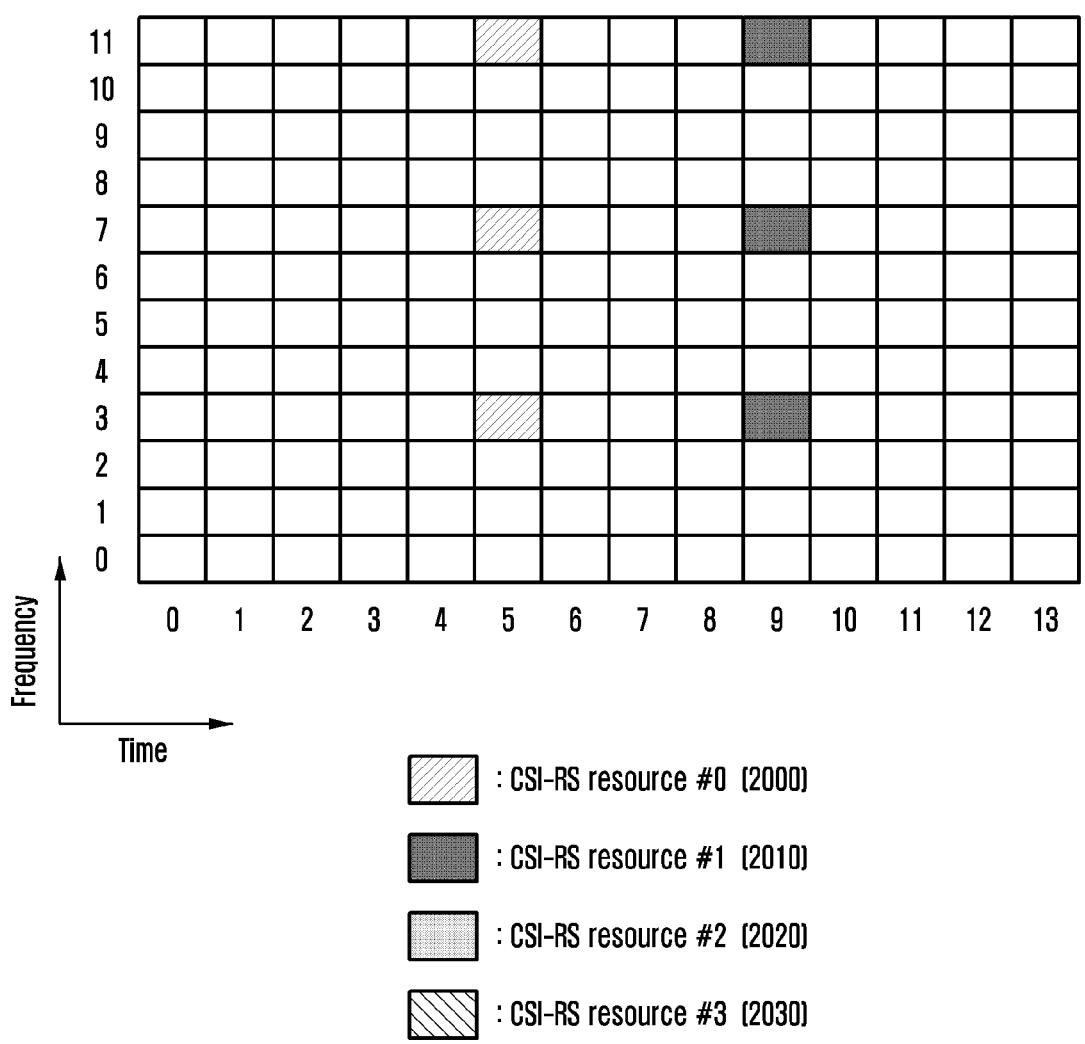
FIG. 20A is a diagram illustrating an example of a TRS pattern according to an embodiment of the disclosure.

FIG. 20A is a diagram illustrating an example of a TRS pattern according to an embodiment of the disclosure.

Figure 20B:
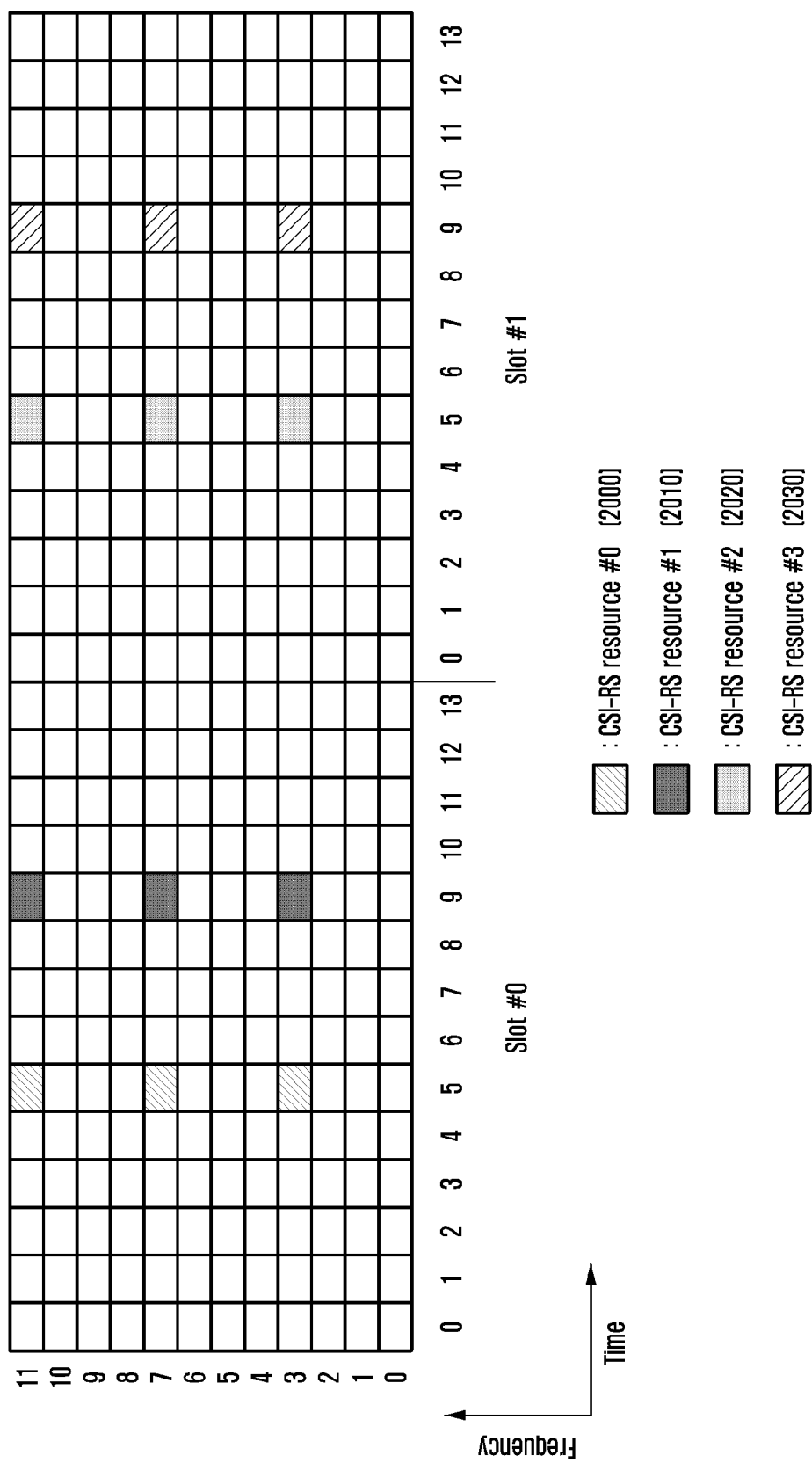
FIG. 20B is a diagram illustrating another example of a TRS pattern according to an embodiment of the disclosure.

FIG. 20B is a diagram illustrating another example of a TRS pattern according to an embodiment of the disclosure.

Figure 21:
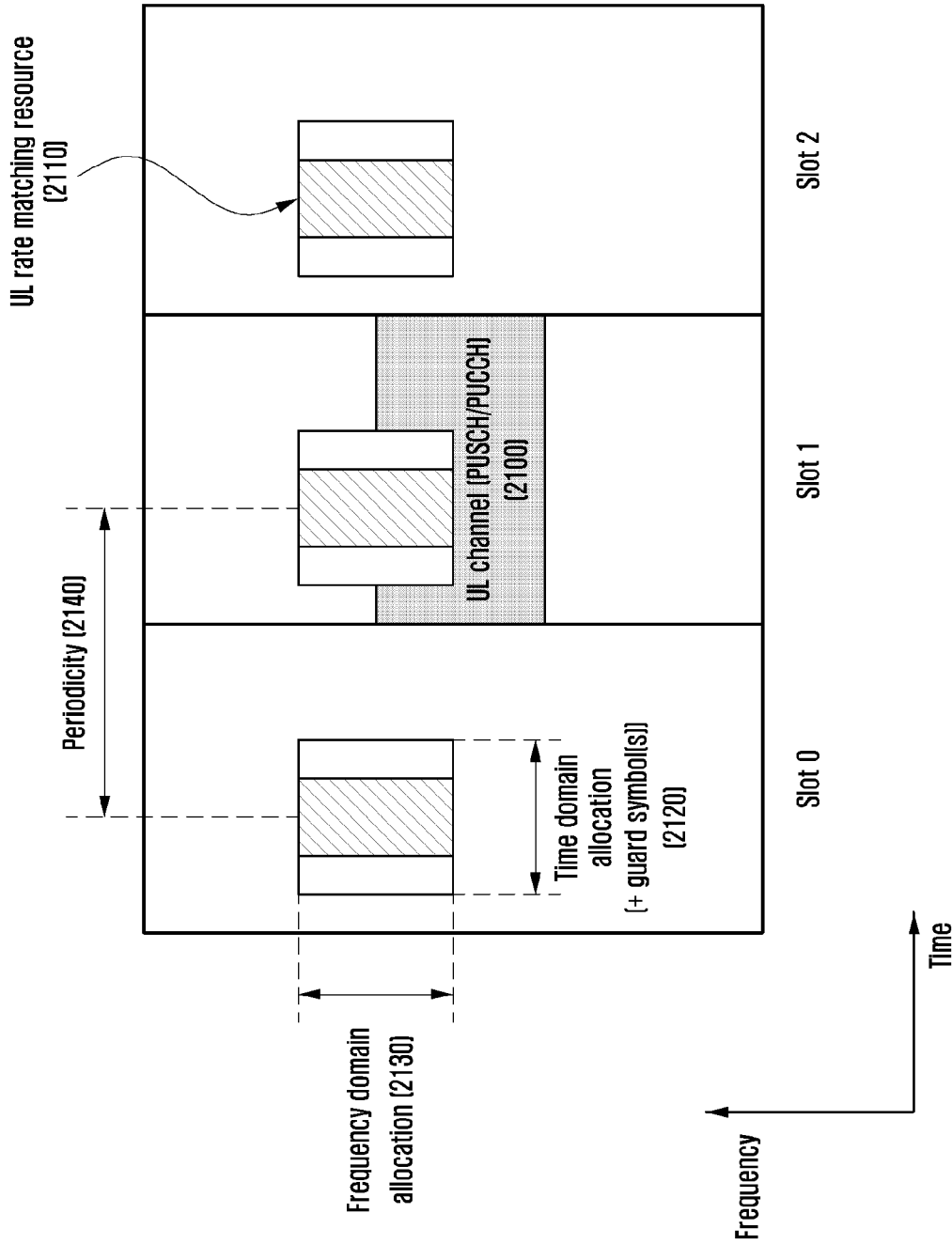
FIG. 21 is a diagram illustrating an example of uplink rate matching resource configuration according to an embodiment of the disclosure.

FIG. 21 is a diagram illustrating an example of uplink rate matching resource configuration according to an embodiment of the disclosure.

Figure 22:
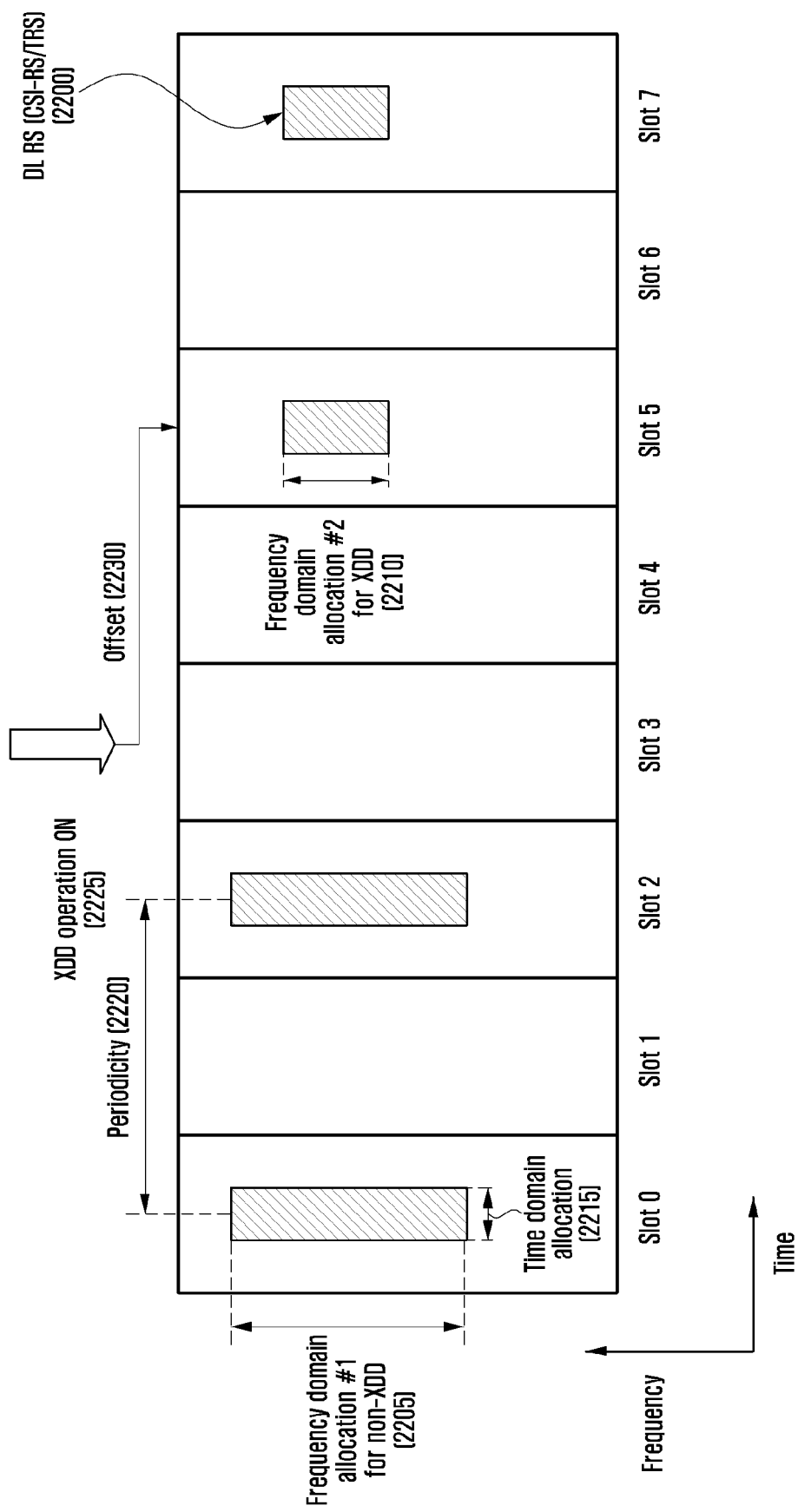
FIG. 22 is a diagram illustrating an example of reference signal transmission band configuration for XDD operation according to an embodiment of the disclosure.

FIG. 22 is a diagram illustrating an example of reference signal transmission band configuration for XDD operation according to an embodiment of the disclosure.

Figure 23:
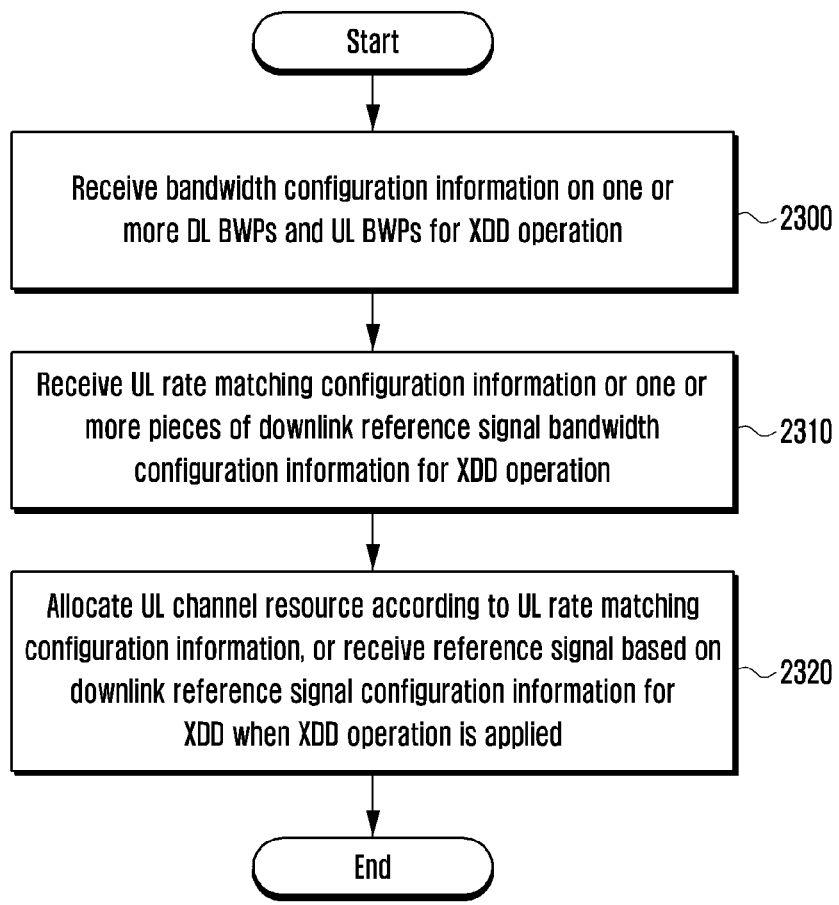
FIG. 23 is a diagram illustrating an example of uplink rate matching resource configuration and application process according to an embodiment of the disclosure.

FIG. 23 is a diagram illustrating an example of uplink rate matching resource configuration and application process according to an embodiment of the disclosure.

Figure 24:
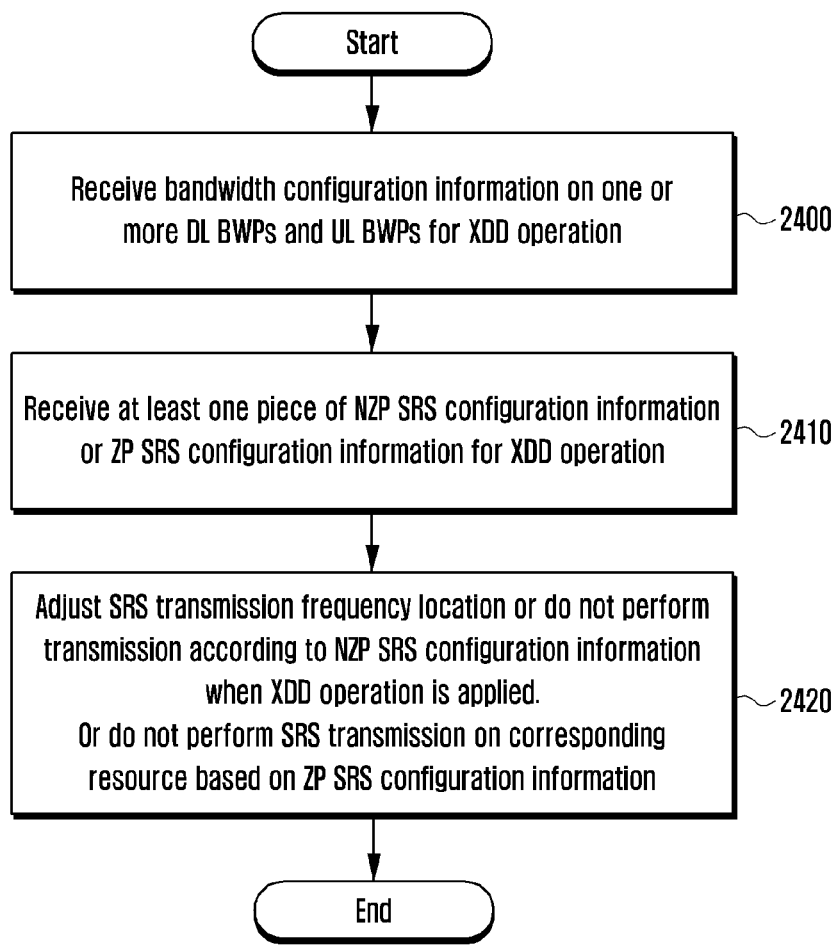
FIG. 24 is a diagram illustrating an example of ZP SRS resource configuration and application process according to an embodiment of the disclosure.

FIG. 24 is a diagram illustrating an example of ZP SRS resource configuration and application process according to an embodiment of the disclosure.

Figure 25:
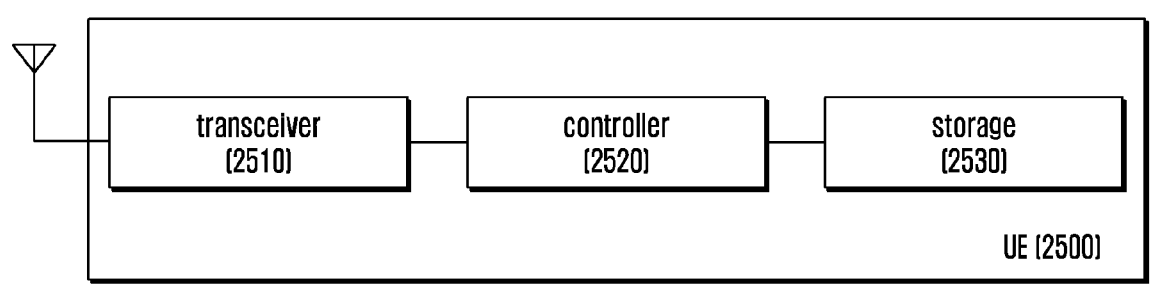
FIG. 25 is a block diagram of a UE according to an embodiment of the disclosure.

FIG. 25 is a block diagram of a UE according to an embodiment of the disclosure.

Figure 26:
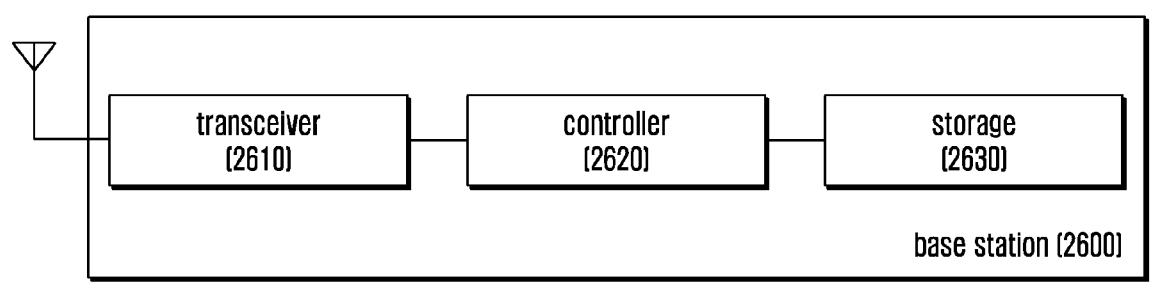
FIG. 26 is a block diagram of a base station according to an embodiment of the disclosure.

FIG. 26 is a block diagram of a base station according to an embodiment of the disclosure.

Hereinafter, embodiments of the disclosure will be described in detail with reference to the accompanying drawings.

In describing the embodiments, explanation of technical contents that are well known in the technical field to which the disclosure pertains and are not directly related to the disclosure will be omitted. This is to transfer the subject matter of the disclosure more clearly without obscuring the same through omission of unnecessary explanations.

For the same reason, in the accompanying drawings, some constituent elements may be exaggerated, omitted, or briefly illustrated. Further, sizes of the respective constituent elements do not completely reflect the actual sizes thereof. In the drawings, the same reference numerals are used for the same or corresponding constituent elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in various different forms. However, the embodiments are provided to complete the disclosure and to assist those of ordinary skill in the art in a comprehensive understanding of the scope of the technical idea, and the disclosure is only defined within the scope of the appended claims. In the entire description of the disclosure, the same drawing reference numerals are used for the same elements. Further, in explaining the disclosure, the detailed explanation of related functions or configurations incorporated herein will be omitted if it is determined that they obscure the subject matter of the disclosure unnecessarily. Further, terms to be described later are terms defined in consideration of their functions in the disclosure, but they may differ depending on intentions of a user and an operator or customs. Accordingly, they should be defined based on the contents of the whole description of the disclosure.

Hereinafter, a base station is the subject that performs resource assignment to a UE, and may be at least one of gNode B, eNode B, Node B, base station (BS), radio connection unit, base station controller, or node on a network. The UE may include user equipment (UE), mobile station (MS), cellular phone, smart phone, computer, or a multimedia system that can perform a communication function. In the disclosure, a downlink (DL) is a radio transmission path of a signal that the base station transmits to the UE, and an uplink (UL) means a radio transmission path of a signal that the UE transmits to the base station. Hereinafter, although an embodiment of the disclosure is described in a state where an LTE or LTE-A system is exemplified, it is also possible to apply the embodiment of the disclosure even to other communication systems having similar technical backgrounds or channel types. For example, a 5th generation mobile communication technology (5G system which may be mixed with new radio or NR) that is developed after LTE-A may be included therein, and the 5G system may conceptually include the existing LTE, LTE-A, and other similar services. Further, the disclosure may also be applied to other communication systems through partial modifications thereof in a range that does not greatly deviate from the scope of the disclosure by the judgment of those skilled in the art.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer-usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as FPGA or ASIC, which performs certain tasks. However, "~unit" is not meant to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". In addition, the components and "~units" may be implemented to operate one or more CPUs in a device or a security multimedia card. Further, in an embodiment, "~units" may include one or more processors.

Hereinafter, embodiments of the disclosure will be described in detail along with the accompanying drawings. Hereinafter, although a method and an apparatus proposed in embodiments of the disclosure will be described in a state where a service for coverage improvement is exemplified, they are not limitedly applied to the embodiments, but it will be also possible to utilize them in a method for transmitting or receiving a data channel, a control channel, and a reference signal corresponding to other additional services by using a combination of all or some of one or more embodiments proposed in the disclosure. Accordingly, the embodiments of the disclosure can be applied through partial modifications in a range that does not greatly deviate from the scope of the disclosure by the judgment of a person having a skilled technical knowledge.

Further, in explaining the disclosure, the detailed explanation of related functions or configurations incorporated herein will be omitted if it is determined that they obscure the subject matter of the disclosure unnecessarily. Further, terms to be described later are terms defined in consideration of their functions in the disclosure, but they may differ depending on intentions of a user and an operator or customs. Accordingly, they should be defined based on the contents of the whole description of the disclosure.

A wireless communication system was initially developed for the purpose of providing a voice-oriented service, but has been developed to, for example, a broadband wireless communication system that provides a high-speed and high-quality packet data service like the communication standards, such as 3GPP high speed packet access (HSPA), long term evolution (LTE) or evolved universal terrestrial radio access (E-UTRA), LTE-advanced (LTE-A), 3GPP2 high rate packet data (HRPD), ultra mobile broadband (UMB), and IEEE 802.16e.

In the LTE system that is a representative example of the broadband wireless communication systems, a downlink (DL) adopts an orthogonal frequency division multiplexing (OFDM) scheme, and an uplink (UL) adopts single carrier frequency division multiple access (SC-FDMA) scheme. The uplink means a radio link in which a user equipment (UE) (or a mobile station (MS)) transmits data or a control signal to a base station (BS) (or eNode B (eNB)), and the downlink means a radio link in which the base station transmits data or a control signal to the UE. According to the above-described multiple access schemes, data of respective users or control information can be discriminated from each other by performing an assignment and an operation so as to prevent time-frequency resources for carrying the data or control information for each user from overlapping each other, that is, to establish orthogonality.

A 5G communication system that is beyond an LTE communication system should support services that simultaneously satisfy various requirements so that various requirements of users and service providers can be freely reflected. Services being considered for the 5G communication system may be enhanced mobile broadband (eMBB), massive machine type communication (mMTC), and ultra-reliability low-latency communication (URLLC).

The eMBB may aim at providing of more improved data rate than the data rate supported by the existing LTE, LTE-A, or LTE-Pro. For example, in the 5G communication system, it is required that, from the viewpoint of one base station, the eMBB provides a peak data rate of 20 Gbps on the downlink and a peak data rate of 10 Gbps on the uplink. Further, the 5G communication system should provide a user perceived data rate of increased UEs simultaneously with providing the peak data rate. In order to satisfy such requirements, improvement of various transmission/reception technologies including more improved multi input multi output (MIMO) transmission technology may be required. Further, it becomes possible to satisfy the data rate required in the 5G communication system by using a frequency bandwidth that is wider than 20 MHz in the frequency band of 3 to 6 GHz or 6 GHz or more whereas in the LTE system, signal transmission is performed using the maximum transmission bandwidth of 20 MHz in the 2 GHz band.

Further, in case that the base station supports the frequency of a wide bandwidth, a bandwidth part (BWP) technology has been highlighted in order for the base station divide the full carrier frequency band into several frequency bands that can be supported by UEs. That is, in case that the base station supports the BWP, and the BW capability of a specific UE is small, the base station may support a small frequency band to the UE through the BWP, and may reduce energy consumption of the UE while reducing the frequency band through the change of the BWP. In addition, the base station has an effect of being able to support various services to one terminal through the BWP change without latency while supporting different frame structures to several BWPs. The BWP technology may be applied to a control channel or a data channel in one-to-one correspondence between a specific UE and the base station. Further, even with respect to a control channel and a data channel for the base station to transmit common signals, for example, a synchronization signal, a physical broadcast channel (PBCH), and system information, to plural UEs in the system, the base station transmits such control channel and data channel only through the configured BWP, and thus the BWP may be applied to reduce energy of the base station.

At the same time, in order to support application services, such as Internet of things (IoT), in the 5G communication system, an mMTC is under consideration. In order to efficiently provide the Internet of things in the mMTC, massive terminal access support, terminal coverage improvement, improved battery time, and terminal cost reduction are required in a cell. Since the Internet of things is attached to various sensors and appliances to provide communication functions, it should support a large number of UEs (e.g., 1,000,000 UEs/km2) in the cell. Further, since there is a high possibility that a UE supporting the mMTC is located in a shaded area that is unable to be covered by the cell, such as underground of a building, due to the characteristics of the service, a wider coverage is demanded as compared with other services being provided in the 5G communication system. The UE supporting the mMTC should be configured as an inexpensive UE, and since it is difficult to frequently replace a battery of the UE, a very long battery life time, such as 10 to 15 years, is required.

Last, the URLLC is a cellular-based wireless communication service that is used for a specific purpose (mission-critical). For example, services for use in remote control of a robot or machinery, industrial automation, unmanned aerial vehicle, remote health care, and emergency alert may be considered. Accordingly, communications being provided by the URLLC should provide very low latency and very high reliability. For example, a service supporting the URLLC should satisfy air interface latency that is shorter than 0.5 millisecond and packet error rate requirements of 10-5 or less at the same time. Accordingly, for the service supporting the URLLC, the 5G system should provide a transmit time interval (TTI) that is shorter than that of other services, and should assign wide resources in the frequency band in order to secure reliability of a communication link at the same time.

Three kinds of services, that is, eMBB, URLLC, and mMTC, of the 5G communication system (hereinafter, it can be mixed with the 5G system) may be multiplexed and transmitted by one system. In this case, in order to satisfy different requirements of the respective services, different transmission/reception techniques and transmission/reception parameters may be used between the services.

Hereinafter, a frame structure of a 5G system will be described in more detail with reference to the drawings.

FIG. 1 is a diagram illustrating a basic structure of a time-frequency domain that is a radio resource region of a 5G system.

In FIG. 1, a horizontal axis represents a time domain, and a vertical axis represents a frequency domain. In the time domain and the frequency domain, the basic unit of a resource is resource element (RE) 101, and may be defined as one orthogonal frequency division multiplexing (OFDM) symbol (or discrete Fourier transform spread OFDM (DFT-s-OFDM) symbol) 102 on the time axis, and one subcarrier 103 on the frequency axis. In the frequency domain, $N_{sc}^{RB}$ (e.g., 12) successive REs may constitute one resource block (RB) 104. Further, in the time domain, $N_{symb}^{subframe}$ successive OFDM symbols may constitute one subframe 110.

FIG. 2 is a diagram illustrating a slot structure being considered in a 5G system.

In FIG. 2, an example of structures of a frame 200, a subframe 201, and a slot 202 is illustrated. One frame 200 may be defined as 10 ms. One subframe 201 may be defined as 1 ms, and thus one frame 200 may be composed of total 10 subframes 201. Further, one slit 202 or 203 may be defined as 14 OFDM symbols (i.e., the number $N_{symb}^{slot}$ of symbols per one slot is 14 ($N_{symb}^{slot}$=14)). One subframe 201 may be composed of one or a plurality of slots 202 and 203, and the number of slots 202 and 203 per one subframe 201 may differ depending on 204 and 205 being set values for subcarrier spacing.

In an example of FIG. 2, slot structures are illustrated in case of µ=0 (204) and in case of µ=1 (205) as the configured values of subcarrier spacing. In case of µ=0 (204), one subframe 201 may be composed of one slot 202, and in case of µ=1 (205), one subframe 201 may be composed of two slots 203. That is, depending on the set value for the subcarrier spacing, the number $N_{slot}^{subframe,\mu}$ of slots per one subframe may differ, and accordingly, the number $N_{slot}^{frame,\mu}$ of slots per one frame may differ. The $N_{slot}^{subframe,\mu}$ and $N_{slot}^{frame,\mu}$ depending on the subcarrier spacing configurations µ may be defined as in Table 1 below.

TABLE 1

| µ | $N_{symb}^{slot}$ | $N_{slot}^{frame,\mu}$ | $N_{slot}^{subfram,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In a 5G wireless communication system, for an initial access, a synchronization signal block SSB (which may be mixed with SS block, SS/PBCH block, or the like) may be transmitted, and the synchronization signal block may be composed of a primary synchronization signal (PSS), a secondary synchronization signal (SSS), and a physical broadcast channel (PBCH). At an initial access operation in which the UE initially accesses the system, the UE may first obtain downlink time and frequency domain synchronization from a synchronization signal through a cell search, and may obtain a cell ID. The synchronization signal may include the PSS and the SSS.

Further, the UE may obtain transmission/reception related system information such as, system bandwidth or related control information, and basic parameter values through reception of a PBCH for transmitting a master information block (MIB) from the base station. Based on such information, the UE may obtain a system information block (SIB) by performing decoding of a physical downlink control channel (PDCCH) and a physical downlink shared channel (PSDCH). Thereafter, the UE may exchange identity with the base station through a random access operation, and may initially access a network through registration and authentication operations.

The synchronization signal is a signal that becomes the standard for the cell search, and the subcarrier spacing that is suitable to the channel environment, such as phase noises by frequency bands, may be applied to the synchronization signal to be transmitted. The 5G base station may transmit a plurality of synchronization signal blocks in accordance with the number of analog beams intended to be operated. The PSS and the SSS may be mapped and transmitted through 12 RB, and the PBCH may be mapped and transmitted through 24 RB.

Next, BWP configuration in the 5G communication system will be described in detail with reference to the drawing.

FIG. 3 is a diagram illustrating an example of configuration for a bandwidth part in a 5G communication system.

FIG. 3 illustrates an example in which a UE bandwidth 300 is configured as two bandwidth parts, that is, bandwidth part #1(BWP #1) 305 and bandwidth part #2(BWP #2) 310. The base station may configure one or a plurality of bandwidth parts for the UE, and may configure the following information for the respective bandwidth parts.

TABLE 2

| BWP ::= | SEQUENCE { |
|---|---|
| bwp-Id | BWP-Id, |
| (Bandwidth part identifier) | |
| locationAndBandwidth | INTEGER (1..65536), |
| (Bandwidth part location) | |
| subcarrierSpacing | ENUMERATED {n0, n1, n2, n3, n4, n5}, |
| (Subcarrier spacing) | |
| cyclicPrefix | ENUMERATED { extended } |
| (Cyclic prefix) | |
| } | |

Of course, the configuration information is not limited to the above example, and various parameters related to the bandwidth parts may be configured for the UE in addition to the configuration information. The information may be transferred from the base station to the UE through upper layer signaling, for example, radio resource control (RRC) signaling. At least one bandwidth part among one or a plurality of configured bandwidth parts may be activated. Whether to activate the configured bandwidth part may be semi-statically transferred from the base station to the UE through the RRC signaling, or may be dynamically transferred through downlink control information (DCI).

According to some embodiments, the UE before being RRC-connected may be configured with an initial BWP for the initial access from the base station through the MIB. More specifically, at an initial access operation, the UE may receive configuration information on a search space and a control resource set (CORESET) in which the PDCCH for receiving remaining system information (RMSI) (or system information block 1 which may correspond to SIB1) that is necessary for the initial access through the MIB. The control resource set and the search space being configured through the MIB may be considered as identity (ID) 0, respectively. The base station may notify the UE of configuration information, such as frequency assignment information for control resource set #0, time assignment information, and numerology, through the MIB. Further, the base station may notify the UE of configuration information on monitoring period and monitoring occasion for control resource set #0, that is, configuration information on search space #0, through the MIB. The UE may consider the frequency domain configured as control resource set #0 obtained from the MIB as an initial bandwidth part for the initial access. In this case, the identity (ID) of the initial bandwidth part may be considered as 0.

The configuration for the bandwidth part being supported in the 5G system may be used for various purposes.

According to some embodiments, in case that the bandwidth supported by the UE is smaller than the system bandwidth, this may be supported through the bandwidth part configuration. For example, the base station may configure the frequency location (configuration information 2) of the bandwidth part for the UE, and thus the UE may transmit or receive data in a specific frequency location in the system bandwidth.

Further, according to some embodiments, the base station may configure a plurality of bandwidth parts for the UE for the purpose of supporting different numerologies. For example, in order for a certain UE to support all of data transmission/reception using 15 kHz subcarrier spacing and 30 kHz subcarrier spacing, two bandwidth parts may be configured as 15 kHz and 30 kHz subcarrier spacings. The different bandwidth parts may be frequency-division-multiplexed, and in case of transmitting or receiving data at specific subcarrier spacing, the bandwidth part being configured at the corresponding subcarrier spacing may be activated.

Further, according to some embodiments, the base station may configure the bandwidth part having bandwidths of different sizes for the UE. For example, in case that the UE supports a very large bandwidth, for example, bandwidth of 100 MHz, and always transmit or receive data in the corresponding bandwidth, very large power consumption may occur. In particular, performing of monitoring for unnecessary downlink control channel with a large bandwidth of 100 MHz in a situation of no traffic may be very inefficient from the viewpoint of power consumption. For the purpose of reducing the power consumption of the UE, the base station may configure a bandwidth part of a relatively small bandwidth, for example, the bandwidth part of 20 MHz. In a situation of no traffic, the UE may perform a monitoring operation in the 20 MHz bandwidth part, and in case of data occurrence, the UE may transmit or receive data with the 100 MHz bandwidth part in accordance with the instructions of the base station.

As for the method for configuring the bandwidth part, the UEs before the RRC connection may receive configuration information on the initial BWP through the MIB at the initial access operation. More specifically, the UE may be configured with the control resource set for the downlink control channel on which the DCI for scheduling the SIB can be transmitted from the MIB on the PBCH. The bandwidth of the control resource set configured as the MIB may be considered as the initial BWP, and the UE may receive the PDSCH on which the SIB is transmitted through the configured initial BWP. In addition to the purpose of receiving the SIB, the initial BWP may be utilized for other system information (OSI), paging, and random access.

If one or more bandwidth parts are configured for the UE, the base station may instruct the UE to change the bandwidth part by using a bandwidth part indicator field in the DCI. As an example, in FIG. 3, if the currently activated bandwidth part of the UE is bandwidth part #1 305, the base station may instruct the UE bandwidth part #2 310 through the bandwidth part indicator in the DCI, and the UE may perform the bandwidth part change to bandwidth part #2 310 indicated by the bandwidth part indicator in the received DCI.

As described above, the DCI based bandwidth part change may be indicated by the DCI scheduling the PDSCH or physical uplink shared channel (PUSCH), and in case that the UE receives a bandwidth part change request, it is required to perform reception or transmission of the PDSCH or PUSCH being scheduled by the DCI without difficulty in the changed bandwidth part. For this, requirements for a delay time TBWP required when changing the bandwidth part have been regulated in the standard, and may be defined, for example, as follows.

TABLE 3

| μ | NR Slot length (ms) | BWP switch delay $T_{BWP}$ (slots) | |
|---|---|---|---|
| | | Type 1$^{Note\ 1}$ | Type 2$^{Note\ 1}$ |
| 0 | 1 | 1 | 3 |
| 1 | 0.5 | 2 | 5 |
| 2 | 0.25 | 3 | 9 |
| 3 | 0.125 | 6 | 17 |

*Note 1*:
Depends on UE capability.
*Note 2*:
If the BWP switch involves changing of SCS, the BWP switch delay is determined by the larger one between the SCS before BWP switch and the SCS after BWP switch.

The requirements for the bandwidth part change delay time support type 1 or type 2 in accordance with UE capability. The UE may report a supportable bandwidth part delay time type to the base station.

FIG. 4 is a diagram illustrating an example of a bandwidth changing method according to an embodiment of the disclosure.

With reference to FIG. 4, in case that the UE receives the DCI including the bandwidth part change indicator at slot n according to the requirements for the above-described bandwidth part change delay time (415), the UE may complete the change to a new bandwidth part indicated by the bandwidth part change indicator at a time that is not later than the slot n+TBWP, and may perform transmission/reception for the data channel being scheduled by the corresponding DCI in the new changed bandwidth part 410. In case of scheduling the data channel in the new bandwidth part, the base station may determine the time domain resource assignment for the data channel in consideration of the bandwidth part change delay time (TBWP) 420 of the UE. That is, when scheduling the data channel with the new bandwidth part, in the method for determining the time domain resource assignment for the data channel, the base station may schedule the corresponding data channel after the bandwidth part change delay time 435 and 440. Accordingly, the UE may not expect that the DCI indicating the bandwidth part change indicates a slot offset (K0 or K2) value that is smaller than the bandwidth part change delay time (TBWP) 420.

If the UE receives the DCI (e.g., DCI format 1_1 or 0_1) indicating the bandwidth part change, the UE may not perform any transmission or reception during a corresponding time period from the third symbol of the slot having received the PDCCH including the corresponding DCI to a start time point of the slot indicated by the slot offset (K0 or K2) value indicated by the time domain resource assignment indicator field in the corresponding DCI. For example, in case that the UE has received the DCI indicating the bandwidth part change at slot n, and the slot offset value indicated by the corresponding DCI is K, the UE may not perform any transmission or reception from the third symbol of slot n to the symbol (e.g., last symbol of slot n+K−1) before slot n+K.

Next, a method for configuring transmission/reception related parameters by bandwidth parts in a 5G system will be described.

The UE may be configured with one or a plurality of bandwidth parts from the base station, and may be additionally provided with parameters (e.g., uplink/downlink data channel and control channel related configuration information) to be used for transmission/reception by configured bandwidth parts. For example, in case of being configured with bandwidth part #1 305 and bandwidth part #2 310 in FIG. 3, the UE may be configured with transmission/reception parameter #1 for the bandwidth part #1 305, and may be configured with transmission/reception parameter #2 for the bandwidth part #2 310. If the bandwidth part #1 305 is activated, the UE may perform transmission/reception with the base station based on the transmission/reception parameter #1, whereas if the bandwidth part #2 310 is activated, the UE may perform transmission/reception with the base station based on the transmission/reception parameter #2.

More specifically, the following parameters may be configured from the base station to the UE.

First, with respect to the uplink bandwidth part, the following pieces of information may be configured.

TABLE 4

```
BWP-Uplink ::= SEQUENCE {
bwp-Id                              BWP-Id,
(Bandwidth part identifier)
bwp-Common                          BWP-UplinkCommon  OPTIONAL, -- Cond
SetupOtherBWP
(Cell-specific or common parameter)
bwp-Dedicated                       BWP-UplinkDedicated  OPTIONAL, -- Cond
SetupOtherBWP
(UE-specific parameter)
...
}
BWP-UplinkCommon ::= SEQUENCE {
genericParameters           BWP,
(Generic parameter)
rach-ConfigCommon                        SetupRelease { RACH-ConfigCommon }
OPTIONAL, -- Need M
(Random access related common parameter)
pusch-ConfigCommon                       SetupRelease { PUSCH-ConfigCommon }
OPTIONAL, -- Need M
(PUSCH related common parameter)
pucch-ConfigCommon                       SetupRelease { PUCCH-ConfigCommon }
OPTIONAL, -- Need M
(PUSCH related common parameter)
...
```

TABLE 4-continued

```
}
BWP-UplinkDedicated ::= SEQUENCE {
pucch-Config                   SetupRelease { PUCCH-Config } OPTIONAL, --
Need M
(PUCCH related UE-specific parameter)
pusch-Config                   SetupRelease { PUSCH-Config } OPTIONAL, --
Need M
(PUSCH related UE-specific parameter)
configuredGrantConfig
(Configured grant related parameter)    SetupRelease  { ConfiguredGrantConfig }
OPTIONAL,   -- Need M
srs-Config
(SRS related parameter)
SetupRelease { SRS-Config } OPTIONAL, -- Need M
beamFailureRecoveryConfig
(Beam    failure    recovery    related    parameter)         SetupRelease
{ BeamFailureRecoveryConfig } OPTIONAL,   -- Cond SpCellOnly
...
}
```

According to the above-described table, the UE may be configured with cell-specific (or cell common or common) transmission related parameters (e.g., random access channel (RACH), physical uplink control channel (PUCCH), and uplink data channel (PUSCH) related parameters) from the base station (corresponding to BWP-UplinkCommon). Further, the UE may be configured with UE-specific (or dedicated) transmission related parameters (e.g., PUCCH, PUSCH, non-approval based uplink transmission (configured grant PUSCH), and sounding reference signal (SRS) related parameters) from the base station (corresponding to BWP-UplinkDedicated).

Next, with respect to the downlink bandwidth part, the following pieces of information may be configured.

According to the above-described table, the UE may be configured with cell-specific (or cell common or common) reception related parameters (e.g., downlink control channel (PDCCH), downlink data channel ( ) related parameters) from the base station (corresponding to BWP-Downlink-Common). Further, the UE may be configured with UE-specific (or dedicated) reception related parameters (e.g., PDCCH, PDSCH, non-approval based downlink data transmission (semi-persistent scheduled PDSCH), and radio link monitoring (RLM) related parameters) from the base station (corresponding to BWP-DownlinkDedicated).

FIG. 5 is a diagram illustrating an example of a control resource set (CORESET) on which a downlink control channel is transmitted in a 5G communication system. FIG.

TABLE 5

```
BWP-Downlink ::= SEQUENCE {
bwp-Id                  BWP-Id,
(Bandwidth part identifier)
bwp-Common                   BWP-DownlinkCommon OPTIONAL, -- Cond
SetupOtherBWP
(Cell-specific or common parameter)
bwp-Dedicated                BWP-DownlinkDedicated OPTIONAL, -- Cond
SetupOtherBWP
(UE-specific parameter)
...
}
BWP-DownlinkCommon ::= SEQUENCE {
genericParameters       BWP,
(Generic parameter)
pdcch-ConfigCommon           SetupRelease { PDCCH-ConfigCommon }
OPTIONAL, -- Need M
(PDCCH related common parameter)
pdsch-ConfigCommon           SetupRelease { PDSCH-ConfigCommon }
OPTIONAL, -- Need M
(PDSCH related common parameter)
...
}
BWP-DownlinkDedicated ::= SEQUENCE {
pdcch-Config                 SetupRelease { PDCCH-Config } OPTIONAL, --
Need M
(PDCCH related UE-specific parameter)
pdsch-Config                 SetupRelease { PDSCH-Config } OPTIONAL, --
Need M
(PDSCH related UE-specific parameter)
sps-Config
(SPS related parameter)    SetupRelease { SPS-Config } OPTIONAL, -- Need M
radioLinkMonitoringConfig
(RLM related parameter)   SetupRelease { radioLinkMonitoringConfig} OPTIONAL, --
- Cond   SpCellOnly
...
}
```

5 is a diagram illustrating an example in which a UE bandwidth part 510 is configured on a frequency axis, and two control resource sets (control resource set #1 501 and control resource set #2 502) are configured in one slot 520 on a time axis. The control resource sets 501 and 502 may be configured for a specific frequency resource 503 in the whole UE bandwidth part 510 on the frequency axis, and may be configured for one or a plurality of OFDM symbols on the time axis, and this may be defined as a control resource set duration 504. With reference to the example illustrated in FIG. 5, the control resource set #1 501 may be configured as the control resource set duration of two symbols, and the control resource set #2 502 may be configured as the control resource set duration of one symbol.

In the above-described 5G system, the control resource set may be configured from the base station to the UE through upper layer signaling (e.g., system information, MIB, and RRC signaling). Configuration of the control resource set for the UE means providing of information, such as control resource set identity, frequency location of the control resource set, and symbol length of the control resource set. For example, information that is provided to configure the control resource set is as follows.

TABLE 6

| | |
|---|---|
| ControlResourceSet ::= | SEQUENCE { |
| Corresponds to L1 parameter 'CORESET-ID' | |
| controlResourceSetId | ControlResourceSetId, |
| (Control resource set identity) | |
| frequencyDomainResources | BIT STRING (SIZE (45)), |
| (Frequency axis resource allocation information) | |
| duration | INTEGER |
| (1..maxCoReSetDuration), | |
| (Time axis resource allocation information) | |
| cce-REG-MappingType | CHOICE { |
| (CCE-to-REG mapping type) | |
| interleaved | SEQUENCE |
| { | |
| reg-BundleSize | ENUMERATED |
| {n2, n3, n6}, | |
| (REG bundle size) | |
| precoderGranularity | ENUMERATED |
| {sameAsREG-bundle, allContiguousRBs}, | |
| interleaverSize | ENUMERATED |
| {n2, n3, n6} | |
| (Interleaver size) | |
| shiftIndex | |
| INTEGER(0..maxNrofPhysicalResourceBlocks-1) | |
| | OPTIONAL |
| (Interleaver Shift) | |
| }, | |
| nonInterleaved | NULL |
| }, | |
| tci-StatesPDCCH | |
| SEQUENCE(SIZE (1..maxNrofTCI-StatesPDCCH)) OF TCI-StateId | |
| OPTIONAL, | |
| (QCL setting up information) | |
| tci-PresentInDCI | ENUMERATED |
| {enabled} | |
| OPTIONAL, -- Need S | |
| } | |

In the 5G system, the control resource set may be composed of NRBCORESET RBs in the frequency domain, and may be composed of NsymbCORESET∈{1,2,3} symbols on the time axis. One control channel element (CCE) may be composed of 6 resource element groups (REGs), and the REG may be defined as 1 RB during 1 OFDM symbol. In one control resource set, indexes of the REGs may be set in time-first order starting from REG index 0, the lowest RB, and the first OFDM symbol of the control resource set.

In the 5G system, an interleaving method and a non-interleaving method are supported as a PDCCH transmission method. The base station may configure whether to perform interleaving or non-interleaving transmission for each control resource set for the UE through the upper layer signaling. The interleaving may be performed in the unit of an REG bundle. The REG bundle may be defined as one or a plurality of REG sets. The UE may determine a CCE-to-REG mapping method in the corresponding control resource set as the following method based on whether to perform interleaving or non-interleaving transmission configured by the base station.

TABLE 7

The CCE-to-REG mapping for a control-resource set can be interleaved or non-interleaved and is described by REG bundles:
- REG bundle i is defined as REGs $\{iL, iL + 1, \ldots, iL + L\ 1\}$ where L is the REG bundle size, $i = 0, 1, \ldots, N_{REG}^{CORESET}/L - 1$, and $N_{REG}^{CORESET} = N_{RB}^{CORESET} N_{symb}^{CORESET}$ is the number of REGs in the CORESET
- CCE j consists of REG bundles $\{f(6j/L), f(6j/L+1), \ldots, f(6j/L + 6/L - 1)\}$ where $f(.)$ is an interleaver For non-interleaved CCE-to-REG mapping, $L = 6$ and $f(x) = x$.
For interleaved CCE-to-REG mapping, $L \in \{2,6\}$ for $N_{symb}^{CORESET} = 1$ and $L \in \{N_{symb}^{CORESET}, 6\}$ for $N_{symb}^{CORESET} \in \{2,3\}$. The interleaver is defined by $$f(x) = (rC + c + n_{shift}) \bmod (N_{REG}^{CORESET}/L)$$
$$x = cR + r$$
$$r = 0, 1, \ldots, R - 1$$
$$c = 0, 1, \ldots, C - 1$$
$$C = N_{REG}^{CORESET}/(LR)$$

where $R \in \{2,3,6\}$.

In the basic unit of a downlink control channel, that is, in the REG, REs on which the DCI is mapped and areas on which demodulation reference signals (DMRSs) that are reference signals (RSs which can be mixed with the reference signals) for decoding the REs may be mixed with each other are included in all. In one REG, three DMRS REs may be included. The number of CCEs required to transmit the PDCCH may be 1, 2, 4, 8, or 16 depending on an aggregation level (AL), and the number of different CCEs may be used to implement link adaptation of the downlink control channel. For example, if the AL is AL=L, one downlink control channel may be transmitted through L CCEs.

The UE should detect a signal in a state where it does not know information on the downlink control channel, and a search space representing a set of CCEs for blind decoding has been defined. The search space is a set of downlink control channel candidates composed of CCEs that the UE should attempt to decode at a given aggregation level, and since there are several aggregation levels to make a bundle of 1, 2, 4, 8, or 16 CCEs, the UE may have a plurality of search spaces. The search space set may be defined as a set of search spaces at all aggregation levels.

The search space may be classified into a common search space and a UE-specific search space. In order to receive cell-common control information such as dynamic scheduling for system information or paging messages, UEs of a predetermined group or all UEs may check the common search space of PDCCH. For example, the UE may receive PDSCH scheduling assignment information for SIB transmission including business information of a cell by checking the PDCCH common search space. In case of the common search space, UEs of a predetermined group or all UEs should receive the PDCCH, and thus the common search space may be defined as a set of promised CCEs. The scheduling assignment information on the UE-specific PDSCH or PUSCH may be received by checking the PDCCH UE-specific search space. The UE-specific search space may be UE-specifically defined by the UE identity and various system parameter functions.

In the 5G system, parameters for the PDCCH search space may be configured from the base station to the UE through the upper layer signaling (e.g., SIB, MIB, and RRC signaling). For example, the base station may configure, to the UE, the number of PDCCH candidate groups at each aggregation level L, monitoring period of a search space, monitoring occasion in the unit of a symbol in a slot for a search space, search space type (common search space or UE-specific search space), combination of DCI format and RNTI intended to be monitored in a corresponding search space, and control resource set index intended to monitor a search space. For example, the parameters for the PDCCH search space may include pieces of information below.

TABLE 8

```
SearchSpace ::=                                   SEQUENCE {
Identity of the search space. SearchSpaceId = 0 identifies the SearchSpace configured
via PBCH (MIB) or ServingCellConfigCommon.
searchSpaceId                                     SearchSpaceId,
(Search space identity)
controlResourceSetId                              ControlResourceSetId,
(Control resource set identity)
monitoringSlotPeriodicityAndOffset   CHOICE {
(Monitoring slot level period)
sl1
   NULL,
sl2
   INTEGER (0..1),
sl4
   INTEGER (0..3),
sl5                                                                        INTEGER
(0..4),
sl8
   INTEGER (0..7),
sl10                                                                       INTEGER
(0..9),
sl16                                                                       INTEGER
(0..15),
sl20                                                                       INTEGER
(0..19)
```

TABLE 8-continued

```
}
Duration (Monitoring length)            INTEGER (2..2559)                OPTIONAL,
monitoringSymbolsWithinSlot             BIT STRING (SIZE
(14))
     OPTIONAL,
(Monitoring symbol in slot)
nrofCandidates                          SEQUENCE{
(the number of PDCCH candidate groups by aggregation levels)
aggregationLevel1                       ENUMERATED
{n0, n1, n2, n3, n4, n5, n6, n8},
aggregationLevel2                       ENUMERATED
{n0, n1, n2, n3, n4, n5, n6, n8},
aggregationLevel4                       ENUMERATED
{n0, n1, n2, n3, n4, n5, n6, n8},
aggregationLevel8                       ENUMERATED
{n0, n1, n2, n3, n4, n5, n6, n8},
aggregationLevel16                      ENUMERATED
{n0, n1, n2, n3, n4, n5, n6, n8}
},
searchSpaceType                         CHOICE {
(Search space type)
Configures this search space as common search space (CSS) and DCI formats to monitor.
common
    SEQUENCE {
(Common search space)
}
ue-Specific                             SEQUENCE
{
(UE-specific search space)
Indicates whether the UE monitors in this USS for DCI formats 0-0 and 1-0 or for formats
0-1 and 1-1.
formats
    ENUMERATED {formats0-0-And-1-0, formats0-1-And-1-1},
...
}
}
```

In accordance with configuration information, the base station may configure one or a plurality of search space sets to the UE. According to some embodiments, the base station may configure search space set 1 and search space set 2 to the UE. In search space set 1, the UE may be configured to monitor DCI format A scrambled by X-RNTI in a common search space, and in search space set 2, the UE may be configured to monitor DCI format B scrambled by Y-RNTI in a UE-specific search space.

In accordance with the configuration information, one or a plurality of search space sets may be present in the common search space or in the UE-specific search space. For example, search space set #1 and search space set #2 may be configured as the common search space, and search space set #3 and search space set #4 may be configured as the UE-specific search space.

In the common search space, the following combination of DCI format and RNTI may be monitored. Of course, the monitoring is not limited to the following example.
  DCI format 0_0/1_0 with CRC scrambled by C-RNTI, CS-RNTI, SP-CSI-RNTI, RA-RNTI, TC-RNTI, P-RNTI, and SI-RNTI
  DCI format 2_0 with CRC scrambled by SFI-RNTI
  DCI format 2_1 with CRC scrambled by INT-RNTI
  DCI format 2_2 with CRC scrambled by TPC-PUSCH-RNTI and TPC-PUCCH-RNTI
  DCI format 2_3 with CRC scrambled by TPC-SRS-RNTI In the UE-specific search space, the following combination of DCI format and RNTI may be monitored. Of course, the monitoring is not limited to the following example.
  DCI format 0_0/1_0 with CRC scrambled by C-RNTI, CS-RNTI, and TC-RNTI
  DCI format 1_0/1_1 with CRC scrambled by C-RNTI, CS-RNTI, and TC-RNTI The specified RNTIs may follow the following definition and purposes.
  C-RNTI (Cell RNTI): UE-specific PDSCH scheduling purpose
  TC-RNTI (Temporary Cell RNTI): UE-specific PDSCH scheduling purpose
  CS-RNTI (Configured Scheduling RNTI): Semi-statically configured UE-specific PDSCH scheduling purpose
  RA-RNTI (Random Access RNTI): PDSCH scheduling purpose at random access operation
  P-RNTI (Paging RNTI): PDSCH scheduling purpose on which paging is transmitted
  SI-RNTI (System Information RNTI): PDSCH scheduling purpose on which system information is transmitted
  INT-RNTI (Interruption RNTI): Purpose to notify whether PDSCH is punctured
  TPC-PUSCH-RNTI (Transmit Power Control for PUSCH RNTI): Purpose to indicate a power adjustment command for PUSCH
  TPC-PUCCH-RNTI (Transmit Power Control for PUCCH RNTI): Purpose to indicate a power adjustment command for PUCCH
  TPC-SRS-RNTI (Transmit Power Control for SRS RNTI): Purpose to indicate a power adjustment command for SRS The above specified DCI formats may follow the following definition.

TABLE 9

| DCI format | Usage |
| --- | --- |
| 0_0 | Scheduling of PUSCH in one cell |
| 0_1 | Scheduling of PUSCH in one cell |

TABLE 9-continued

| DCI format | Usage |
|---|---|
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G system, the search space at aggregation level L in control resource set p and a search space set s may be expressed as in the following mathematical expression.

$$L \cdot \left\{ \left( Y_{p,n_{s,f}^{\mu}} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p} / L \rfloor \right\} + i$$

[Mathematical expression 1]

L: Aggregation level
nCI: Carrier index
NCCE,p: Total number of CCEs being present in control resource set p
nµs,f: Slot index
M(L)p,s,max: the number of PDCCH candidate groups at aggregation level L
msnCI=0, . . . , M(L)p,s,max−1: PDCCH candidate group index at aggregation level L
i=0, . . . , L−1
$Y_{p,n_{s,f}^{\mu}} = (A_p \cdot Y_{p,n_{s,f}^{\mu}-1}) \mod D$, $Y_{p,-1} = n_{RNTI} \neq 0$, A0=39827, A1=39829, A2=39839, and D=65537
nRNTI: UE identifier
Y_(p,nµs,f) value may correspond to 0 in case of the common search space
Y_(p,nµs,f) value may correspond to a value that is changed in accordance with the UE identity (ID configured by C-RNTI or base station to UE) and a time index in case a UE-specific search space.

Hereinafter, a method for configuring a transmission configuration indication state (TCI state) that is means for quasi co-location (QCL) information indication or exchange between the UE and the base station in the 5G system will be described in detail.

The base station can notify of the QCL relationship between two different RSs or channels by configuring and instructing the TCI state between the different RSs or channels. A case that the different RSs or channels are QCLed means that the UE is allowed to apply some or all of large-scale channel parameters estimated from antenna port A to the channel measurement of antenna port B. It may be necessary that the QCL associates different parameters with each other in accordance with situations, such as 1) time tracking being affected by an average delay and a delay spread, 2) frequency tracking being affected by Doppler shift and Doppler spread, 3) radio resource management (RRM) being affected by an average gain, and 4) beam management (BM) being affected by a spatial parameter. Accordingly, in the NR, four types of QCL relationships as in Table 10 below are supported.

TABLE 10

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial reception parameter (spatial RX parameter) may generically name some or all of various parameters, such as angle of arrival (AoA), power angular spectrum (PAS) of AoA, angle of departure (AoD), PAS of AoD, transmit/receive channel correlation, transmit/receive beamforming, and spatial channel correlation.

It is possible that the QCL relationship is configured to the UE through an RRC parameter TCI-State and QCL-Info as in Table 11 below. With reference to Table 11, the base station may notify the UE of maximally two kinds of QCL relationships (qcl-Type1 and qcl-Type2) for an RS referring to an ID of the TCI state, that is, a target RS, by configuring one or more TCI states to the UE. In this case, each QCL information (QCL-Info) included in each TCI state includes a serving cell index and a BWP index of a reference RS indicated by the corresponding QCL information, a type and an TD of the reference RS, and a QCL type as in Table 10 above.

TABLE 11

| TCI-State::= | SEQUENCE { |
|---|---|
| tci-StateId | TCI-StateId, |
| (ID of corresponding TCI state) | |
| qcl-Type1 | QCL-Info, |
| (QCL information of first reference RS of target RS (RS) referring to corresponding TCI state ID) | |
| qcl-Type2 | QCL-Info |
| | OPTIONAL, -- Need R |
| (QCL information of second reference RS of target RS (RS) referring to corresponding TCI state ID) | |
| ... | |
| } | |
| QCL-Info ::= | SEQUENCE { |
| cell | ServCellIndex |
| | OPTIONAL, -- Need R |
| (Serving cell index of reference RS indicated by corresponding QCL information) | |
| bwp-Id | BWP-Id |
| | OPTIONAL, -- Cond CSI-RS-Indicated |
| (BWP index of reference RS indicated by corresponding QCL information) | |
| referenceSignal | CHOICE { |

TABLE 11-continued

```
csi-rs                                              NZP-CSI-RS-
ResourceId,
ssb                                                 SSB-Index
(One of CSI-RS ID or SSB ID indicated by corresponding BCL information)
},
qcl-Type                                            ENUMERATED
{typeA, typeB, typeC, typeD},
...
}
```

Hereinafter, time and frequency resource allocation methods in a 5G communication system will be described.

In the 5G communication system, in addition to frequency axis resource candidate allocation through BWP indication, the following detailed frequency domain resource allocation (FD-RA) may be provided. FIG. 6 is a diagram illustrating an example of PDSCH frequency axis resource allocation in a wireless communication system according to an embodiment of the disclosure.

FIG. 6 is a diagram illustrating three kinds of frequency axis resource allocation methods of type 0 600, type 1 605, and dynamic switch 610 being configurable through an upper layer in the NR.

With reference to FIG. 6, if the UE is configured to use only resource type 0 through upper layer signaling (6-00), some downlink control information (DCI) allocating PDSCH to the corresponding UE has a bitmap composed of NRBG bits. In this case, NRBG means the number of resource block groups (RBGs) that are determined as in Table 12 below in accordance with the BWP size allocated by the BWP indicator and the upper layer parameter rbg-Size, and by the bitmap, data is transmitted from the RBG indicated by 1.

TABLE 12

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

In case that the UE is configured to use only resource type 1 through upper layer signaling (605), some DCI allocating PDSCH to the corresponding UE may have frequency axis resource allocation information composed of $\lceil \log_2(N_{RB}^{DL,BWP}(N_{RB}^{DL,BWP}+1)/2)) \rceil$ bits. Conditions for this will be described again later. Through this, the base station may configure a starting virtual resource block (starting VRB) 620 and the length 625 of a frequency axis resource being successively allocated therefrom.

In case that the UE is configured to use both resource type 0 and resource type 1 through the upper layer signaling (610), some DCI allocating PDSCH to the corresponding UE may have frequency axis resource allocation information composed of bits of a larger value 635 among a payload 615 for configuring the resource type 0 and payloads 620 and 625 for configuring the resource type 1. Conditions for this will be described again later. In this case, one bit may be added to the most significant bit (MSB) of the frequency axis resource allocation information in the DCI, and if the corresponding bit is 0, it may be indicated that the resource type 0 is used, whereas if the corresponding bit is 1, it may be indicated that the resource type 1 is used.

FIG. 7 is a diagram illustrating an example of PDSCH time axis resource allocation in a wireless communication system according to an embodiment of the disclosure.

With reference to FIG. 7, the base station may indicate a time axis location of a PDSCH resource in accordance with subcarrier spacings (SCSs) PDSCH and PDCCH of a data channel and a control channel configured using an upper layer, a scheduling offset value K0, and an OFDM symbol start location 700 and length 705 in one slot 710 dynamically indicated through DCI.

FIG. 8 is a diagram illustrating an example of time axis resource allocation in accordance with subcarrier spacings of a data channel and a control channel in a 5G communication system according to an embodiment of the disclosure.

With reference to FIG. 8, if a data channel and a control channel have the same subcarrier spacing (800, μPDSCH=μPDCCH), the data channel and the control channel have the same slot number, and thus the base station and the UE may identify a scheduling offset to match a predetermined slot offset K0. In contrast, if the data channel and the control channel have different subcarrier spacings (805, μPDSCH≠μPDCCH), the data channel and the control channel have different slot numbers, and thus the base station and the UE may identify the scheduling offset to match the predetermined slot offset K0 based on the PDCCH subcarrier spacing.

In FIG. 8, although an offset interpreting method has been described for a case where the data channel and the control channel have the same subcarrier spacing or different subcarrier spacings, the offset interpretation is not limited to the above-described method, but may be applied even in case that the subcarrier spacings of different channels or reference signals are the same or different from each other, such as in a similar manner that the subcarrier spacings between the CSI-RS and the control channel or the subcarrier spacings between the SRS and the control channel are different from each other.

In the 5G communication system, for efficient control channel reception of the UE, various types of DCI formats as in Table 9 above are provided according to purposes.

For example, in order to schedule the PDSCH to one cell, the base station may use DCI format 0_0 or DCI format 0_1.

In case of being transmitted together with CRC scrambled by C-RNTI, CS-RNTI, or new-RNTI, the DCI format 0_1 may include at least the following information:

Identifier for DCI formats (1 bits): DCI format indicator that is always configured to 1

Frequency domain resource allocation (NRBG bits or $\lceil \log_2(N_{RB}^{DL,BWP}(N_{RB}^{DL,BWP}+1)/2)) \rceil$ bits): It indicates the frequency axis resource assignment, and in case that DCI format 1_0 is monitored in a UE-specific search space, $N_{RB}^{DL,BWP}$ denotes the size of the activated DL BWP, and otherwise, $N_{RB}^{DL,BWP}$ denotes the size of an initial DL BWP. NRBG denotes the numeral of the REG. For a detailed method, the frequency axis resource allocation is referred to.

Time domain resource assignment (0~4 bits): It indicates time axis resource allocation according to the above explanation.

VRB-to-PRB mapping (1 bit): In case of 0, it indicates non-interleaved VRP-to-PRB mapping, and in case of 1, it indicates interleaved VRP-to-PRB mapping.

Modulation and coding scheme (5 bits): It indicates a modulation order and a coding rate being used for PDSCH transmission.

New data indicator (1 bit): It indicates whether PDSCH is for an initial transmission or retransmission depending on toggle or not.

Redundancy version (2 bits): It indicates a redundancy version used for PDSCH transmission.

HARQ process number (4 bits): It indicates an HARQ process number used for PDSCH transmission.

Downlink assignment index (2 bits): DAI indicator

TPC command for scheduled PUCCH (2 bits): PUCCH power control indicator

PUCCH resource indicator (3 bits): It is a PUCCH resource indicator, and indicates one of 8 kinds of resources configured to an upper layer.

PDSCH-to-HARQ_feedback timing indicator (3 bits): It is an HARQ feedback timing indicator, and indicates one of 8 kinds of feedback timing offsets configured to an upper layer.

In case of being transmitted together with CRC scrambled by C-RNTI (or CS-RNTI or new-RNTI), the DCI format 1_1 includes at least the following information.

Identifier for DCI formats (1 bit): DCI format indicator that is always configured to 1

Carrier indicator (0 or 3 bits): It indicates a component carrier (CC or cell) on which PDSCH assigned by corresponding DCI is transmitted.

Bandwidth part indicator (0, 1, or 2 bits): It indicates a BWP on which PDSCH assigned by corresponding DCI is transmitted.

Frequency domain resource allocation (payload is determined in accordance with the frequency axis resource allocation): It indicates the frequency axis resource allocation, and $N_{RB}^{DL,BWP}$ denotes the size of an activated DL BWP. For a detailed method, the frequency axis resource assignment is referred to.

Time domain resource allocation (0 to 4 bits): In accordance with the above explanation, it indicates the time axis resource allocation.

VRB-to-PRB mapping (0 or 1 bit): In case of 0, it indicates non-interleaved VRP-to-PRB mapping, whereas in case of 1, it indicates interleaved VRP-to-PRB mapping. In case that the frequency axis resource allocation is configured to resource type 0, it is 0 bit.

PRB bundling size indicator (0 or 1 bit): In case that an upper layer parameter prb-BundlingType is not configured, or is configured to "static", it is 0 bit, whereas in case that it is configured to "dynamic", it is 1 bit.

Rate matching indicator (0 or 1 or 2 bits): It indicates a rate matching pattern.

ZP CSI-RS trigger (0 or 1 or 2 bits): Indicator that triggers an aperiodic zero-power channel state information reference signal (aperiodic ZP CSI-RS)

For transport block 1:

Modulation and coding scheme (5 bits): It indicates a modulation order and a coding rate being used for PDSCH transmission.

New data indicator (1 bit): It indicates whether PDSCH is for an initial transmission or retransmission depending on toggle or not.

Redundancy version (2 bits): It indicates a redundancy version used for PDSCH transmission.

For transport block 2:

Modulation and coding scheme (5 bits): It indicates a modulation order and a coding rate being used for PDSCH transmission.

New data indicator (1 bit): It indicates whether PDSCH is for an initial transmission or retransmission depending on toggle or not.

Redundancy version (2 bits): It indicates a redundancy version used for PDSCH transmission.

HARQ process number (4 bits): It indicates an HARQ process number used for PDSCH transmission.

Downlink assignment index (0 or 2 or 4 bits): Downlink assignment index (DAI) indicator TPC command for scheduled PUCCH (2 bits): PUCCH power control indicator PUCCH resource indicator (3 bits): PUCCH resource indicator that indicates one of 8 kinds of resources configured to an upper layer.

PDSCH-to-HARQ_feedback timing indicator (3 bits): HARQ feedback timing indicator that indicates one of 8 kinds of feedback timing offsets configured to an upper layer.

Antenna port (4 or 5 or 6 bits): It indicates a DMRS port and a code division multiplexing (CDM) group without data.

Transmission configuration indication (0 or 3 bits): TCI indicator

SRS request (2 or 3 bits): SRS transmission request indicator

CBG transmission information (0 or 2 or 4 or 6 or 8 bits): Indicator that notifies whether to transmit code block groups (CBGs) in assigned PDSCH. 0 means that the corresponding CBG is not transmitted, and 1 means that the CBG is transmitted.

CBG flushing out information (0 or 1 bit): Indicator that notifies whether previous CBGs are polluted. 0 means that the CBG may be polluted, and 1 means that the CBG is combinable when the retransmission is received.

DMRS sequence initialization (0 or 1 bit): DMRS scrambling ID selection indicator The maximum number of DCIs having different sizes that are receivable per slot by the UE in the corresponding cell is 4. The maximum number of DCIs having different sizes that are scrambled by C-RNTI being receivable per slot by the UE in the corresponding cell is 3.

Here, antenna port indication may be indicated through the following Table 13 to Table 16. Table 13 represents a case of antenna port(s) (1000+DMRS port), dmrs-Type=1, and maxLength=1; Table 14 represents a case of antenna port(s) (1000+DMRS port), dmrs-Type=1, and maxLength=2; Table 15 represents a case of antenna port(s) (1000+DMRS port), dmrs-Type=2, and maxLength=1; and Table 16 represents a case of antenna port(s) (1000+DMRS port), dmrs-Type=2, and maxLength=2.

TABLE 13

| | One Codeword: Codeword 0 enabled, Codeword 1 disabled | |
|---|---|---|
| Value | Number of DMRS CDM group(s) without data | DMRS port(s) |
| 0 | 1 | 0 |
| 1 | 1 | 1 |
| 2 | 1 | 0,1 |
| 3 | 2 | 0 |
| 4 | 2 | 1 |
| 5 | 2 | 2 |
| 6 | 2 | 3 |
| 7 | 2 | 0,1 |
| 8 | 2 | 2,3 |
| 9 | 2 | 0-2 |
| 10 | 2 | 0-3 |
| 11 | 2 | 0,2 |
| 12-15 | Reserved | Reserved |

TABLE 15

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0,1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0,1 | | | |
| 8 | 2 | 2,3 | | | |
| 9 | 2 | 0-2 | | | |
| 10 | 2 | 0-3 | | | |
| 11 | 3 | 0 | | | |
| 12 | 3 | 1 | | | |

TABLE 14

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

TABLE 15-continued

| One codeword: Codeword 0 enabled, Codeword 1 disabled | | | Two codewords: Codeword 0 enabled, Codeword 1 enabled | | |
|---|---|---|---|---|---|
| Value | Humber of DMRS CDM group(s) without data | DMRS port(s) | Value | Number of DMRS CDM group(s) without data | DMRS port(s) |
| 13 | 3 | 2 | | | |
| 14 | 3 | 3 | | | |
| 15 | 3 | 4 | | | |
| 16 | 3 | 5 | | | |
| 17 | 3 | 0,1 | | | |
| 18 | 3 | 2,3 | | | |
| 19 | 3 | 4,5 | | | |
| 20 | 3 | 0-2 | | | |
| 21 | 3 | 3-5 | | | |
| 22 | 3 | 0-3 | | | |
| 23 | 2 | 0,2 | | | |
| 24-31 | Reserved | Reserved | | | |

TABLE 16

| One codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |

TABLE 16-continued

| | One codeword: Codeword 0 enabled, Codeword 1 disabled | | | Two Codewords: Codeword 0 enabled, Codeword 1 enabled | | |
|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 48 | 1 | 0 | 2 | | | | |
| 49 | 1 | 1 | 2 | | | | |
| 50 | 1 | 8 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

In tables, numerals 1, 2, and 3 indicated by the number of DMRS CDM group(s) without data mean respective CDM groups {0}, {0, 1}, and {0, 1, 2}. The DMRS port(s) may describe indexes of ports being used in order. The antenna port is indicated as DMRS port+1000. The CDM group of DMIRS is connected to a method for generating a DMRS sequence and antenna ports as in Tables 17 and 18. Table 17 represents parameters in case of using dmrs-type=1, and Table 18 describes parameters in case of using dmrs-type=2.

TABLE 17

| | CDM | | $w_f(k')$ | | $w_t(l')$ | |
|---|---|---|---|---|---|---|
| p | group λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 18

| | CDM | | $w_f(k')$ | | $w_t(l')$ | |
|---|---|---|---|---|---|---|
| p | group λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

The DMRS sequence according to respective parameters is determined by the following Mathematical expression 2.

$$a_{k,l}^{(p,\mu)} = \beta_{PDSCH}^{DMRS} w_f(k') w_t(l') r(2n + k')$$ [Mathematical expression 2]

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

FIG. 9 is a diagram illustrating a wireless protocol structure of a base station and a UE in case of performing single cell, carrier aggregation (CA), and dual connectivity (DC) according to an embodiment of the disclosure.

With reference to FIG. 9, a wireless protocol of a next-generation mobile communication system is composed of an NR service data adaptation protocol (SDAP) 925 and 970, an NR packet data convergence protocol (PDCP) 930 and 965, an NR radio link control (RLC) 935 and 960, and an NR medium access control (MAC) 940 and 955 in the UE and the NR base station, respectively.

The main function of the NR SDAP 925 and 970 may include some of the following functions.
 transfer of user plane data
 mapping between a QoS flow and a data bearer (DRB) for both UL and DL
 marking QoS flow ID in both UL and DL packets
 reflective QoS flow to data bearer (DRB) mapping for the UL SDAP PDUs With respect to the SDAP layer device, the UE may be configured whether to use a header of the SDAP layer device or whether to use the function of the SDAP layer device by PDCP layer devices, by bearers, or by logical channels through an RRC message. In case that the SDAP header is configured, the base station may instruct the UE to update or reconfigure mapping information on uplink and downlink QoS flow and data bearer by a NAS QoS reflection configuration 1-bit indicator (NAS reflective QoS) and an AS QoS reflection configuration 1-bit indicator (AS reflective QoS) of the SDAP header. The SDAP header may include QoS flow ID information representing QoS. The QoS information may be used as data processing priority for supporting smooth servicing and scheduling information.

The main function of the NR PDCP 930 and 965 may include some of the following functions.

Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink As described above, the reordering of the NR PDCP device means reordering of the PDCP PDUs received from a lower layer in order based on the PDCP sequence number (SN), and may include transferring of data to an upper layer in a rearranged order, or may include direct transferring of the data without considering the order, or may include recording of lost PDCP PDUs through the reordering, or may include reporting of states of the lost PDCP PDUs to the transmission side, or may include requesting of retransmission of the lost PDCP PDUs.

The main function of the NR RLC 935 and 960 may include some of the following functions.

Transfer of upper layer PDUs
In-sequence delivery of upper layer PDUs
Out-of-sequence delivery of upper layer PDUs
Error correction through ARQ
Concatenation, segmentation, and reassembly of RLC SDUs
Re-segmentation of RLC data PDUs
Reordering of RLC data PDUs
Duplicate detection
Protocol error detection
RLC SDU discard
RLC re-establishment As described above, the in-sequence delivery of the NR RLC device may mean transferring of RLC SDUs received from a lower layer to an upper layer in order, and in case that one original RLC SDU is segmented into several RLC SDUs to be received, it may include reassembling and transferring of the RLC SDUs, may include reordering of the received RLC PDUs based on an RLC sequence number (SN) or a PDCP sequence number (SN), may include recording of lost RLC PDUs through reordering, may include performing of state report for the lost RLC PDUs to a transmission side, may include requesting for retransmission of the lost RLC PDUs, may include transferring of only RLC SDUs just before the lost RLC SDU to the upper layer in order in case there is the lost RLC SDU, may include transferring of all RLC SDUs received before a specific timer starts to the upper layer in order in case that the timer expires although there is the lost RLC SDU, or may include transferring of all RLC SDUs received up to now to the upper layer in order in case that the specific timer expires although there is the lost RLC SDU. Further, the NR RLC device may process the RLC PDUs in the order of their reception (regardless of the serial number or sequence number, and in the order of arrivals), and may transfer the processed RLC PDUs to the PDCP device in an out-of-sequence delivery manner, and in case that the received RLC PDU is segments, the NR RLC device may receive the segments stored in a buffer or to be received later, reconfigure them as one complete RLC PDU, and then process and transfer the reconfigured RLC PDU to the PDCP device. The NR RLC layer may not include a concatenation function, and the function may be performed by an NR MAC layer or may be replaced by a multiplexing function of the NR MAC layer.

As described above, the out-of-sequence delivery of the NR RLC device may mean a function of transferring the RLC SDUs received from the lower layer directly to the upper layer regardless of their order, and if one original RLC SDU is segmented into several RLC SDUs to be received, the out-of-sequence delivery of the NR RLC device may include reassembly and delivery of the RLC SDUs, and may include functions of storing and ordering the RLC SNs or PDCP SNs of the received RLC PDUs and recording of the lost RLC PDUs.

The NR MAC 940 and 955 may be connected to several NR RLC layer devices configured in one UE, and the main functions of the NR MAC may include some of the following functions.

Mapping between logical channels and transport channels
Multiplexing/demultiplexing of MAC SDUs
Scheduling information reporting
HARQ function (error correction through HARQ)
Priority handling between logical channels of one UE
Priority handling between UEs by means of dynamic scheduling
MBMS service identification
Transport format selection
padding The NR PHY layer 945 and 950 may perform channel coding and modulation of upper layer data to configure and transmit OFDM symbols on a radio channel, or may perform demodulation and channel decoding of the OFDM symbols received on the radio channel to transfer the demodulated and channel-decoded symbols to the upper layer.

The radio protocol structure may be variously changed in accordance with a carrier (or cell) operation method. As an example, in case that the base station transmits data to the UE based on a single carrier (or cell), the base station and the UE use the protocol structure having a single structure for each layer as denoted by 900. In contrast, in case that the base station transmits data to the UE based on carrier aggregation using a multi-carrier at a single transmission and reception point (TRP), the base station and the UE have a single structure until the RLC as denoted by 910, but use the protocol structure multiplexing a PHY layer through a MAC layer. As another example, in case that the base station transmits data to the UE based on dual connectivity (DC) using the multi-carrier at the multi-TRP, the base station and the UE have a single structure until the RLC as denoted by 920, but use the protocol structure multiplexing the PHY layer through the MAC layer.

In an LTE and NR system, the UE has a procedure of reporting capability supported by the UE to the corresponding base station in a state where the UE is connected to the base station. In the following description, this is referred to as UE capability (report). The base station may transfer a UE capability enquiry message for requesting the capability report to the UE in a connected state. The message may include a UE capability request for each radio access technology (RAT) type from the base station. The request for the RAT type may include frequency band information for requesting the UE capability. Further, the UE capability enquiry message may enable one RRC message container to request a response for a plurality of RAT types, or the base station may include the UE capability enquiry message including the request for each RAT type multiple times, and may transfer the message to the UE. That is, the UE capability enquiry is repeated multiple times, and the UE may configure and report multiple times the corresponding UE capability information message. In the next-generation mobile communication system, the UE capability enquiry request for multi-RAT DC (MR-DC) including NR, LTE, and EN-DC may be performed. For reference, although it is general to initially send the UE capability enquiry message after the UE establishes the connection, the base station may request the message even on any condition when needed.

At the above operation, the UE having received the UE capability report request from the base station configures the UE capability in accordance with the RAT type and band information requested from the base station. Hereunder, a method in which the UE configures the UE capability in an NR system has been summarized.

1. If the UE is provided with a list of LTE and/or NR bands from the base station through the UE capability request, the UE configures a band combination (BC) for an EN-DC and NR stand alone (SA). That is, the UE configures a BC candidate list for the EN-DC and NR SA based on the bands requested by FreqBandList from the base station. Further, the band has a priority in the order of description in the FreqBandList.

2. If the base station has requested the UE capability report by setting an "eutra-nr-only" flag or an "eutra" flag, the UE completely removes things related to the NR, SA, and BC in the BC candidate list configured as above. Such an operation may be performed only in case that the LTE base station (eNB) requests the "eutra" capability.

3. Thereafter, the UE removes fallback BCs from the BC candidate list configured at the above-described operation. Here, the fallback BC corresponds to a case where the band corresponding to at least one SCell is removed from a certain super set BC, and since the super set BC has already covered the fallback BC, it can be omitted. This operation is also applied even to the MR-DC, that is, LTE bands are also applied. The BC remaining after this operation is the final "candidate BC list".

4. The UE selects the BCs to select and report the BCs to fit the RAT type requested from the final "candidate BC list". At this operation, the UE configures supportedBandCombinationList in a determined order. That is, the UE configures the BC and the UE capability to be reported to match the order of the predetermined rat-Type (nr-eutra-nr-eutra). Further, the UE configures featureSetCombination for the configured supportedBandCombinationList, and configures a list of "candidate feature set combination" in the candidate BC list from which the list for the fallback BC (including capability at the same or lower operation) has been removed. The above "candidate feature set combination" may include all feature set combination for NR and EUTRA-NR BC, and may be obtained from the feature set combination of UE-NR-Capabilities and UE-MRDC-Capabilities container.

5. Further, if the requested ratType is eutra-nr, and exerts an influence, the featureSetCombinations is included in two containers of UE-MRDC-Capabilities and UE-NR-Capabilities in all. However, the feature set of the NR is included only in the UE-NR-Capabilities.

After the UE capability is configured, the UE transfers the UE capability information message including the UE capability to the base station. Thereafter, the base station performs scheduling and transmission/reception management suitable for the corresponding UE based on the UE capability received from the UE.

In the NR, a channel state information reference signal (CSI-RS) is supported as a reference signal for UE's channel state report, and respective CSI-RS resource configurations configured by the upper layer may include at least the following detailed configuration information. However, configuration information is not limited to the following example.

NZP-CSI-RS-Resource ConfigID: ID of corresponding CSI-RS resource configuration

NrofPorts: the number of CSI-RS ports included in the corresponding CSI-RS resource CSI-RS-timeConfig: transmission period and slot offset of the corresponding CSI-RS resource CSI-RS-ResourceMapping: OFDM symbol location in a slot of the corresponding CSI-RS resource and subcarrier location in the PRB CSI-RS-Density: frequency density of the corresponding CSI-RS CDMType: CDM length and CDM RE pattern of the corresponding CSI-RS CSI-RS-FreqBand: transmission bandwidth and start location of the corresponding CSI-RS Pc: ratio between PDSCH EPRE (energy per RE) and NZP CSI-RS EPRE Pc-SS: ratio between SS/PBCH block EPRE and NZP CSI-RS EPRE CSI-RS-ResourceRep: NZP CSI-RS resources belonging to one resource set interlock with each other. If CSI-RS-ResourceRep is "ON", the UE can know that all the same spatial domain transmission filters are applied to the NZP CSI-RS resource belonging to the resource set (i.e., the UE is able to assume that the base station has used the same transmission beam). Hereinafter, the transmission beam may means a transmission signal having directivity, and this may be mixed with application of the spatial domain transmission filter), and respective NZP CSI-RS resources have the same number of CSI-RS ports and the same periodicity. If the CSI-RS-ResourceRep is "OFF", the UE is unable to assume that all the same spatial domain transmission filters are applied to the NZP CSI-RS resource belonging to the resource set (i.e., the UE is unable to assume that the base station has used the same transmission beam), and is unable to assume that respective NZP CSI-RS resources have the same number of CSI-RS ports and the same periodicity.

According to some embodiments, In the NR, one CSI-RS port number among {1, 2, 4, 8, 12, 16, 24, 32} may be configured to one CSI-RS resource, and different configuration degrees of freedom are supported in accordance with the number of CSI-RS ports being configured to the CSI-RS resource. Table 19 represents CSI-RS density being configurable in accordance with the number X of NR CSI-RS ports, CDM length and type, frequency axis of a CSI-RS component RE pattern and time axis start location ($\bar{k}$, $\bar{l}$), and the frequency axis RE number (k') and time axis RE number (l') of the CSI-RS component RE pattern.

According to some embodiments, the CSI-RS component RE pattern is the basic unit configuring the CSI-RS resource, and may be composed of total YZ REs including (Y=1+max(k')) REs adjacent to the frequency axis and (Z=1+max (l')) REs adjacent to the time axis. With reference to Table 19, in the NR, different frequency axis configuration degrees of freedom are supported in accordance with the number of CSI-RS ports being configured to the CSI-RS resources.

FIG. 10 illustrates designation of CSI-RS RE by CSI-RS resource mapping according to some embodiments. With reference to FIG. 10, FIG. 10 is a diagram illustrating an example of CSI-RE designation by CSI-RS-ResourceMapping being configured by an upper layer. In case that the CSI-RS is 1 port, it is possible to configure the CSI-RS without limiting subcarriers in a PRB, and the UE may be designated with CSI-RE location by a 12-bit bitmap (1000). In case of {2, 4, 8, 12, 16, 24, 32} ports and Y=2, it is possible that the CSI-RS is configured every two subcarriers in the PRB, and the UE may be designated with the CSI-RS RE location by a 6-bit bitmap (1005). In case of 4 ports and Y=4, it is possible that the CSI-RS is configured every four subcarriers in the PRB, and the UE may be designated with the CSI-RS RE location by a 3-bit bitmap (1010). In a similar manner, in case of a time axis RE location, it is possible that the UE is designated with the CSI-RS by a bitmap of total 14 bits. In this case, although the length of the bitmap can be changed like the frequency location designation in accordance with a value of Z of Table 19 (CSI-RS locations within a slot), the detailed explanation thereof will be omitted since the principle is similar to that as described above.

ment, there may be side effects, such as consumption of the UE power for unnecessary CSI generation or waste of uplink resources for unnecessary CSI report.

Hereinafter, a method for channel state measurement and channel state report in a 5G communication system will be described in detail.

The channel state information (CSI) may include channel quality information (CQI), precoding matric indicator (PMI), CSI-RS resource indicator (CRI), SS/PBCH block resource indicator (SSBRI), layer indicator (LI), rank indicator (RI), and/or L1-RSRP(reference signal received power

TABLE 19

| Row | Ports X | Density $\rho$ | cdm-Type | $(\bar{k}, \bar{l})$ | CDM group index j | k' | l' |
|---|---|---|---|---|---|---|---|
| 1 | 1 | 3 | noCDM | $(k_0, l_0)$ $(k_0 + 4, l_0)$ $(k_0 + 8, l_0)$ | 0, 0, 0 | 0 | 0 |
| 2 | 1 | 1, 0.5 | noCDM | $(k_0, l_0)$, | 0 | 0 | 0 |
| 3 | 2 | 1, 0.5 | fd-COM2 | $(k_0, l_0)$, | 0 | 0, 1 | 0 |
| 4 | 4 | 1 | fd-CDM2 | $(k_0, l_0), (k_0, + 2, l_0)$ | 0, 1 | 0, 1 | 0 |
| 5 | 4 | 1 | fd-CDM2 | $(k_0, l_0), (k_0 + l_0 + 1)$ | 0, 1 | 0, 1 | 0 |
| 6 | 8 | 1 | fa-CDM2 | $(k_0, l_0), (k_1, l_0), (k_2, l_0), (k_3, l_0)$ | 0, 1, 2, 3 | 0, 1 | 0 |
| 7 | 8 | 1 | fd-CDM2 | $(k_0, l_0), (k_1, l_0)$, $(k_0 + l_0 + 1), (k_1 + l_0 + 1)$ | 0, 1, 2, 3 | 0, 1 | 0 |
| 8 | 8 | 1 | cdm4-FD2-TD2 | $(k_0, l_0), (k_1, l_0)$ | 0, 1 | 0, 1 | 0, 1 |
| 9 | 12 | 1 | fd-COM2 | $(k_0, l_0), (k_1, l_0), (k_2, l_0)$, $(k_3, l_0), (k_4, l_0), (k_5, l_0)$ | 0, 1, 2, 3, 4, 5 | 0, 1 | 0 |
| 10 | 12 | 1 | cdm4-FD2-TD2 | $(k_0, l_0), (k_1, l_0), (k_2, l_0)$ | 0, 1, 2 | 0, 1 | 0, 1 |
| 11 | 16 | 1, 0.5 | fd-CDM2 | $(k_0, l_0), (k_1, l_0), (k_2, l_0), (k_3, l_0)$, $(k_0 + l_0 + 1), (k_1 + l_0 + 1)$, $(k_2 + l_0 + 1), (k_3 + l_0 + 1)$ | 0, 1, 2, 3, 4, 5, 6, 7 | 0, 1 | 0 |
| 12 | 16 | 1, 0.5 | cdm4-FD2-TD2 | $(k_0, l_0), (k_1, l_0), (k_2, l_0), (k_3, l_0)$, | 0, 1, 2, 3 | 0, 1 | 0, 1 |
| 13 | 24 | 1, 0.5 | fd-CDM2 | $(k_0, l_0), (k_1, l_0), (k_2, l_0)$, $(k_0 + l_0 + 1), (k_1 + l_0 + 1)$, $(k_2 + l_0 + 1)$, $(k_0, l_1), (k_1, l_1), (k_2, l_1)$, $(k_0 + l_1 + 1), (k_1 + l_1 + 1)$, $(k_2 + l_1 + 1)$ | 0, 1, 2, 3, 4, 5, 6, 7, 8, 9, 10, 11 | 0, 1 | 0 |
| 14 | 24 | 1, 0.5 | cdm4-FD2-TD2 | $(k_0, l_0), (k_1, l_0), (k_2, l_0)$, $(k_0, l_1), (k_1, l_1), (k_2, l_2)$ | 0, 1, 2, 3, 4, 5 | 0, 1 | 0, 1 |
| 15 | 24 | 1, 0.5 | cdm8-FD2-TD4 | $(k_0, l_0), (k_1, l_0), (k_2, l_0)$ | 0, 1, 2 | 0, 1 | 0, 1, 2, 3 |
| 16 | 32 | 1, 0.5 | fd-CDM2 | $(k_0, l_0), (k_1, l_0), (k_2, l_0), (k_3, l_0)$, $(k_0 + l_0 + 1), (k_1 + l_0 + 1)$, $(k_2 + l_0 + 1), (k_3 + l_0 + 1)$, $(k_0, l_1), (k_1, l_1), (k_2, l_1), (k_2, l_2)$ $(k_0 + l_1 + 1), (k_1 + l_1 + 1)$, $(k_2 + l_1 + 1), (k_3 + l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | cdm4-FD2-TD2 | $(k_0, l_0), (k_1, l_0), (k_2, l_0), (k_3, l_0)$, $(k_0, l_1), (k_1, l_1), (k_2, l_1), (k_3, l_1)$ | 0, 1, 2, 3, 4, 5, 6, 7 | 0, 1 | 0, 1 |
| 18 | 32 | 1, 0.5 | cdm8-FD2-TD4 | $(k_0, l_0), (k_1, l_0), (k_2, l_0), (k_3, l_0)$ | 0, 1, 2, 3 | 0, 1 | 0, 1, 2, 3 |

As an example, in case that X=2 port is configured, the base station may designate the frequency axis RE location by operation 1005, and if the base station designates the frequency axis subcarrier location by operation 2 of 1005 and designates the time axis OFDM symbol location by operation 9 of 1015, the UE can know that the CSI-RS is transmitted at the RE location of operation 1025 in the corresponding PRB 1020.

As described above, in the NR system, the base station may configure the CSI-RS to the UE in order to provide other functions, such as mobility or time/frequency tracking, in addition to the CSI measurement. Meanwhile, in case that reporting setting is configured to the CSI-RSs being configured for other functions in addition to the CSI-RS measure- (L1-RSRP). The base station may control time and frequency resources for the above-described UE CSI measurement and report.

For the above-described CSI measurement and report, the UE may be configured with setting information (CSI-ReportConfig) for N(≥1) CSI reports, setting information (CSI-ResourceConfig) for M(≥1) RS transmission resources, and one or two trigger state (CSI-AperiodicTriggerStateList and CSI-SemiPersistentOnPUSCH-TriggerStateList) list information through upper layer signaling.

More specifically, configuration information for the above-described CSI measurement and report may be as follows described in Table 20 to Table 26.

TABLE 20

CSI-ReportConfig
The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214 [19], clause 5.2.1.

CSI-ReportConfig information element

```
-- ASN1START
-- TAG-CSI-REPORTCONFIG-START
CSI-ReponConfig ::=                           SEQUENCE {
  reportConfigId                                CSI-ReportConfigId,
  carrier                                       ServCellIndex                     OPTIONAL,   -- Need S
  resourcesForChannelMeasurement                CSI-ResourceConfigId,
  csi-IM-ResourcesForInterference               CSI-ResourceConfigId              OPTIONAL,
-- Need R
  nzp-CSI-RS-ResourcesForInterference           CSI-ResourceConfigId              OPTIONAL,
-- Need R
  reportConfigType                              CHOICE {
    periodic                                      SEQUENCE {
      reportSlotConfig                              CSI-ReportPeriodicityAndOffset,
      pucch-CSI-ResourceList                        SEQUENCE (SIZE
(1..maxNrofBWPs)) OF PUCCH-CSI-Resource
    },
    semiPersistentOnPUCCH                         SEQUENCE {
      reportSlotConfig                              CSI-ReportPeriodicityAndOffset,
      pucch-CSI-ResourceList                        SEQUENCE (SIZE
(1..maxNrofBWPs)) OF PUCCH-CSI-Resource
    },
    semiPersistentOnPUSCH                         SEQUENCE {
      reportSlotConfig                              ENUMERATED {sl5, sl10, sl20,
sl40, sl80, sl160, sl320},
      reportSlotOffsetList                          SEQUENCE (SIZE (1.. maxNrofUL-
Allocations)) OF INTEGER(0..32),
      p0alpha                                       P0-PUSCH-AlphaSetId
    },
    aperiodic                                     SEQUENCE {
      reportSlotOffsetList                          SEQUENCE (SIZE (1..maxNrofUL-
Allocations)) OF INTEGER(0..32)
    }
  },
  reportQuantity                                CHOICE {
    none                                          NULL,
    cri-RI-PMI-CQI                                NULL,
    cri-RI-i1                                     NULL
    cri-RI-i1-CQI                                 SEQUENCE {
      pdsch-BundleSizeForCSI                        ENUMERATED {n2, n4}
OPTIONAL   -- Need S
    },
    cri-RI-CQI                                    NULL,
    cri-RSRP                                      NULL,
    ssb-Index-RSRP                                NULL,
    cri-RI-LI-PMI-CQI                             NULL
  },
  reportFreqConfiguration                       SEQUENCE{
    cqi-FormatIndicator                           ENUMERATED { widebandCQI,
subbandCQI }                                    OPTIONAL,   -- Need R
    pmi-FormatIndicator                           ENUMERATED { widebandPMI,
subbandPMI }                                    OPTIONAL,   -- Need R
    csi-ReportingBand                             CHOICE {
      subbands3                                     BIT STRING(SIZE(3))
      subbands4                                     BIT STRING(SIZE(4)),
      subbands5                                     BIT STRING(SIZE(5)),
      subbands6                                     BIT STRING(SIZE(6)),
      subbands7                                     BIT STRING(SIZE(7)),
      subbands8                                     BIT STRING(SIZE(8)),
      subbands9                                     BIT STRING(SIZE(9)),
      subbands10                                    BIT STRING(SIZE(10)),
      subbands11                                    BIT STRING(SIZE(11)),
      subbands12                                    BIT STRING(SIZE(12)),
      subbands13                                    BIT STRING(SIZE(13)),
      subbands14                                    BIT STRING(SIZE(14)),
```

TABLE 20-continued

CSI-ReportConfig
The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214 [19], clause 5.2.1.

```
        subbands15                          BIT STRING(SIZE(15)),
        subbands16                          BIT STRING(SIZE(16)),
        subbands17                          BIT STRING(SIZE(17)),
        subbands18                          BIT STRING(SIZE(18)),
        ...,
        subbands19-v1530                    BIT STRING(SIZE(19))
    }   OPTIONAL  -- Need S
    }
OPTIONAL,   -- Need R
    timeRestrictionForChannelMeasurements   ENUMERATED (configured,
notConfigured},
    timeRestrictionForInterferenceMeasurements   ENUMERATED {configured,
notConfigured},
    codebookConfig                          CodebookConfig
OPTIONAL,   -- Need R
    dummy                                   ENUMERATED {n1, n2}
OPTIONAL,   -- Need R
    groupBasedBeamReporting                 CHOICE {
        enabled                                 NULL,
        disabled                                SEQUENCE {
            nrofReportedRS                          ENUMERATED{n1, n2, n3, n4}
OPTIONAL   -- Need S
        }
    },
    cqi-TABLE                               ENUMERATED {table1, table2, table3, spare1}
OPTIONAL,   -- Need R
    subbandSize                             ENUMERATED {value1, value2},
    non-PMI-PortIndication                  SEQUENCE (SIZE (1 ..maxNrotNZP-CSI-RS-
ResourcesPerConfig)) OF PortIndexForSRanks  OPTIONAL,   -- Need R
    ...,
    [[                                      SEQUENCE {
    semiPersistentOnPUSCH-v1530                 ENUMERATED {sl4, sl8, sl16}
        reportSlotConfig-v1530
    }
OPTIONAL   -- Need R
    ]]
}
CSI-ReportPeriodicityAndOffset ::=       CHOICE {
    slots4                                      INTEGER(0..3),
    slots5                                      INTEGER(0..4),
    slots8                                      INTEGER(0..7),
    slots10                                     INTEGER(0..9),
    slots16                                     INTEGER(0..15),
    slots20                                     INTEGER(0..19),
    slots40                                     INTEGER(0..39).
    slots80                                     INTEGER(0..79),
    slots160                                    INTEGER(0..159),
    slots320                                    INTEGER(0..319)
}
PUCCH-CSI-Resource ::=                   SEQUENCE {
    uplinkBandwidthPartId                    BWP-Id,
    pucch-Resource                           PUCCH-ResourceId
}
PortIndexFor8Ranks ::=                   CHOICE {
    portIndex8                                  SEQUENCE{
        rank1-8                                     PortIndex8
OPTIONAL,   -- Need R
        rank2-8                                     SEQUENCE(SIZE(2)) OF PortIndex8
OPTIONAL,   -- Need R
        rank3-8                                     SEQUENCE(SIZE(3)) OF PortIndex8
OPTIONAL,   -- Need R
        rank4-8                                     SEQUENCE(SIZE(4)) OF PortIndex8
OPTIONAL,   -- Need R
        rank5-8                                     SEQUENCE(SIZE(5)) OF PortIndex8
OPTIONAL,   -- Need R
        rank6-8                                     SEQUENCE(SIZE(6)) OF PortIndex8
OPTIONAL,   -- Need R
        rank7-8                                     SEQUENCE(SIZE(7)) OF PortIndex8
OPTIONAL,   -- Need R
        rank8-8                                     SEQUENCE(SIZE(8)) OF PortIndex8
OPTIONAL   -- Need R
    },
    portIndex4                                  SEQUENCE{
        rank1-4                                     PortIndex4
```

TABLE 20-continued

CSI-ReportConfig
The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214 [19], clause 5.2.1.

```
OPTIONAL,    -- Need R
    rank2-4                    SEQUENCE(SIZE(2)) OF PortIndex4
OPTIONAL,    -- Need R
    rank3-4                    SEQUENCE(SIZE(3)) OF PortIndex4
OPTIONAL,    -- Need R
    rank4-4                    SEQUENCE(SIZE(4)) OF PortIndex4
OPTIONAL     -- Need R
    },
    portIndex2                 SEQUENCE{
        rank1-2                    PortIndex2
OPTIONAL,    -- Need R
        rank2-2                    SEQUENCE(SIZE(2)) OF PortIndex2
OPTIONAL     -- Need R
    },
    portIndex1                 NULL
}
PortIndex8::=                  INTEGER (0..7)
PortIndex4::=                  INTEGER (0..3)
PortIndex2::=                  INTEGER (0..1)
-- TAG-CSI-REPORTCONFIG-STOP
-- ASN1STOP
```

CSI-ReportConfig field descriptions
carrier: Indicates in which serving cell the CSI-ResourceConfig indicated below are to be found. If the field is absent, the resources are on the same serving cell as this report configuration.
codebookConfig: Codebook configuration for Type-1 or Type-II including codebook subset restriction.
cqi-FormatIndicator: Indicates whether the UE shall report a single (wideband) or multiple (subband) CQI. (see TS 38.214 [19], clause 5.2.1.4).
cqi-Table: Which CQI table to use for CQI calculation (see TS 38.214 [19], clause 5.2.2.1).
csi-IM-ResourcesForInterference: CSI IM resources for interference measurement. csi-ResourceConfigId of a CSI-ResourceConfig included in the configuration of the serving cell indicated with the field "carrier" above. The CSI-ResourceConfig indicated here contains only CSI-IM resources. The bwp-Id in that CSI-ResourceConfig is the same value as the bwp-Id in the CSI-ResourceConfig indicated by resourcesForChannelMeasurement.
csi-ReportingBand: Indicates a contiguous or non-contiguous subset of subbands in the bandwidth part which CSI shall be reported for. Each bit in the bit-string represents one subband. The right-most bit in the bit string represents the lowest subband in the BWP. The choice determines the number of subbands (subbands3 for 3 subbands, subbands4 for 4 subbands, and so on) (see TS 38.214 [19], clause 5.2.1.4). This field is absent if there are less than 24 PRBs (no sub band) and present otherwise, the number of sub bands can be from 3 (24 PRBs, sub band size 8) to 18 (72 PRBs, sub band size 4).
dummy: This field is not used in the specification. If received it shall be ignored by the UE.
groupBasedBeamReporting: Turning on/off group beam based reporting (see TS 38.214 [19], clause 5.2.1.4)
non-PMI-PortIndication: Port indication for RI/CQI calculation. For each CSI-RS resource in the linked ResourceConfig for channel measurement, a port indication for each rank R, indicating which R ports to use. Applicable only for non-PMI feedback (see TS 38.214 [19], clause 5.2.1.4.2).
The first entry in non-PMI-PortIndication corresponds to the NZP-CSI-RS-Resource indicated by the first entry in nzp-CSI-RS-Resources in the NZP-CSI-RS-ResourceSet indicated in the first entry of nzp-CSI-RS-ResourceSetList of the CSI-ResourceConfig whose CSI-ResourceConfigId is indicated in a CSI-MeasId together with the above CSI-ReportConfigId; the second entry in non-PMI-PortIndication corresponds to the NZP-CSI-RS-Resource indicated by the second entry in nzp-CSI-RS-Resources in the NZP-CSI-RS-ResourceSet indicated in the first entry of nzp-CSI-RS-ResourceSetList of the same CSI-ResourceConfig, and so on until the NZP-CSI-RS-Resource indicated by the last entry in nzp-CSI-RS-Resources in the in the NZP-CSI-RS-ResourceSet indicated in the first entry of nzp-CSI-RS-ResourceSetList of the same CSI-ResourceConfig. Then the next entry corresponds to the NZP-CSI-RS-Resource indicated by the first entry in nzp-CSI-RS-Resources in the NZP-CSI-RS-ResourceSet indicated in the second entry of nzp-CSI-RS-ResourceSetList of the same CSI-ResourceConfig and so on.
nrofReportedRS: The number (N) of measured RS resources to be reported per report setting in a non-group-based report. N$\Leftarrow$N_max, where N_max is either 2 or 4 depending on UE capability.
(see TS 38.214 [19], clause 5.2.1.4) When the field is absent the UE applies the value 1
nzp-CSI-RS-ResourcesForInterference: NZP CSI RS resources for interference measurement. csi-ResourceConfigId of a CSI-ResourceConfig included in the configuration of the serving cell indicated with the field "carrier" above. The CSI-ResourceConfig indicated here contains only NZP-CSI-RS resources. The bwp-Id in that CSI-ResourceConfig is the same value as the bwp-Id in the CSI-ResourceConfig indicated by resourcesForChannelMeasurement.
p0alpha: Index of the p0-alpha set determining the power control for this CSI report transmission (see TS 38.214 [19], clause 6.2.1.2).

pdsch-BundleSizeForCSI: PRB bundling size to assume for CQI calculation when reportQuantity is CRI/RI/i1/CQI. If the field is absent, the UE assumes that no PRB bundling is applied (see TS 38.214 [19], clause 5.2.1.4.2).

pmi-FormatIndicator: Indicates whether the UE shall report a single (wideband) or multiple (subband) PMI. (see TS 38.214 [19], clause 5.2.1.4).

pucch-CSI-ResourceList: Indicates which PUCCH resource to use for reporting on PUCCH.

reportConfigType: Time domain behavior of reporting configuration reportFreqConfiguration: Reporting configuration in the frequency domain. (see TS 38.214 [19], clause 5.2.1.4).

reportQuantity: The CSI related quantities to report. Corresponds to L1 parameter 'ReportQuantity' (see TS 38.214 [19], clause 5.2.1).

reportSlotConfig: Periodicity and slot offset (see TS 38.214 [19], clause 5.2.1.4).

reportSlotConfig-v1530: Extended value range for reportSlotConfig for semi-persistent CSI on PUSCH. If the field is present, the UE shall ignore the value provided in the legacy field (semiPersistentOnPUSCH.reportSlotConfig).

reportSlotOffsetList: Timing offset Y for semi persistent reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on. The first report is transmitted in slot n+Y, second report in n+Y+P, where P is the configured periodicity.

Timing offset Y for aperiodic reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on (see TS 38.214 [19], clause 5.2.3).

resourcesForChannelMeasurement: Resources for channel measurement. csi-ResourceConfigId of a CSI-ResourceConfig included in the configuration of the serving cell indicated with the field "carrier" above. The CSI-ResourceConfig indicated here contains only NZP-CSI-RS resources and/or SSB resources. This CSI-ReportConfig is associated with the DL BWP indicated by bwp-Id in that CSI-ResourceConfig.

subbandSize: Indicates one out of two possible BWP-dependent values for the subband size as indicated in TS 38.214 [19], table 5.2.1.4-2. If csi-ReportingBand is absent, the UE shall ignore this field.

timeRestrictionForChannelMeasurements: Time domain measurement restriction for the channel (signal) measurements (see TS 38.214 [19], clause 5.2.1.1)

timeRestrictionForInterferenceMeasurements: Time domain measurement restriction for interference measurements (see TS 38.214 [19], clause 5.2.1.1)

TABLE 21

CSI-ResourceConfig
The IE CSI-ResourceConfig defines a group of one or more NZP-CSI-RS-ResourceSet, CSI-IM-ResourceSet and/or CSI-SSB-ResourceSet.

CSI-ResourceConfig information element

```
-- ASN1START
-- TAG-CSI-RESOURCECONFIG-START
CSI-ResourceConfig ::=                     SEQUENCE {
    csi-ResourceConfigId                       CSI-ResourceConfigId,
    csi-RS-ResourceSetList                     CHOICE {
        nzp-CSI-RS-SSB                             SEQUENCE {
            nzp-CSI-RS-ResourceSetList                 SEQUENCE (SIZE (1..maxNrofNZP-CSI-RS-
ResourceSetsPerConfig)) OF NZP-CSI-RS-ResourceSetId
OPTIONAL,  -- Need R
            csi-SSB-ResourceSetList                    SEQUENCE (SIZE (1..maxNrofCSI-SSB-
ResourceSetsPerConfig)) OF CSI-SSB-ResourceSetId
OPTIONAL   -- Need R
        },
        csi-IM-ResourceSetList                     SEQUENCE (SIZE (1..maxNrofCSI-IM-
ResourceSetsPerConfig)) OF CSI-IM-ResourceSetId
    },
    bwp-Id                                     BWP-Id,
    resourceType                               ENUMERATED { aperiodic, semiPersistent, periodic },
    ...
}
-- TAG-CSI-RESOURCECONFIG-STOP
-- ASN1STOP
```

CSI-ResourceConfig field descriptions bwp-Id: The DL BWP which the CSI-RS associated with this CSI-ResourceConfig are located in (see TS 38.214 [19], clause 5.2.1.2 csi-ResourceConfigId: Used in CSI-ReportConfig to refer to an instance of CSI-ResourceConfig csi-RS-ResourceSetList: Contains up to maxNrofNZP-CSI-RS-ResourceSetsPerConfig resource sets if ResourceConfigType is 'aperiodic' and 1 otherwise (see TS 38.214 [19], clause 5.2.1.2)

csi-SSB-ResourceSetList: List of SSB resources used for beam measurement and reporting in a resource set (see TS 38.214 [19], section FFS_Section)

resourceType: Time domain behavior of resource configuration (see TS 38.214 [19], clause 5.2.1.2). It does not apply to resources provided in the csi-SSB-ResourceSetList.

TABLE 22

NZP-CSI-RS-ResourceSet
The IE NZP-CSI-RS-ResourceSet is a set of Non-Zero-Power (NZP) CSI-RS resources (their IDs) and set-specific parameters.

NZP-CSI-RS-ResourceSet information element

```
-- ASN1START
-- TAG-NZP-CSI-RS-RESOURCESET-START
NZP-CSI-RS-ResourceSet ::=           SEQUENCE {
    nzp-CSI-ResourceSetId                NZP-CSI-RS-ResourceSetId,
    nzp-CSI-RS-Resources                 SEQUENCE (SIZE (1 ..maxNrofNZP-CSI-RS-
ResourcesPerSet)) OF NZP-CSI-RS-ResourceId,
    repetition                           ENUMERATED { on, off }
OPTIONAL,  -- Need S
    aperiodicTriggeringOffset            INTEGER(0..6)
OPTIONAL,  -- Need S
    trs-Info                             ENUMERATED {true}
OPTIONAL,  -- Need R
    ...
}
-- TAG-NZP-CSI-RS-RESOURCESET-STOP
-- ASN1STOP
```

NZP-CSI-RS-ResourceSet field descriptions
aperiodicTriggeringOffset: Offset X between the slot containing the DCI that triggers a set of aperiodic NZP CSI-RS resources and the slot in which the CSI-RS resource set is transmitted. The value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. When the field is absent the UE applies the value 0.
nzp-CSI-RS-Resources: NZP-CSI-RS-Resources associated with this NZP-CSI-RS resource set (see TS 38.214 [19], clause 5.2). For CSI, there are at most 8 NZP CSI RS resources per resource set
repetition: Indicates whether repetition is on/off. If the field is set to 'OFF' or if the field is absent, the UE may not assume that the NZP-CSI-RS resources within the resource set are transmitted with the same downlink spatial domain transmission filter and with same Nrof-Ports in every symbol (see TS 38.214 [19], clauses 5.2.2.3.1 and 5.1.6.1.2). Can only be configured for CSI-RS resource sets which are associated with CSI-ReportConfig with report of L1 RSRP or "no report"
trs-Info: Indicates that the antenna port for all NZP-CSI-RS resources in the CSI-RS resource set is same. If the field is absent or released the UE applies the value "false" (see TS 38.214 [19], clause 5.2.2.3.1).

TABLE 23

CSI-SSB-ResourceSet
The IE CSI-SSB-ResourceSet is used to configure one SS/PBCH block resource set which refers to SS/PBCH as indicated in ServingCellConfigCommon.

CSI-SSB-ResourceSet information element

```
-- ASN1START
-- TAG-CSI-SSB-RESOURCESET-START
CSI-SSB-ResourceSet ::=              SEQUENCE {
    csi-SSB-ResourceSetId                CSI-SSB-ResourceSetId,
    csi-SSB-ResourceList                 SEQUENCE (SIZE(1..maxNrofCSI-SSB-
ResourcePerSet)) OF SSB-Index,
    ...
}
-- TAG-CSI-SSB-RESOURCESET-STOP
-- ASN1STOP
```

TABLE 24

CSI-IM-ResourceSet
The IE CSI-IM-ResourceSet is used to configure a set of one or more CSI Interference Management (IM) resources (their IDs) and set-specific parameters.

CSI-IM-ResourceSet information element

```
-- ASN1START
-- TAG-CSI-IM-RESOURCESET-START
CSI-IM-ResourceSet ::=               SEQUENCE {
    csi-IM-ResourceSetId                 CSI-IM-ResourceSetId,
```

TABLE 24-continued

CSI-IM-ResourceSet
The IE CSI-IM-ResourceSet is used to configure a set of one or more CSI
Interference Management (IM) resources (their IDs) and set-specific parameters.

```
    csi-IM-Resources                    SEQUENCE (SIZE(1..maxNrofCSI-IM-
ResourcesPerSet)) OF CSI-IM-ResourceId,
    ...
}
-- TAG-CSI-IM-RESOURCESET-STOP
-- ASN1STOP
```

TABLE 25

CSI-AperiodicTriggerStateList
The CSI-AperiodicTriggerStateList IE is used to configure the UE with a list of
aperiodic trigger states. Each code point of the DCI field "CSI request" is associated with one
trigger state. Upon reception of the value associated with a trigger state, the UE will perform
measurement of CSI-RS (reference signals) and aperiodic reporting on L1 according to all entries
in the associatedReportConfigInfoList for that trigger state.

CSI-AperiodicTriggerStateList information element

```
-- ASN1START
-- TAG-CSI-APERIODICTRIGGERSTATELIST-START
CSI-AperiodicTriggerStateList ::=        SEQUENCE (SIZE (1..maxNrOfCSI-AperiodicTriggers))
OF CSI-AperiodicTriggerState
CSI-AperiodicTriggerState ::=            SEQUENCE {
    associatedReportConfigInfoList       SEQUENCE
(SIZE(1..maxNrofReportConfigPerAperiodicTrigger)) OF CSI-AssociatedReportConfigInfo,
    ...
}
CSI-AssociatedReportConfigInfo ::=       SEQUENCE {
    reportConfigId                       CSI-ReportConfigId,
    resourcesForChannel                  CHOICE {
      nzp-CSI-RS                         SEQUENCE {
        resourceSet                      INTEGER (1..maxNrofNZP-CSI-RS-
ResourceSetsPerConfig),
        qcl-info                         SEQUENCE (SIZE(1..maxNrofAP-
CSI-RS-ResourcesPerSet))OF TCI-StateId OPTIONAL -- Cond Aperiodic
      },
      csi-SSB-ResourceSet                INTEGER (1..maxNrofCSI-SSB-
ResourceSetsPerConfig)
    },
    csi-IM-ResourcesForInterference      INTEGER(1..maxNrofCSI-IM-
ResourceSetsPerConfig)                   OPTIONAL, -- Cond CSI-IM-ForInterference
    nzp-CSI-RS-ResourcesForInterference  INTEGER (1..maxNrofNZP-CSI-RS
ResourceSetsPerConfig)                   OPTIONAL -- Cond NZP-CSI-RS-ForInterference
    ...
}
-- TAG-CSI-APERIODICTRIGGERSTATELIST-STOP
-- ASN1STOP
```

CSI-AssociatedReportConfigInfo field descriptions
csi-IM-ResourcesForInterference: CSI-IM-ResourceSet for interference measurement. Entry number in csi-IM-ResourceSetList in the CSI-ResourceConfig indicated by csi-IM-ResourcesForInterference in the CSI-ReportConfig indicated by reportConfigId above (1 corresponds to the first entry, 2 to the second entry, and so on). The indicated CSI-IM-ResourceSet should have exactly the same number of resources like the NZP-CSI-RS-ResourceSet indicated in nzp-CSI-RS-ResourcesforChannel.
csi-SSB-ResourceSet: CSI-SSB-ResourceSet for channel measurements. Entry number in csi-SSB-ResourceSetList in the CSI-ResourceConfig indicated by resourcesForChannelMeasurement in the CSI-ReportConfig indicated by reportConfigId above (1 corresponds to the first entry, 2 to the second entry, and so on).
nzp-CSI-RS-ResourcesForInterference: NZP-CSI-RS-ResourceSet for interference measurement. Entry number in nzp-CSI-RS-ResourceSetList in the CSI-ResourceConfig indicated by nzp-CSI-RS-ResourcesForInterference in the CSI-ReportConfig indicated by reportConfigId above (1 corresponds to the first entry, 2 to the second entry, and so on).
qcl-info: List of references to TCI-States for providing the QCL source and QCL type for each NZP-CSI-RS-Resource listed in nzp-CSI-RS-Resources of the NZP-CSI-RS-ResourceSet indicated by nzp-CSI-RS-ResourcesforChannel. Each TCI-StateId refers to the TCI-State which has this value for tci-StateId and is defined in tci-StatesToAddModList in the PDSCH-Config included in the BWP-Downlink corresponding to the serving cell and to the DL BWP to which the resourcesForChannelMeasurement (in the CSI-ReportConfig indicated by reportConfigId above) belong to. First entry in qcl-info-forChannel corresponds to first entry in nzp-CSI-RS-Resources of that NZP-CSI-RS-ResourceSet, second entry in qcl-info-forChannel corresponds to second entry in nzp-CSI-RS-Resources, and so on (see TS 38.214 [19], clause 5.2.1.5.1)

reportConfigId: The reportConfigId of one of the CSI-ReportConfigToAddMod configured in CSI-MeasConfig resourceSet: NZP-CSI-RS-ResourceSet for channel measurements. Entry number in nzp-CSI-RS-ResourceSetList in the CSI-ResourceConfig indicated by resourcesForChannelMeasurement in the CSI-ReportConfig indicated by reportConfigId above (1 corresponds to the first entry, 2 to the second entry, and so on).

| Conditional Presence | Explanation |
| --- | --- |
| Aperiodic | The field is mandatory present if the NZP-CSI-RS-Resources in the associated resourceSet have the resourceType aperiodic. The field is absent otherwise. |
| CSI-IM-ForInterference | This field is optional need M if the CSI-ReportConfig identified by reportConfigId is configured with csi-IM-ResourcesForInterference, otherwise it is absent. |
| NZP-CSI-RS-ForInterference | This field is optional need M if the CSI-ReportCoping identified by reportConfigId configured with nzp-CSI-RS-ResourcesForInterference; otherwise it is absent. |

TABLE 26

CSI-SemiPersistentOnPUSCH-TriggerStateList
The CSI-SemiPersistentOnPUSCH-TriggerStateList IE is used to configure the UE with list of trigger states for semi-persistent reporting of channel state information on L1. See also TS 38.214 [19], clause 5.2.

CSI-SemiPersistentOnPUSCH-TriggerStateList information element

```
-- ASN1START
-- TAG-CSI-SEMIPERSISTENTONPUSCHTRIGGERSTATELIST-START
CSI-SemiPersistentOnPUSCH-TriggerStateList ::=    SEQUENCE(SIZE
(1..maxNrOfSemiPersistentPUSCH-Triggers))OF CSI-SemiPersistentOnPUSCH-TriggerState
CSI-SemiPersistentOnPUSCH-TriggerState ::=       SEQUENCE {
    associatedReportConfigInfo                  CSI-ReportConfigId,
    ...
}
-- TAG-CSI-SEMIPERSISTENTONPUSCHTRIGGERSTATELIST-STOP
-- ASN1STOP
```

For the above-described CSI report setting (CSI-ReportConfig), each report setting CSI-ReportConfig may be associated with the CSI resource setting associated with the corresponding report configuration, and one downlink bandwidth part identified by an upper layer parameter bandwidth part identifier (bwp-id) given to the CSI-ResourceConfig.

As a time domain report operation for each report setting CSI-ReportConfig, "aperiodic", "semi-persistent", and "periodic" methods are supported, and they may be configured from the base station to the UE by a reportConfigType parameter configured from the upper layer. The semi-persistent CSI report method supports "PUCCH based semi-persistent (semi-PersistentOnPUCCH)" and "PUSCH based semi-persistent (semi-PersistentOnPUSCH)". In case of the periodic or semi-persistent CSI report method, the UE may be configured with PUCCH or PUSCH resources to transmit the CSI from the base station through upper layer signaling. The period and slot offset of the PUCCH or PUSCH resource to transmit the CSI may be given based on numerology of the uplink bandwidth part configured to transmit the CSI report. In case of the aperiodic CSI report method, the UE may be scheduled with the PUSCH resource to transmit the CSI from the base station through L1 signaling (DCI, as an example, the above-described DCI format 0_1).

For the above-described CSI resource setting (CSI-ResourceConfig), each CSI resource setting CSI-ReportConfig may include S(≥1) CSI resource sets (configured as the upper layer parameter csi-RS-ResourceSetList). The CSI resource set list may be composed of a non-zero power (NZP) CSI-RS resource set and an SS/PBCH block set, or may be composed of a CSI-interference measurement (CSI-IM) resource set. Each CSI resource setting may be located in a downlink bandwidth part being identified by the upper layer parameter bwp-id, and the CSI resource setting may be connected to the CSI report setting of the same downlink bandwidth part. The time domain operation of the CSI-RS resource in the CSI resource setting may be configured as one of "aperiodic", "periodic", or "semi-persistent" from the upper layer parameter resourceType. For the periodic or semi-persistent CSI resource setting, the number of CSI-RS resource sets may be limited to S=1, and the configured period and slot offset may be given based on the numerology of the downlink bandwidth part being identified by the bwp-id. The UE may be configured with one or more CSI resource settings for channel or interference measurement from the base station through the upper layer signaling, and for example, may include the following CSI resources.

CSI-IM resource for interference measurement
NZP CSI-RS resource for interference measurement
NZP CSI-RS resource for channel measurement For the CSI-RS resource sets in which the upper layer parameter resourceType is associated with the resource setting configured as "aperiodic", "periodic", or "semi-persistent", the trigger state for the CSI report setting in which the reportType is configured as "aperiodic", and the resource setting for channel or interference measurement for one or a plurality of CCs may be configured as the upper layer parameter CSI-AperiodicTriggerStateList.

The aperiodic CSI report of the UE may be performed by using the PUSCH, the periodic CSI report may be performed by using the PUSCH, and the semi-persistent CSI report may be performed by using the PUSCH in case of being triggered or activated by the DCI, and may be performed by using the PUCCH after being activated by a MAC control element (MAC CE). As described above, the CSI resource setting may also be configured as aperiodic, periodic, or semi-persistent. A combination between the CSI report setting and the CSI resource setting may be supported based on the following Table 27 (triggering/activation of CSI reporting for the possible CSI-RS configurations).

TABLE 27

| CSI-RS Configuration | Periodic CSI Reporting | Semi-Persistent CSI Reporting | Aperiodic CSI Reporting |
|---|---|---|---|
| Periodic CSI-RS | Nodynamic triggering/ activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receivesan activation command [10, TS 38.321]; for reporting on PUSCH, the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

The aperiodic CSI report may be triggered to a "CSI request" field of the above-described DCI format 0_1 corresponding to the scheduling DCI for the PUSCH. The UE may monitor the PDCCH, obtain the DCI format 0_1, and obtain PUSCH scheduling information and a CSI request indicator. The CSI request indicator may be configured with NTS(=0, 1, 2, 3, 4, 5, or 6) bits, and the number of bits of the CSI request indicator may be determined by the upper layer signaling (reportTriggerSize). One trigger state among one or a plurality of aperiodic CSI report trigger states that may be configured by the upper layer signaling (CSI-AperiodicTriggerStateList) may be triggered by the CSI request indicator.

If all bits of the CSI request field are 0, this means that the CSI report is not requested.

If the number M of CSI trigger states in the configured CSI-AperiodicTriggerStateLite is larger than 2NTs-1, in accordance with a predefined mapping relationship, M CSI trigger states may be mapped on 2NTs-1, and one of 2NTs-1 trigger states may be indicated as a CSI request field.

If the number M of CSI trigger states in the configured CSI-AperiodicTriggerStateLite is equal to or smaller than 2NTs-1, one of M CSI trigger states may be indicated as the CSI request field.

Table 28 below represents an example of the relationship between the CSI request indicator and the CSI trigger state that may be indicated as the corresponding indicator.

TABLE 28

| CSI request field | CSI trigger state | CSI-ReportConfigId | CSI-ResourceConfigId |
|---|---|---|---|
| 00 | no CSI request | N/A | N/A |
| 01 | CSI trigger state #1 | CSI report #1 CSI report #2 | CSI resource #1 CSI resource #2 |
| 10 | CSI trigger state #2 | CSI report #3 | CSI resource #3 |
| 11 | CSI trigger state #3 | CSI report #4 | CSI resource #4 |

With respect to the CSI resources in the CSI trigger state triggered as the CSI request field, the UE may perform measurement, and from this, may generate the CSI (including at least one of CQI, PMI, CRI, SSBRI, LI, RI, or L1-RSRP as described above). The UE may transmit the obtained CSI by using the PUSCH being scheduled by the corresponding DCI format 0_1. If one bit corresponding to the uplink data indicator (UL-SCH indicator) in the DCI format 0_1 indicates "1", the UE may multiplex the uplink data (UL-SCH) and the obtained CSI onto the PUSCH resource scheduled by the DCI format 0_1 to be transmitted. If one bit corresponding to the uplink data indicator (UL-SCH indicator) in the DCI format 0_1 indicates "0", the UE may map only the CSI on the PUSCH resource scheduled by the DCI format 0_1 to be transmitted without uplink data (UL-SCH).

FIG. 11 is a diagram illustrating an example of an aperiodic CSI report method.

In an example of FIG. 11, the UE may obtain DCI format 01 by monitoring the PDCCH 1101, and from this, may obtain scheduling information for the PUSCH 1105 and CSI request information. The UE may obtain resource information on the CSI-RS 1102 to be measured from the received CSI request indicator. The UE may determine, at which point, to perform measurement of a resource of the CSI-RS 1102 being transmitted based on the time when the DCI format 0_1 is received and the CSI resource set configuration (e.g., parameter (above-described aperiodicTriggering-Offset) for the offset in the NZP CSI-RS resource set configuration (NZP-CSI-RS-ResourceSet)). More specifically, the UE may be configured with an offset value X of the parameter aperiodicTriggeringOffset in the NZP-CSI-RS resource set configuration from the base station through upper layer signaling, and the configured offset value X may mean the offset between the slot having received the DCI for triggering the aperiodic CSI report and the slot for transmitting the CSI-RS resource. For example, the aperiodic-TriggeringOffset parameter value and the offset value X may have a mapping relationship described in Table 29 below.

TABLE 29

| aperiodicTriggeringOffset | Offset X |
|---|---|
| 0 | 0 slot |
| 1 | 1 slot |
| 2 | 2 slots |
| 3 | 3 slots |
| 4 | 4 slots |
| 5 | 16 slots |
| 6 | 24 slots |

In FIG. 11, an example in which the above-described offset value is configured to X=0 is shown. In this case, the UE may receive the CSI-RS 1102 from a slot (corresponding to slot 0 of FIG. 11) having received the DCI format 0_1 triggering the aperiodic CSI report, and may report the CSI information measured by the received CSI-RS to the base station through the PUSCH 1105. The UE may obtain scheduling information (information corresponding to each field of the above-described DCI format 01) on the PUSCH 1105 for the CSI report from the DCI format 0_1. As an example, the UE may obtain information on the slot to transmit the PUSCH 1105 from the above-described time domain resource assignment information on the PUSCH 1105 through the DCI format 0_1. In an example of FIG. 11, the UE obtains a K2 value of 3 corresponding to the slot offset value for the PDCCH-to-PUSCH, and accordingly, the PUSCH 1105 may be transmitted form slot 3 1109 that is apart for 3 slots from the time when the PDCCH 1101 is received, that is, slot 0 1106.

In another example of FIG. 11, the UE may obtain the DCI format 0_1 by monitoring the PDCCH 1111, and from this, may obtain scheduling information for the PUSCH 1115 and CSI request information. The UE may obtain resource information on the CSI-RS 1112 to be measured from the received CSI request indicator. In FIG. 11, an example in which the offset value for the above-described CSI-RS is configured to X=1 is shown. In this case, the UE may receive the CSI-RS 1112 from the slot (corresponding to slot 0 1116 of FIG. 11) having received the DCI format 0_1 that triggers the aperiodic CSI report, and may report the CSI information measured by the received CSI-RS to the base station through the PUSCH 1115.

FIG. 12 is a diagram illustrating examples for various operational scenarios of SRS. With reference to FIG. 12, In an NR system, at least the following three kinds of SRS operational scenarios can be considered.

As shown in a, the base station 1205 may configure a beam in one direction to the UE 1200 (in the description, configuration of the beam and/or precoding in one direction includes non-application of the beam and/or precoding or application of wide beam, cell-coverage, or sector coverage), and the UE 1200 transmits the SRS to match the SRS transmission period and offset in case of the periodic SRS or a semi-permanent SRS, and to match the base station's SRS request (in a determined time after the SRS request) in case of the aperiodic SRS. In this case, the SRSs do not require additional information for the beam and/or precoding.

As shown in b, the base stations 1215 and 1220 configure beams in one or more directions to the UE 1210, and the UE 1210 may transmit a plurality of SRSs beamformed in the one or more directions. For example, as shown in an example of FIG. 12, it is possible to configure that SRS resource (or port) #0 is beamformed to the base station 1215, and SRS resource (or port) #1 is beamformed to the base station 1220. In this case, unlike a as described above, it is required for the base stations 1215 and 1220 to notify of not only the SRS request but also the SRS beam and/or precoding information.

As shown in c, the base station 1230 may configure beams in one or more directions to the UE 1225, and the UE 1225 may transmit a plurality of SRSs beamformed in the one or more directions. For example, as exemplified in FIG. 12, the base station may configure that the UE transmit the SRS by applying different beams and/or precodings to SRS resource (or port) #0, SRS resource (or port) #1, and SRS resource (or port) #3, respectively. Through this, even if the UE mobility is high, the UE can perform stably communication through beam and/or precoder diversity. For example, the UE 1225 may provide the channel state information to the base station 1230 through SRS #2 at time point A, and may provide the channel state information to the base station 1230 through SRS #0 at time point A+α. In this case, unlike a as described above, it is required for the base station 1230 to notify of not only the SRS request but also the SRS beam and/or precoding information.

Although the above explanations have been made based on the SRS transmission, it is possible to expand on other UL channels, such as PRACH, PUSCH, and PUCCH and/or RS transmission in a similar manner, and in order not to obscure the subject matter of the disclosure, detailed explanation for all cases will be omitted.

FIG. 13 is a diagram illustrating an uplink transmission structure of a 5G or NR system.

With reference to FIG. 13, the basic transmission unit of the 5G or NR system is a slot 1300, and under the assumption of a normal cyclic prefix (CP) length, each slot is composed of 14 symbols 1305, and one symbol may correspond to one UL waveform (cyclic prefix—orthogonal frequency division multiplexing (CP-OFDM) or DFT-S-OFDM) symbol.

A resource block 1310 is a resource assignment unit corresponding to one slot based on a time domain, and may be composed of 12 subcarriers based on a frequency domain.

The uplink structure may be briefly divided into a data area and a control area. In the 5G or NR system, unlike the LTE system, the control area may be configured in a certain location of the uplink to be transmitted. Here, the data area includes a series of communication resources including data, such as voice and packet, being transmitted to respective UEs, and corresponds to remaining resources excluding the control area in a subframe. The control area includes a series of communication resources for a downlink channel quality report from each UE, acknowledgment/negative acknowledgment (ACK/NACK) of reception of a downlink signal, and uplink scheduling request.

The UE may simultaneously transmit its own data and control information in the data area and the control area. The symbol in which the UE periodically transmits the SRS in one slot may correspond to the last 6 symbol periods 1315, and the SRS may be transmitted through a predetermined SRS transmission band in an uplink BWP based on the frequency domain. However, this is merely exemplary, and the symbol capable of transmitting the SRS may be expanded to another time period, or may be transmitted through the frequency band. The RBs capable of transmitting the SRS are transmitted as a multiple of 4 RBs when being transmitted in the frequency domain, and maximally 272 RBs may be transmitted.

Further, in the 5G or NR system, the number N of symbols of the SRS may be configured as 1, 2, or 4, and the SRS may be transmitted from successive symbols. Further, in the 5G or NR system, repeated transmission of SRS symbols is allowed. Specifically, the repetition factor r of the SRS symbols may be $r \in \{1,2,4\}$, and here, the repetition factor r may be configured as $r \le N$. For example, in case that one SRS antenna is mapped on one symbol to be transmitted, up to maximally 4 symbols may be repeatedly transmitted. Unlike this, 4 different antenna ports may transmit 4 different symbols. In this case, since the respective antennas are mapped on one symbol, the repeated transmission of the SRS symbols is not allowed.

In the LTE and NR system, the SRS may be configured based on the following upper layer signaling information (or subsets thereof).

BandwidthConfig: It configures SRS bandwidth information. In accordance with a bandwidth value of the uplink system, an accurate value meant by each code point may differ.

SubframeConfig (or ConfigIndex): It configures SRS transmission period and transmission offset values. Depending on a frequency division duplex (FDD) or a time division duplex (TDD), an accurate value meant by each code point may differ.

ackNackSRS-SimultaneousTransmission: It notifies of ACK/NACK—SRS simultaneous transmission or not.

MaxUpPts: The uplink pilot time slot (UpPTS) notifies whether the frequency location of the SRS transmission is initialized.

Hopping: It is 2-bit information which notifies of whether SRS frequency hopping is performed, and hopping location and method Frequency domain position: It notifies of the frequency domain location of the SRS transmission.

Duration: It notifies whether the periodic SRS is transmitted.

Transmission comb: It notifies of a comb offset value when the SRS is transmitted.

Cyclic shift: It notifies of a cyclic shift (CS) value when the SRS is transmitted.

Antenna port: It notifies of the number of SRS antenna ports being used when the SRS is transmitted. In case of the LTE, 1, 2, or 4 ports can be supported.

In case of an LTE-A system, the periodic and aperiodic SRS transmission can be supported based on the above-described configuration information. In case of the NR system, it is possible to use additional information such as activation/non-activation signaling for the SRS resource in addition to the above-described configuration information, and the periodic, semi-consistent, and aperiodic SRS transmission can be supported. In accordance with the SRS transmission type, for example, in accordance with the periodic, semi-consistent, and aperiodic SRS transmission recognition, some pieces of the configuration information may be omitted.

The SRS may be composed of constant amplitude zero auto correlation (CAZAC) sequences. Further, the CAZAC sequences constituting each SRS transmitted from several UEs have different CS values. Further, the CAZAC sequences generated through the CS in one CAZAC sequence have the characteristic in that they have zero correlation values between themselves and sequences having different CS values. Using the characteristic, the SRSs being simultaneously assigned to the same frequency domain may be discriminated in accordance with the CAZAC sequence CS values configured by the base station by SRSs.

The SRSs of several UEs may be discriminated in accordance with not only cyclic transition values but also frequency locations. The frequency location may be classified into the SRS subband unit assignment or comb. In the 5G or NR system, Comb2 and Comb4 can be supported. As an example, in case of Comb2, one SRS can be allocated to an even or odd-numbered subcarrier only in the SRS subband. In this case, the even-numbered subcarriers and the odd-numbered subcarriers may constitute one comb, respectively.

Each UE may be allocated with the SRS subband based on a tree structure. Further, the UE may perform hopping of the SRS assigned to each subband at every SRS transmission time. Accordingly, all transmission antennas of the UE can transmit the SRS by using the whole uplink data transmission bandwidth.

FIG. 14 is a diagram illustrating a structure in which SRS is allocated for each subband.

With reference to FIG. 14, an example is illustrated, in which in case of having a data transmission band corresponding to 40 RBs in frequency, an SRS is allocated to each UE by a tree structure configured by a base station.

In FIG. 14, if it is assumed that a level index of the tree structure is b, the uppermost level (b=0) of the tree structure may be composed of one SRS subband having a bandwidth of 40 RBs. At the second level (b=1), two SRS subbands having a bandwidth of 20 RBs may be generated from the SRS subband at the level of b=0. Accordingly, two SRS subbands may be present in the whole data transmission band at the second level (b=1). At the third level (b=2), 5 SRS subbands of 4 RBs are generated from one SRS subband of 20 RBs at the level directly above (b=1), and 10 SRS subbands of 4 RBs may be present at one level in the structure.

The configuration of the tree structure as above may have various number of levels, SRS subband sizes, and various numbers of SRS subbands for one level in accordance with the configuration of the base station. Here, it may be defined that the number of SRS subbands at level b, being generated from one SRS subband of an upper level, is Nb, and indexes for Nb SRS subbands are nb={0, . . . , Nb−1}. As the subbands per level differ, as illustrated in FIG. 14, the UE may be allocated by subbands per level. For example, UE 1 1400 may be allocated to use the first SRS subband (n1=0) of the two SRS subbands having the bandwidth of 20 RBs at the level of b=1, and UE 2 1401 and UE 3 1402 may be allocated to use the first SRS subband (n2=0) and the third SRS subband (n2=2) under the second SRS subband of 20 RBs. Through such processes, the UE can perform SRS simultaneous transmission through a plurality of CCs, and can simultaneously transmit the SRS to a plurality of SRS subbands in one CC.

Specifically, for the above-described SRS subband configuration, SRS bandwidth configurations as in Table 30 below are supported in the NR system.

TABLE 30

| $C_{SRS}$ | $B_{SRS} = 0$ | | $B_{SRS} = 1$ | | $B_{SRS} = 2$ | | $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |
| 19 | 72 | 1 | 36 | 2 | 12 | 3 | 4 | 3 |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |

TABLE 30-continued

| $C_{SRS}$ | $B_{SRS} = 0$ | | $B_{SRS} = 1$ | | $B_{SRS} = 2$ | | $B_{SRS} = 3$ | |
| | $m_{SRS,0}$ | $N_0$ | $m_{SRS,1}$ | $N_1$ | $m_{SRS,2}$ | $N_2$ | $m_{SRS,3}$ | $N_3$ |
|---|---|---|---|---|---|---|---|---|
| 28 | 120 | 1 | 40 | 3 | 8 | 5 | 4 | 2 |
| 29 | 120 | 1 | 24 | 5 | 12 | 2 | 4 | 3 |
| 30 | 128 | 1 | 64 | 2 | 32 | 2 | 4 | 8 |
| 31 | 128 | 1 | 64 | 2 | 16 | 4 | 4 | 4 |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |
| 36 | 144 | 1 | 48 | 3 | 24 | 2 | 12 | 2 |
| 37 | 144 | 1 | 48 | 3 | 16 | 3 | 4 | 4 |
| 38 | 144 | 1 | 16 | 9 | 8 | 2 | 4 | 2 |
| 39 | 152 | 1 | 76 | 2 | 4 | 19 | 4 | 1 |
| 40 | 160 | 1 | 80 | 2 | 40 | 2 | 4 | 10 |
| 41 | 160 | 1 | 80 | 2 | 20 | 4 | 4 | 5 |
| 42 | 160 | 1 | 32 | 5 | 16 | 2 | 4 | 4 |
| 43 | 168 | 1 | 84 | 2 | 28 | 3 | 4 | 7 |
| 44 | 176 | 1 | 88 | 2 | 44 | 2 | 4 | 11 |
| 45 | 184 | 1 | 92 | 2 | 4 | 23 | 4 | 1 |
| 46 | 192 | 1 | 96 | 2 | 48 | 2 | 4 | 12 |
| 47 | 192 | 1 | 96 | 2 | 24 | 4 | 4 | 6 |
| 48 | 192 | 1 | 64 | 3 | 16 | 4 | 4 | 4 |
| 49 | 192 | 1 | 24 | 8 | 8 | 3 | 4 | 2 |
| 50 | 208 | 1 | 104 | 2 | 52 | 2 | 4 | 13 |
| 51 | 216 | 1 | 108 | 2 | 36 | 3 | 4 | 9 |
| 52 | 224 | 1 | 112 | 2 | 56 | 2 | 4 | 14 |
| 53 | 240 | 1 | 120 | 2 | 60 | 2 | 4 | 15 |
| 54 | 240 | 1 | 80 | 3 | 20 | 4 | 4 | 5 |
| 55 | 240 | 1 | 48 | 5 | 16 | 3 | 8 | 2 |
| 56 | 240 | 1 | 24 | 10 | 12 | 2 | 4 | 3 |
| 57 | 256 | 1 | 128 | 2 | 64 | 2 | 4 | 16 |
| 58 | 256 | 1 | 128 | 2 | 32 | 4 | 4 | 8 |
| 59 | 256 | 1 | 16 | 16 | 8 | 2 | 4 | 2 |
| 60 | 264 | 1 | 132 | 2 | 44 | 3 | 4 | 11 |
| 61 | 272 | 1 | 136 | 2 | 68 | 2 | 4 | 17 |
| 62 | 272 | 1 | 68 | 4 | 4 | 17 | 4 | 1 |
| 63 | 272 | 1 | 16 | 17 | 8 | 2 | 4 | 2 |

Further, in the NR, SRS frequency hopping is supported based on the values in Table 30 above, and the detailed procedure follows Table 31 below.

TABLE 31

When SRS is transmitted on a given SRS resource, the sequence $r^{(p_i)}(n, l')$ for each OFDM symbol l' and for each of the antenna ports of the SRS resource shall be multiplied with the amplitude scaling factor $\beta_{SRS}$ in order to conform to the transmit power specified in [5, 38.213] and mapped in sequence starting with $r^{(p_i)}(0, l')$ to resource elements (k, l) in a slot for each of the antenna ports $p_i$ according to $$a^{(p_i)}_{K_{TC}k' + k_0^{(p_i)}, l' + l_0} = \begin{cases} \frac{1}{\sqrt{N_{ap}}} \beta_{SRS} r^{(p_i)}(k', l') & k' = 0, 1, \ldots, M_{sc,b}^{SRS} - 1 \; l' = 0, 1, \ldots, N_{symb}^{SRS} - 1 \\ 0 & \text{otherwise} \end{cases}$$

The length of the sounding reference signal sequence is given by
$M_{sc,b}^{SRS} = m_{SRS,b} N_{sc}^{RB}/K_{TC}$
where $m_{SRS,b}$ is given by a selected row of Table 6.4.1.4.3-1 with b = $B_{SRS}$ where $B_{SRS} \in \{0, 1, 2, 3\}$ is given by the field b-SRS contained in the higher-layer parameter freqHopping. The row of the table is selected according to the index $C_{SRS} \in \{0, 1, \ldots, 63\}$ given by the field c-SRS contained in the higher-layer parameter freqHopping.
The frequency-domain starting position $k_0^{(p_i)}$ is defined by $$k_0^{(p_i)} = \bar{k}_0^{(p_i)} + \sum_{b=0}^{B_{SRS}} K_{TC} M_{sc,b}^{SRS} n_b$$

where $\bar{k}_0^{(p_i)} = n_{shift} N_{sc}^{RB} + k_{TC}^{(p_i)}$ $k_{TC}^{(p_i)} = \begin{cases} (\bar{k}_{TC} + K_{TC}/2) \bmod K_{TC} & \text{if } n_{SRS}^{cs} \in \{n_{SRS}^{cs,max}/2, \ldots, n_{SRS}^{cs,max} - 1\} \text{ and } N_{sp}^{SRS} = 4 \text{ and } p_i \in \{1001, 1003\} \\ \bar{k}_{TC} & \text{otherwise} \end{cases}$ if $N_{BWP}^{start} \leq n_{shift}$ the reference point for $k_0^{(p_i)} = 0$ is subcarrier 0 in common resource block 0, otherwise the reference point is the lowest subcarrier of the BWP.
The frequency domain shift value $n_{shift}$ adjusts the SRS allocation with respect to the reference point grid and is contained in the higher-layer parameter freqDomainShift in the SRS-Config IE.
The transmission comb offset $\in \bar{k}_{TC} \{0, 1, \ldots, K_{TC} - 1\}$ is contained in the higher-layer parameter transmissionComb in the SRS-Config IE and $n_b$ is a frequency position index.
Frequency hopping of the sounding reference signal is configured by the parameter $b_{hop} \in \{0, 1, 2, 3\}$, given by the field b-hop contained in the higher-layer parameter freqHopping.
If $b_{hop} \geq B_{SRS}$, frequency hopping is disabled and the frequency position index $n_b$ remains constant (unless re-configured) and is defined by
$n_b = \lfloor 4 n_{RRC}/m_{SRS,b} \rfloor \bmod N_b$
for all $N_{symb}^{SRS}$ OFDM symbols of the SRS resource. The quantity $n_{RRC}$ is given by the higher-layer parameter freqDomainPosition and the values of $m_{SRS,b}$ and $N_b$ for b = $B_{SRS}$ are given by the selected row of Table 6.4.1.4.3-1 corresponding to the configured value of $C_{SRS}$.
If $b_{hop} < B_{SRS}$, frequency hopping is enabled and the frequency position indices $n_b$ are defined by TABLE 31-continued $$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases}$$

where $N_b$ is given by Table 6.4.1.4.3-1, $$F_b(n_{SRS}) = \begin{cases} (N_b/2)\left\lfloor \dfrac{n_{SRS} \bmod \prod_{b'-b_{hop}}^{b} N_{b'}}{\prod_{b'-b_{hop}}^{b-1} N_{b'}} \right\rfloor + \left\lfloor \dfrac{n_{SRS} \bmod \prod_{b'-b_{hop}}^{b} N_{b'}}{2\prod_{b'-b_{hop}}^{b-1} N_{b'}} \right\rfloor & \text{if } N_b \text{ even} \\ \lfloor N_b/2 \rfloor \lfloor n_{SRS}/\prod_{b'-b_{hop}}^{b-1} N_b \rfloor & \text{if } N_b \text{ odd} \end{cases}$$

and where $N_{b_{hop}} = 1$ regardless of the value of $N_b$. The quantity $n_{SRS}$ counts the number of SRS transmissions. For the case of an SRS resource configured as aperiodic by the higher-layer parameter resourceType, it is given by $n_{SRS} = \lfloor l'/R \rfloor$ within the slot in which the $N_{symb}^{SRS}$ symbol SRS resource is transmitted. The quantity $R \leq N_{sym}^{SRS}$ is the repetition factor given by the field repetitionFactor contained in the higher-layer parameter resourceMapping.

As described above, the 5G or NR UE supports a single user-MIMO (SU-MIMO) technique, and has maximally 4 transmission antennas. Further, the NR UE may simultaneously transmit the SRSs to a plurality of CCs or to a plurality of SRS subbands in the CC. In case of the 5G or NR system, unlike the LTE system, various numerologies are supported, plural number of SRS transmission symbols may be variously configured, and repeated transmission for the SRS transmission through the repetition factor may be allowed.

Accordingly, it is necessary to count the SRS transmissions in consideration of this. Counting of the SRS transmissions may diversely be utilized. For example, counting of the SRS transmission may be utilized to support antenna switching in accordance with the SRS transmission. Specifically, transmission of the SRS corresponding to any antenna in any band and at any SRS transmission time may be determined by the SRS transmission counting.

Hereinafter, a rate matching operation and a puncturing operation will be described in detail.

If a time for transmitting a certain symbol sequence A and frequency resource overlap a certain time and frequency resource B, the rate matching or puncturing operation may be considered as a transmission/reception operation in consideration of resource C in an area in which resource A and resource B overlap each other. The detailed operation may follow the following contents.

The rate matching operation will be described. The base station may map channel A on only the remaining resource area excluding resource C corresponding to an area overlapping resource B among the whole resource A, being intended to transmit symbol sequence A to the UE. For example, in case that symbol sequence A is composed of {symbol #1, symbol #2, symbol #3, symbol #4}, resource A is composed of {resource #1, resource #2, resource #3, resource #4}, and resource B is composed of {resource #3, resource #5}, the base station may sequentially map the symbol sequence A on {symbol #1, symbol #2, symbol #4} being the remaining resources excluding {resource #3} corresponding to resource C among the resource A, and may transmit the mapped symbol sequence A. As a result, the base station may map the symbol sequence {symbol #1, symbol #2, symbol #3} on the {resource #1, resource #2, resource #4}, respectively, and may transmit the mapped symbol sequence.

The UE may determine resource A and resource B from scheduling information for symbol sequence A from the base station, and through this, may determine resource C that is the area in which resource A and resource B overlap each other. The UE may receive symbol sequence A on the assumption that symbol sequence A is mapped on the remaining area excluding resource C among the whole resource A, and the mapped symbol sequence A is transmitted. For example, in case that symbol sequence A is composed of {symbol #1, symbol #2, symbol #3, symbol #4}, resource A is composed of {resource #1, resource #2, resource #3, resource #4}, and resource B is composed of {resource #3, resource #5}, the UE may receive the symbol sequence A on the assumption that the symbol sequence A is mapped on {symbol #1, symbol #2, symbol #4} being the remaining resources excluding {resource #3} corresponding to resource C among the resource A. As a result, the UE may perform the subsequent series of reception operations on the assumption that the symbol sequence {symbol #1, symbol #2, symbol #3} is mapped on the {resource #1, resource #2, resource #4}, and is transmitted.

Next, a puncturing operation will be described. If resource C corresponding to an area overlapping resource B among the whole resource A, being intended to transmit symbol sequence A to the UE, is present, the base station may map the symbol sequence A on the whole of resource A, but may not perform transmission in the resource area corresponding to resource C, and may perform transmission only with respect to the remaining resource area excluding resource C among the resource A. For example, For example, in case that symbol sequence A is composed of {symbol #1, symbol #2, symbol #3, symbol #4}, resource A is composed of {resource #1, resource #2, resource #3, resource #4}, and resource B is composed of {resource #3, resource #5}, the base station may map the symbol sequence A {symbol #1, symbol #2, symbol #3, symbol #4} on the resource A {resource #1, resource #2, resource #3, resource #4}, respectively, and may transmit only the symbol sequence {symbol #1, symbol #2, symbol #4} corresponding to the remaining resource {resource #1, resource #2, resource #4} excluding {resource #3} corresponding to resource C among the resource A, but may not transmit {symbol #3} mapped on {resource #3} corresponding to resource C. As a result, the base station may map the symbol sequence {symbol #1, symbol #2, symbol #4} on the {resource #1, resource #2, resource #4}, respectively, and may transmit the mapped symbol sequence.

The UE may determine resource A and resource B from scheduling information for symbol sequence A from the base station, and through this, may determine resource C that is the area in which resource A and resource B overlap each other. The UE may receive symbol sequence A on the assumption that symbol sequence A is mapped on the whole resource A, but is transmitted only in the remaining area excluding resource C among the resource area A. For example, in case that symbol sequence A is composed of {symbol #1, symbol #2, symbol #3, symbol #4}, resource A is composed of {resource #1, resource #2, resource #3, resource #4}, and resource B is composed of {resource #3, resource #5}, the UE may assume that the symbol sequence A {symbol #1, symbol #2, symbol #3, symbol #4} is mapped on the resource A {resource #1, resource #2, resource #3, resource #4}, but {symbol #3} mapped on {resource #3} corresponding to resource C is not transmitted, and may receive the symbol sequence A on the assumption that the symbol sequence A is mapped on symbol sequence {symbol #1, symbol #2, symbol #4} corresponding to the remaining resources {resource #1, resource #2, resource #4} excluding {resource #3} corresponding to resource C among the resource A, and the mapped symbol sequence A is transmitted. As a result, the UE may perform the subsequent series of reception operations on the assumption that the symbol sequence {symbol #1, symbol #2, symbol #4} is mapped on the {resource #1, resource #2, resource #4}, and the mapped symbol sequence is transmitted.

Next, a rate matching resource will be described. FIG. 15 is a diagram explaining a method in which a base station and a UE transmit or receive data in consideration of a downlink data channel and a rate matching resource.

In FIG. 15, a downlink data channel (PDSCH) 1500 and a rate matching resource 1510 are illustrated. The base station may configure one or a plurality of rate matching resources 1510 through upper layer signaling (e.g., RRC signaling). In configuration information of the rate matching resource 1510, time axis resource allocation information 1520, frequency axis resource allocation information 1530, and cycle information 1540 may be included. Hereinafter, a bitmap corresponding to the frequency axis resource allocation information 1530 is called "first bitmap", a bitmap corresponding to the time axis resource allocation information 1520 is called "second bitmap", and a bitmap corresponding to the cycle information 1540 is called "third bitmap". If all or some of time and frequency resources of a scheduled data channel 1500 overlap the configured rate matching resource 1510, the base station may transmit the data channel 1500 by rate-matching the data channel 1500 in a part of a rate matching resource 15-02, and the UE may perform reception and decoding after assuming that the data channel 1500 has been rate-matched in the part of the rate matching resource 1510.

The base station may dynamically notify the UE whether to perform rate matching of the data channel through DCI in the configured rate matching resource part through additional configuration (corresponding to a rate matching indicator in the above-described DCI format). Specifically, the base station may select and group some of the configured rate matching resources into a rate matching resource group, and may instruct the UE whether to perform rate matching of a data channel for each rate matching resource group through the DCI by using the bitmap method. For example, in case that 4 rate matching resources RMR #1, RMR #2, RMR #3, and RMR #4 are configured, the base station may configure RMG #1={RMR #1, RMR #2} and RMG #2={RMR #3, RMR #4} as the rate matching groups, and may instruct the UE whether to perform rate matching in RMG #1 and RMG #2, respectively, by using 2 bits in a DCI field. For example, the base station may configure the respective bits to "1" in case that the rate matching should be performed, and may configure the respective bits to "0" in case that the rate matching should not be performed.

In the 5G system, granularity of "RB symbol level" and "RE level" is supported as a method for configuring the above-described rate matching resource to the UE. More specifically, the following configuration method may follow.

Hereinafter, a rate matching resource configuration method of the RB symbol level will be described. The UE may be configured with maximally 4 RateMatchPattern by bandwidth parts through upper layer signaling, and one RateMatchPattern may include the following contents.

As a reserved resource in a bandwidth part, it may include
a resource on which time and frequency resource areas of the corresponding reserved resource are configured through a combination of a bitmap of an RB level and a bitmap of a symbol level on frequency axis. The reserved resource may be spanned through one or two slots. A time domain pattern (periodicityAndPattern) in which the time and frequency areas composed of a bitmap pair of the RB level and the symbol level are repeated may be additionally configured.

A resource area corresponding to time and frequency domain resource areas configured by a control resource set in the bandwidth part and a time domain pattern configured by search space configuration in which the corresponding resource area is repeated may be included.

Next, a method for configuring an RE level rate matching resource will be described. The UE may be configured with the following contents through upper layer signaling.

As configuration information (lte-CRS-ToMatchAround) for RE corresponding to an LTE CRS (cell-specific reference signal or common reference signal) pattern, it may include the number of LTE CRS ports (nrofCRS-Ports) and an LTE-CRS-vshift(s) value (v-shift), center subcarrier location information of an LTE carrier from a reference frequency point (e.g., reference point A), LTE carrier bandwidth size (carrierBandwidthDL) information, and subframe configuration information (mbsfn-SubframConfigList) corresponding to a multicast-broadcast single-frequency network (MBSFN). The UE may determine the CRS location in an NR slot corresponding to an LTE subframe based on the above-described information.

Configuration information for a resource set corresponding to one or a plurality of ZP CSI-RSs in the bandwidth part may be included.

FIG. 16 is a diagram illustrating an example of uplink-downlink configuration being considered in a 5G communication system. In the 5G communication system, the uplink-downlink configuration of symbol/slot may include three operations. First, the uplink-downlink of the symbol/slot may be semi-statically configured through cell-specific configuration information 1610 through system information in a symbol unit. Specifically, the cell-specific uplink-downlink configuration information through the system information may include uplink-downlink pattern information and reference subcarrier information. Through the uplink-downlink pattern information, the base station may indicate a pattern period 1603, the number 1611 of successive downlink slots from a start point of each pattern, the number 1612 of symbols of the next slot, the number 1613 of successive uplink slots from an end of the pattern, and the number 1614 of symbols of the next pattern. In this case, the UE may determine the slot and the symbol that are not indicated as the uplink and the downlink as flexible slot and symbol.

Second, the base station may indicate slots 1621 and 1622 including a flexible slot or a flexible symbol through user-specific configuration information 1620 through dedicated upper layer signaling as the number 1623 and 1625 of successive downlink symbols from a start symbol of each slot and the number 1624 and 1626 of successive uplink symbols from an end of the slot, or the base station may indicate all slots as downlink slots or may indicate all slots as uplink slots.

Last, in order to dynamically change the downlink signal transmission and uplink signal transmission periods, it may be indicated whether symbols indicated as the flexible symbols in each slot (i.e., symbols that are not indicated as the downlink and the uplink) are downlink symbols or uplink symbols or flexible symbols through a slot format indicator (SFI) 1631 and 1632 included in the downlink control channel. The slot format indicator may select one index from the table in which the uplink-downlink configuration of 14 symbols in one slot is preconfigured.

TABLE 32

| Format | \multicolumn{14}{c}{Symbol number in a slot} |
|---|---|---|---|---|---|---|---|---|---|---|---|---|---|---|

| Format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | \multicolumn{14}{c}{Reserved} |
| 255 | \multicolumn{14}{l}{UE determines the slot format for the slot based on TDD-UL-DL-ConfigurationCommon, or TDD-UL-DL-ConfigDedicated and, if any, on detected DCI formats} |

In the 5G mobile communication service, in comparison to the LTE communication service in the related art, additional coverage expansion technology has been introduced, but in the actual 5G mobile communication service, a TDD system suitable to services having substantially high downlink traffic share is utilized, and as the center frequency becomes higher to increase the frequency band, the coverage of the base station and the UE is reduced, and thus the coverage enhancement has become core requirements. In particular, since the UE transmission power is generally lower than the base station transmission power, and the ratio of the downlink resource is higher than that of the uplink resource in time domain in order to support the service having high downlink traffic share, the coverage enhancement of the uplink channel becomes the core requirements. Physically, for the coverage enhancement of the uplink channel of the base station and the UE, there are methods to increase time resources of the uplink channel, to lower the center frequency, or to heighten the transmission power of the UE. However, it is difficult to change the frequency since the frequency bands are determined by network operators, and the maximum transmission power of the UE is regularly determined since the maximum value thereof is determined to reduce interference.

Accordingly, for the coverage enhancement of the base station and the UE, the ratio of the uplink and downlink resources is not shared in the time domain in accordance with the traffic share of the uplink and the downlink as in the TDD system, but the uplink and downlink resources can be shared even in the frequency domain like the FDD system. A system capable of flexibly sharing the uplink resource and the downlink resource in the time domain and the frequency domain may be called an XDD system, a flexible TDD system, a hybrid TDD system, a TDD-FDD system, or a hybrid TDD-FDD system, and in the disclosure, the system is called the XDD system.

FIG. 17 is a diagram illustrating an example of uplink-downlink configuration of an XDD system. From the viewpoint of the base station, in the uplink-downlink configuration 1700 of the overall XDD system, the uplink or downlink resource may be flexibly assigned to each symbol or slot in accordance with the traffic share of the uplink and the downlink in the full frequency band. In this case, a guard band may be assigned between the frequency bands of the downlink resource 1701 and the uplink resource 1702. This guard band may be assigned to reduce interference for the uplink channel or signal reception due to out-of-band emission that occurs when the base station transmits a downlink channel or signal on the downlink resource.

In this case, as an example, by the configuration of the base station, UE 1 170 generally having the downlink traffic that is higher than the uplink traffic may be assigned with the downlink resource more than the uplink resource (in an example of FIG. 17, it is assumed that the ratio of the downlink resource to the uplink resource is 4:1 in the time domain). At the same time, UE 2 1705 that operates at a cell edge and thus has insufficient uplink resource may be assigned with the downlink resource less than the uplink resource by the configuration of the base station (in the example of FIG. 17, it is assumed that the ratio of the downlink resource to the uplink resource is 1:4 in the time domain).

As in the above example, the downlink transmission efficiency is enhanced by assigning more downlink resource to UEs operating relatively in the cell center and having higher downlink traffic in the time domain, and the coverage can be improved by assigning more uplink resource to UEs operating relatively at the cell edge in the time domain. In this case, the corresponding base station 1700 may configure most time resources as flexible (F) during cell-specific UL/DL configuration for flexible DL/UL configuration (1715).

In this example, with respect to UEs that do not support full duplex capable of performing UL/DL simultaneous transmission and reception in the same time and frequency resources, the base station is required to divide the downlink resource and the uplink resource of the UE (e.g., UE 1 1710) receiving the downlink signal and the UE (e.g., UE 2 1705) transmitting the uplink signal in a specific time (e.g., second to fourth time period of FIG. 17). The division of the downlink resource and the uplink resource may be performed through one of two methods below.

First method is a method for configuring frequency configuration information of DL BWP of UE 1 1710 and UL BWP of UE 2 1705 so as not to overlap each other. This method has the advantage of minimizing an influence being exerted on implementation of the UE and the base station, but has the disadvantage of lack of flexibility and taking a long time since BWP switching is necessary in case of changing the frequency resource share between the downlink and the uplink in one time resource. For convenience in explanation, the first method is hereinafter called a BWP based XDD operation method.

Second method is a method in which the base station assigns the scheduled PDSCH of UE 1 1710 and the scheduled PUSCH of UE 2 1705 so that they do not overlap each other on the frequency axis. The method has the advantage of very high flexibility and a very fast speed of changing the frequency resource share between the downlink and the uplink based on the base station scheduling, and has the disadvantage of a risk of various problems to be described later in the following embodiments since some or all of the frequency configuration information of the DL BWP of UE 1 1710 and the UL BWP of UE 2 1705 may overlap each other.

FIG. 18 is a diagram illustrating another example of uplink-downlink configuration of an XDD system. With reference to FIG. 18, it is possible for the base station to properly use the above two downlink and uplink frequency resource dividing methods for the XDD system. As an example, from the viewpoint of the base station, configuration of uplink-downlink resources as 1820 may be assumed. The base station may allocate the downlink and uplink resource ratio of 4:1 in the time domain to UEs 1825 and 1830 having the downlink traffic higher than the uplink traffic. At this time, in case that the base station applies the BWP based XDD operation method to a certain UE as 1830, scheduled PDSCH 1800 and scheduled PUSCH 1805 are unable to be assigned to an area 1815 excluding the activated DL BWP and UL BWP at 1830, and thus the UE is unable to use a resource of a specific area, resulting in that some uplink/downlink throughput of the UE may be constrained.

If the base station applies the scheduling based XDD operation method to a certain UE as 1825, the base station has the higher scheduling degree of freedom than that of the BWP based XDD operation, and as needed, the base station may allocate the PDSCH to a wide frequency band (e.g., like the first time period of 1825), or may not allocate the PDSCH to the specific frequency band in a period in which uplink transmission of another UE is necessary (e.g., the second to fourth time periods of 1825).

Similarly, the base station may assign the downlink and uplink resource ratio of 1:4 in the time domain to UEs 1835 and 1840 having the uplink traffic higher than the downlink traffic. At this time, in case that the base station applies the BWP based XDD operation method to a certain UE as 1840, scheduled PDSCH 1800 and scheduled PUSCH 1805 are unable to be allocated to an area 1815 excluding the activated DL BWP and UL BWP at 1840, and thus the UE is unable to use a resource of a specific area, resulting in that some uplink/downlink throughput of the UE may be constrained.

If the base station applies the scheduling based XDD operation method to a certain UE as 1835, the base station has the higher scheduling degree of freedom than that of the BWP based XDD operation, and as needed, the base station may allocate the PUSCH to a wide frequency band (e.g., like the fifth time period of 1835), or may not assign the PUSCH to the specific frequency band in a period in which downlink reception of another UE is necessary (e.g., like the second to fourth time periods of 1835).

Meanwhile, in the resource 1810 which is included in the activated DL BWP or UL BWP in the above example, but to which the PDSCH or PUSCH is not actually allocated for the XDD operation, ambiguity may occur in the base station and UE operations. As an example, in case of TRS (CSI-RS for tracking), a smaller value between 52 RBs and the BWP bandwidth in which the corresponding TRS is transmitted is used as the transmission bandwidth, and in case of the UE, like UE 1825, which operates in the activated DL BWP including the XDD uplink band of another UE, there is a risk to assume that the TRS is transmitted in the area 1810 to which the downlink resource such as the PDSCH is not assigned for the XDD operation. Similarly, in case of the UE that operates in the activated UL BWP including the XDD downlink band of another UE, like UE 1835, there is a risk to assume that the periodic or semi-persistent uplink channel, such as the SRS or PUCCH, or the signal is transmitted in the area 1810 to which the downlink resource such as the PUSCH is not assigned for the XDD operation.

The disclosure can support flexible DL/UL configurations by providing an uplink/downlink reference signal transmission or reception method in consideration of various XDD operation scenarios. Hereinafter, the main gist of the disclosure will be described through detailed embodiments.

In the NR system, a tracking RS (TRS) may be configured for fine time/frequency tracking of the base station. Although it is possible that the TRS is referred to as another term, such as CSI-RS for tracking, in the specification, in the present specification, for convenience in explanation, the TRS is referred to as TRS. The TRS may be transmitted in a specific period of 10 ms or 20 ms in one (X=1) or two (X=2) successive slots, and this may be called TRS burst.

FIG. 19 illustrates an RE pattern of TRS according to some embodiments.

With reference to FIG. 19, examples of possible TRS patterns in one slot are illustrated. As illustrated in FIG. 19, the TRS has frequency RE density of 3 RE/RB/port, and the TRS RE may be repeated every 4 subcarriers (i.e., one TRS port is transmitted from one of 0, 1, 2, and 3 REs inscribed in the TRS OFDM symbol REs of FIG. 19). Further, according to some embodiments, it may be possible that the TRS is transmitted from one of three kinds of OFDM symbol pairs of [{fifth, ninth}, {sixth, tenth}, {seventh, eleventh}] in the frequency band equal to or lower than 6 GHz being referred to as frequency range 1 (FR1), and it may be possible that the TRS is transmitted from one of 10 kinds of OFDM symbol pairs of [{first, fifth}, {second, sixth}, {third, seventh}, {fourth, eighth}, {fifth, ninth}, {sixth, tenth}, {seventh, eleventh}, {eighth, twelfth}, {ninth, thirteenth}, {tenth, fourteenth}] in the frequency band equal to or higher than 6 GHz being referred to as frequency range 2 (FR2). In FIG. 19, the OFDM symbol location is an example of TRS configuration, and it is to be noted that the actual transmission location may be changed in accordance with the base station transmission.

FIG. 20A is a diagram illustrating 1-Port CSI-RS configuration according to some embodiments.

With reference to FIG. 20A, FIG. 20A illustrates an example of 1-port CSI-RS configuration for covering the TRS RE pattern of FIG. 19. According to FIG. 20A, the base station may configure one resource set for one resource configuration, and may configure maximally four CSI-RS resources therein. In this case, the CSI-RS frequency RE density is configured as 3 RE/RB/port. If X=1 TRS burst is used, the base station configures CSI-RS resource #0 (2000) and CSI-RS resource #1 (2010). FIG. 20A is a diagram illustrating X=1 TRS burst. FIG. 20B is a diagram illustrating another 1-Port CSI-RS configuration according to some embodiments. In case of X=2 TRS burst, the base station configures CSI-RS resource #0 (2000), #1 (2010), #2 (2020), and #3 (2030) in all. In particular, FIG. 20B is a diagram illustrating X=2 TRS burst. In case of X=1 or X=2 TRS burst, the UE may assume the same antenna ports having the same port index for the CSI-RS resources being configured in one resource set, and based on this, the UE may perform successive time/frequency tracking. Further, in case that the CSI-RS resources are configured as the TRS, the base station may not configure the corresponding report configuration (CSI-ReportConfig) (i.e., report setting referring to the corresponding CSI-RS resource is not present), or may make the configuration value of the report configuration "none", and the UE may use the corresponding CSI-RS resources for the purpose of time/frequency tracking, and may secure not to generate the CSI report.

In FIG. 20, the subcarrier locations of 1-port CSI-RS resources and OFDM symbol locations may be suitably changed in accordance with the TRS subcarrier locations of FIG. 19.

It is possible to transmit the TRS in various forms of "periodic", "semi-persistent", and "aperiodic". In case of the periodic TRS (P-TRS), it is periodically transmitted until the RRC reconfiguration in accordance with the period and slot offset values being configured by RRC signaling. In case of the semi-persistent TRS (SP-TRS), it is transmitted until being deactivated after being activated by the MAC CE or DCI based on the period and slot offset being configured by RRC signaling. In case of the aperiodic TRS (A-TRS), it is triggered and transmitted by the MAC CE or DCI without configuration of the period or slot offset values. In this case, the A-TRS triggering and A-TRS transmission timing can have offsets configured by an upper layer, or can follow promised values (e.g., so that the A-TRS is transmitted to the slot such as A-TRS triggering).

In case of the aperiodic TRS (A-TRS), it may be difficult to measure the statistical characteristic due to the insufficient number of time axis REs, and thus it may be associated with the aperiodic TRS or semi-persistent TRS. The connection between the A-TRS and the SP-TRS or the P-TRS can be supported through various methods, such as quasi co-location (QCL). For example, it is possible for the base station to enable the UE to extract channel statistical values, such as delay spread, average delay, Doppler spread, and Doppler shift (QCL type A), or to enable the UE to extract spatial parameters, such as transmission beam and reception beam (QCL type D) by configuring at least one of SP-TRS or P-TRS to the A-TRS as the reference RS for the QCL.

Further, the upper layer parameter freqBand for the TRS indicates bandwidth information, and if the BWP bandwidth being transmitted by the corresponding TRS is smaller than 52 RBs, the TRS bandwidth is equal to the BWP bandwidth, whereas if the BWP bandwidth being transmitted by the corresponding TRS is equal to or larger than 52 RBs, the TRS bandwidth is configured to 52 RBs.

Hereinafter, although the disclosure proposes a method and an apparatus for transmitting or receiving a reference signal of a base station and a UE in consideration of XDD, the gist of the disclosure is not limited to the XDD system, but may be similarly applied even to a method and an apparatus for transmitting or receiving a channel and a signal for duplex methods (e.g., full duplex) capable of being provided from the 5G system for other similar purposes.

First Embodiment

In the first embodiment, a downlink reference signal (or sequence or channel) transmission or reception method in consideration of an XDD operation and corresponding uplink channel transmission or reception methods are provided.

As described above, in case of the XDD operation, if the frequency resource that is configured and activated as a downlink bandwidth part for UE A is the frequency resource that can be used as the uplink resource for another UE B in a specific time period, it is necessary that 1) the base station does not assign and transmit the downlink channel or signal for UE A, or 2) the base station assigns the uplink channel or signal for UE B in consideration of the downlink signal of UE A. In this case, the base station and the UE can clear ambiguity of the base station and UE operations, and can enhance the XDD uplink/downlink quality by using at least one of the following methods.

[Method 1]: UL Rate Matching Pattern for TRS

The first method is to introduce an uplink rate matching resource in consideration of a downlink signal of the UE A. In this case, it is possible to configure the uplink rate matching pattern to include a CSI-RS RE mapping pattern to a TRS RE mapping pattern, and as an example, the uplink rate matching pattern may be promised to coincide with one of the CSI-RS RE mapping pattern to the TRS RE mapping pattern at an RE level. As another example, it is possible for the uplink rate matching pattern to notify of the rate matching period at a specific OFDM symbol level in a slot on the time axis, and in this case, the designated rate matching period may include one or more guard symbols (guards or guard periods) for preventing interferences between not only OFDM symbols for transmitting the downlink signal and/or the channel but also the uplink and the downlink and for reducing implementation complexity of the UE and the base station. As another example, it is possible for the uplink rate matching pattern to notify of the rate matching period at the RB level or resource block group (RBG) level in the bandwidth part on the frequency axis, and in this case, the designated rate matching period may include one or more guard PRBs (or guard bands) for preventing interferences between not only frequency bands for transmitting the downlink signal and/or the channel but also the uplink and the downlink and for reducing implementation complexity of the UE and the base station. As an example, the uplink rate matching pattern may be configured by one or more combinations of the above-described examples. Further, the uplink rate matching pattern may be configured by a combination of at least one of frequency axis resource assignment information, time axis resource assignment information, and cycle information, and the respective pieces of information may be in the form of a bitmap or a bit sequence. In this case, each bit of the bitmap may be predetermined, or may indicate whether the resource is rate-matched in accordance with the frequency band of a predetermined unit or the time band of a predetermined unit that is determined based on the upper layer signaling.

The uplink rate matching pattern may be configured in a lower layer of the XDD uplink configuration, and may be semi-statically indicated so as to be applied to the time period to which the XDD is applied, or may be dynamically indicated with reference to information in UL grant (DCI assigning the PUSCH) or DL grant (DCI assigning the PUCCH for the PDSCH and related HARQ-ACK transmission). As an example, the uplink rate matching indication information in the DCI may be composed of one or more bits, and may notify of whether all or some of the configured uplink rate matching pattern are applied. In this case, one of bits representing the uplink rate matching indication information in the DCI may be associated with one or more uplink rate matching patterns configured through the upper layer signaling. That is, as an example, in case that the one bit in the DCI is configured as a predetermined value (e.g., 1 or 0) and is transmitted to the UE, the UE determines that one or more uplink rate matching patterns associated with the one bit are applied.

Further, in case that the uplink rate matching pattern is semi-statically configured, it is also possible to apply the pattern to the UE (without dynamic indication of DCI).

It is possible that the uplink rate matching pattern is considered when mapping the PUSCH RE being transmitted to time and frequency resources overlapping the corresponding rate matching pattern, or is considered during the PUCCH RE mapping or during the UL RS transmission.

FIG. 21 is a diagram explaining a method in which a base station and a UE transmit or receive data in consideration of an uplink data channel and a rate matching resource.

In FIG. 21, uplink data or control channel (PUSCH or PUCCH) 2100 and a rate matching resource 2110 are illustrated. The base station may configure one or a plurality of rate matching resources 2110 to the UE through upper layer signaling (e.g., RRC signaling). The configuration information of the rate matching resource 2110 may include time axis resource allocation information 2120 capable of including a guard symbol, frequency axis resource allocation information 2130, and cycle information 2140. Further, selectively, the configuration information of the rate matching resource 21-02 may include at least one of information indicating the RS RE mapping pattern (it may be information indicating at least one of a plurality of RS RE mapping patterns that are predetermined or configured through the upper layer signaling), frequency axis resource allocation information, and cycle information. Hereinafter, a bitmap or a bit sequence corresponding to the frequency axis resource allocation information 2130 is called "first bitmap", a bitmap or a bit sequence corresponding to the time axis resource allocation information 2120 is called "second bitmap", and a bitmap or a bit sequence corresponding to the cycle information 2140 is called "third bitmap".

If all or some of time and frequency resources of scheduled data or control channel 2100 overlap the configured rate matching resource 2110, the UE may perform rate matching of the data or control channel 2100 in the part of the rate matching resource 2110 to be transmitted, and the base station may perform reception and decoding after assuming that the data or control channel 21-00 has been rate-matched.

Through additional configuration, the base station may dynamically notify the UE whether to perform rate matching of an uplink channel in the configured uplink rate matching resource part through the DCI (corresponding to "uplink rate matching indication information" in the above-described DCI format).

Specifically, the base station may select and group some of the configured rate matching resources into a rate matching resource group, and may instruct the UE whether to perform rate matching of an uplink channel for each rate matching resource group through the DCI by using the bitmap method. For example, in case that 4 rate matching resources RMR #1, RMR #2, RMR #3, and RMR #4 are configured, the base station may configure RMG #1={RMR #1, RMR #2} and RMG #2={RMR #3, RMR #4} as the rate matching groups, and may instruct the UE whether to perform rate matching in RMG #1 and RMG #2 by using 2 bits in a DCI field. For example, the base station may configure the respective bits to "1" in case that the rate matching should be performed, and may configure the respective bits to "0" in case that the rate matching should not be performed.

[Method 2]: UL Puncturing for TRS

The second method is to introduce an uplink channel puncturing in consideration of a downlink signal of the UE A. In this case, it is possible to configure the uplink puncturing pattern to include a CSI-RS RE mapping pattern to a TRS RE mapping pattern, and as an example, the uplink puncturing pattern may be promised to coincide with one of the CSI-RS RE mapping pattern to the TRS RE mapping pattern at an RE level. As another example, it is possible for the uplink puncturing pattern to notify of the puncturing period at a specific OFDM symbol level in a slot on the time axis, and in this case, the designated puncturing period may include one or more guards (or guard periods) for preventing interferences between not only OFDM symbols for transmitting the downlink signal and/or the channel but also the uplink and the downlink and for reducing implementation complexity of the UE and the base station. As another example, it is possible for the uplink puncturing pattern to notify of the rate matching period at the RB level or RBG level in the bandwidth part on the frequency axis, and in this case, the designated puncturing period may include one or more guard PRBs (or guard bands) for preventing interferences between not only frequency bands for transmitting the downlink signal and/or the channel but also the uplink and the downlink and for reducing implementation complexity of the UE and the base station. Further, as an example, the uplink puncturing pattern may be configured by one or more combinations of the above-described examples. Further, the uplink puncturing pattern may be configured by a combination of at least one of frequency axis resource assignment information, time axis resource assignment information, and cycle information, and the respective pieces of information may be in the form of a bitmap or a bit sequence. In this case, each bit of the bitmap may be predetermined, or may indicate whether the resource is rate-matched in accordance with the frequency band of a predetermined unit or the time band of a predetermined unit that is determined based on the upper layer signaling.

The uplink puncturing pattern may be configured in a lower layer of the XDD uplink configuration, and may be semi-statically indicated so as to be applied to the time period to which the XDD is applied, or may be dynamically indicated with reference to information in UL grant (DCI allocating the PUSCH) or DL grant (DCI allocating the PUCCH for the PDSCH and related HARQ-ACK transmission). As an example, the uplink puncturing indication information in the DCI may be composed of one or more bits, and may notify of whether all or some of the configured uplink puncturing resource are applied. In this case, one of bits representing the uplink puncturing indication information in the DCI may be associated with one or more uplink puncturing patterns configured through the upper layer signaling. That is, as an example, in case that the one bit in the DCI is configured as a predetermined value (e.g., 1 or 0) and is transmitted to the UE, the UE determines that one or more uplink rate matching patterns associated with the one bit are applied.

Further, in case that the uplink puncturing pattern is semi-statically configured, it is also possible to apply the pattern to the UE (without dynamic indication of DCI).

It is possible that the uplink puncturing pattern is considered when mapping the PUSCH RE being transmitted to time and frequency resources overlapping the corresponding puncturing resource, or is considered during the PUCCH RE mapping or during the UL RS transmission.

[Method 3]: Flexible TRS Frequency Location Configuration

The third method is to introduce flexible TRS or CSI-RS frequency location configuration. As an example, it is possible to expand the TRS bandwidth configuration in the related art, which follows the minimum value among 52 RBs or downlink bandwidth part, so that configuration of sub-bands in the downlink bandwidth part becomes possible. In this case, the UE may report the minimum TRS bandwidth value X being preferred by the corresponding UE to the base station through the UE capability report, and the base station may promise the UE to configure the TRS having the bandwidth over X. In this case, in order to secure the time/frequency tracking performance of the UE, the base station may configure two or more pieces of frequency configuration information (freqBand) to one CSI-RS resource. For example, the first frequency configuration information value is a value to satisfy the condition in the related art (minimum value among 52 RBs or downlink bandwidth part), and the second frequency configuration information value may have a value that is smaller than the value of the first frequency configuration information value for efficient XDD operation.

The one or more pieces of TRS or CSI-RS bandwidth information may be configured onto the lower layer of the XDD downlink configuration so that the XDD is applied together with the time period to which the XDD is applied, and may be semi-statically indicated through upper layer signaling, or may be dynamically indicated with reference to information in the DCI or MAC CE. The TRS/CSI-RS frequency band indication information in the DCI or MAC CE may be composed of one or more bits (e.g., through upper layer signaling), and may notify of whether one of the configured TRS and/or CSI-RS frequency band is applied.

FIG. 22 is a diagram illustrating an example of reference signal transmission band configuration for XDD operation according to an embodiment of the disclosure.

With reference to FIG. 22, the base station may configure one or more pieces of frequency band information 2205 and 2210, one piece of time axis information 2215, and one piece of transmission period information 2220 with respect to a certain downlink reference signal 2200. Thereafter, the base station and the UE transmit or receive a downlink reference signal in accordance with the first frequency band information 2205 in the time period (slot 0 to slot 2) to which the XDD is not applied. Thereafter, if the XDD operation starts to be applied (2225), the base station and the UE may transmit or receive the downlink reference signal in accordance with the second frequency band information 2210 preconfigured from the application start time or the time indicated to use the second frequency band, determined by the standard, or configured for the XDD from the time after the configured offset 2230.

The offset 2230 may be defined as the slot level or the OFDM symbol level from the XDD application time or the time indicated to use the second frequency band information. As an example, if the offset is a T slot or a T symbol, the base station may transmit the downlink reference signal in accordance with the second frequency band information after T symbol (or from the first slot after the T slot or the T symbol) from the XDD application time or the time indicated to use the second frequency band, and the UE may receive the downlink reference signal.

FIG. 23 is a diagram illustrating an example of uplink rate matching resource configuration (or puncturing resource configuration or downlink reference signal configuration) and application process according to an embodiment of the disclosure. With reference to FIG. 23, the base station may configure bandwidth configuration information for one or more downlink bandwidth parts and uplink bandwidth parts to the UE for an XDD operation, and the UE may receive this (2300). Thereafter, the UE may receive, from the base station, at least one of uplink rate matching configuration information for the XDD operation, uplink puncturing resource information, or downlink reference signal frequency band information in accordance with the above-described method 1 to method 3 (2310). The UE may map the signal on the uplink channels, such as PUSCH or PUCCH, based on the configuration information, or may properly receive the downlink reference signal (2320).

Second Embodiment

In the second embodiment, an uplink reference signal (or sequence or channel) transmission or reception methods in consideration of an XDD operation are provided.

As described above, in case of the XDD operation, if the frequency resource that is configured and activated as an uplink bandwidth part for UE A is the frequency resource that can be used as the downlink resource for another UE B in a specific time period, it is necessary that 1) the UE A does not allocate and transmit the uplink channel or signal (SRS and PUCCH) for UE A, or 2) the UE A allocates the downlink channel or signal for UE B in consideration of the uplink signal of UE A. In this case, the base station and the UE can clear ambiguity of the base station and UE operations for the above case, and can enhance the XDD uplink/downlink quality by using at least one of the following methods.

In the embodiment, it is possible that the XDD transmission period is configured through the upper layer signaling in a similar manner to the examples of the first embodiment, or that the XDD transmission period is dynamically indicated through DCI or MAC CE.

[Method 1]: SRS Transmission Drop/Skip in an XDD Operation Period

The first method is a method for enhancing the downlink reception quality of another UE in the corresponding time/frequency resource by dropping or skipping the periodic or semi-persistent SRS transmission in the time period for operating the XDD. As an example, in case that the UE performs the XDD operation based on the wide UL BWP such as 1835 of FIG. 18, and the base station configures the SRS bandwidth in consideration of the XDD uplink resource of the second to fourth slots, there is a risk of being unable to obtain channel information for the wideband uplink of the fifth slot or for the wideband downlink of the first slot. Accordingly, in this case, the base station may configure the SRS bandwidth in consideration of the wideband uplink of the fifth slot.

Thereafter, in performing the above-described SRS frequency hopping operation, the base station and the UE may not consider the slot in the XDD application period as the SRS transmission available period. This may be interpreted not to increase the SRS counter nSRS at the corresponding point in case that the periodic or semi-persistent SRS is configured and activated to be transmitted in the slot in the XDD application period. In case of an example of 18-35, the UE and the base station determine that the second to fourth slots are slots where the SRS transmission is not performed, and in case that the periodic or semi-persistent SRS is configured or activated to be transmitted in the slots, the transmission of the periodic or semi-persistent SRS may be dropped or skipped. The slot (or time period) in which the SRS transmission is not performed may be as follows. That is, specifically, it may be possible that the time period in which the XDD is applied is the time period that is configured through the upper layer signaling in a similar manner to the examples of the first embodiment, or may be the time period that is dynamically indicated through DCI or MAC CE, and as another example, the time period may be a slot or an OFDM symbol in which the uplink channel and/or signal transmission is not configured to some or all of the UL BWP frequency band, or in which the uplink rate matching or puncturing is configured. The technology for the time period (or XDD application time period) in which the XDD is applied may be applied to the entire disclosure.

[Method 2]: L1 Signaling Based SRS Transmission Drop/Skip

The second method is a method for enhancing the downlink reception quality of another UE in the corresponding time/frequency resource by introducing L1 signaling capable of canceling the periodic or semi-persistent SRS transmission in the time period for operating the XDD. As an example, in case that the UE performs the XDD operation based on the wide UL BWP such as 1835 of FIG. 18, and the base station configures the SRS bandwidth in consideration of the XDD uplink resource of the second to fourth slots, there is a risk of being unable to obtain channel information for the wideband uplink of the fifth slot or for the wideband downlink of the first slot. Accordingly, in this case, the base station may configure the SRS bandwidth in consideration of the wideband uplink of the fifth slot. Thereafter, in case that the corresponding DCI indicates the SRS transmission drop, the UE does not transmit the SRS at all XDD application time temporarily at the time associated through the offset from the corresponding DCI transmission/reception time or after receiving the corresponding DCI.

[Method 3]: ZP SRS

The third method is a method in which the RE overlapping the ZP SRS RE pattern does not transmit the SRS (hereinafter, it can be mixed with non-zero-power (NZP) SRS) by introducing zero power (ZP) SRS. According to the third method, unlike the first and second methods as described above, it is featured that some NZP SRS that do not overlap the ZP SRS in the XDD operation period (or even in the period in which the SRS transmission drop is indicated) can be transmitted or received. The ZP SRS may be configured in a similar method as the above-described SRS, and as an example, the ZP SRS may be configured by at least one of configuration information, such as a frequency domain position (information indicating the frequency domain position of the ZP SRS configuration) through the upper layer signaling, resource mapping information (information indicating the RE position of the ZP SRS), comb and offset information, and resource type information (periodic, aperiodic, or semi-persistent configuration indication), and may also be activated or deactivated (or triggered) through the DCI or MAC CE (similarly to the NZP SRS). If the RE for the SRS transmission configured based on the SRS configuration information and the ZP SRS configuration information received from the base station overlaps the ZP SRS RE, the UE may not perform the SRS transmission.

Similarly to the method 1 of the first embodiment, the third method makes it possible for the UE that receives the downlink signal in the XDD operation period and receives the PDSCH overlapping the ZP SRS RE pattern to perform the PDSCH rate matching. Through this, the base station may manage so that the interference between the UE and the uplink/downlink does not occur.

[Method 4]: PUCCH Dropping or PUCCH Resource Frequency Location Change

The fourth method is a method for enhancing the downlink reception quality of another UE in the corresponding time/frequency resource, in which the UE drops the PUCCH transmission or changes the resource location of the PUCCH resource in the time period for operating the XDD. As an example, in case that the UE performs the XDD operation based on the wide UL BWP such as 1835 of FIG. 18, and the base station configures the PUCCH frequency resource in consideration of the XDD UL of the second to fourth slots, there is a risk of being unable to use all the wideband uplink resource of the fifth slot for the PUCCH transmission.

Accordingly, in this case, the base station may configure the PUCCH frequency resource in consideration of the wideband uplink resource, and thereafter, in case of the slot (e.g., second to fourth slots) in the XDD application period, the UE may not consider the same as the PUCCH transmission available period, or may change the location of the PUCCH resource in the corresponding period into the second frequency resource configured for the XDD, and may transmit the PUCCH by using the changed resource. Further, the UE may always be scheduled on the PUSCH from the base station at the same time during the PUCCH transmission in the XDD application period, and may be secured to perform piggy back and transmit the PUCCH in the frequency resource assigned for the PUSCH (for PUSCH transmission). Through this, the base station can flexibly change the frequency band for transmission of the uplink control information (UCI) (including scheduling request, HARQ-ACK, and CSI).

FIG. 24 is a diagram illustrating an example of SRS transmission dropping and/or ZP SRS resource configuration and application process according to an embodiment of the disclosure. With reference to FIG. 24, the base station may configure bandwidth configuration information for one or more downlink bandwidth parts and uplink bandwidth parts to the UE for an XDD operation, and the UE may receive this (2300). Thereafter, the UE may receive at least one of NZP SRS configuration information (it may include L1 signaling capable of dropping the SRS configuration) and/or ZP SRS configuration information in accordance with above-described method 1 to method 3 (2410). When the XDD operation is applied, the UE may adjust the SRS transmission frequency location in accordance with the NZP SRS configuration information or may not perform the transmission. Further, based on the ZP SRS configuration information, the SRS transmission in the corresponding ZP SRS resource may not be performed (2420).

The above-described embodiments and methods are not exclusive, and may be combined with each other to be operated in accordance with the situations. For example, when the PUSCH is transmitted, method 1 of the first embodiment may be used, and when the PUCCH is transmitted, method 4 of the second embodiment may be applied. In order not to obscure the gist of the disclosure, all possible number of cases are not enumerated.

FIG. 25 is a block diagram of a UE according to an embodiment of the disclosure.

With reference to FIG. 25, a UE 2500 may include a transceiver 2510, a controller 2520, and a storage 2530. In accordance with the efficient channel and signal transmission or reception method in the 5G communication system corresponding to the above-described embodiment, the transceiver 2510, the controller 2520, and the storage 2530 of the UE 2500 may operate. However, the constituent elements of the UE 2500 according to an embodiment are not limited to those of the above-described examples. According to another embodiment, the UE 2500 may include more constituent elements or less constituent elements than the above-described constituent elements. In addition, in a specific case, the transceiver 2510, the controller 2520, and the storage 2530 may be implemented into one chip form.

According to another embodiment, the transceiver 2510 may be composed of a transmitter and a receiver. The transceiver 2510 may transmit or receive a signal with the base station. The signal may include control information and data. For this, the transceiver may be composed of an RF transmitter up-converting and amplifying the frequency of the transmitted signal, and an RF receiver low-noise-amplifying the received signal and down-converting the frequency. Further, the transceiver 2510 may receive the signal through a radio channel, output this to the controller 2520, and transmit the signal output from the controller 2520 through the radio channel.

According to the above-described embodiments of the disclosure, the controller 2520 may control a series of processes in which the UE 2500 can operate. For example, the controller 2520 may perform at least one of the method for transmitting the uplink channel/signal and the method for receiving the downlink channel/signal according to an embodiment of the disclosure. The storage 2530 may store control information, such as uplink-downlink configuration information and guard band configuration information included in the signal obtained from the UE 2500, and may have an area for storing data necessary for the control of the controller 2520 and data generated during the control of the controller 2520.

FIG. 26 is a block diagram of a base station according to an embodiment.

With reference to FIG. 26, the base station 2600 may include a transceiver 2610, a controller 2620, and a storage 2630. In accordance with the efficient channel and signal transmission or reception method in the 5G communication system corresponding to the above-described embodiment, the transceiver 2610, the controller 2620, and the storage 2630 of the base station 2600 may operate. However, the constituent elements of the base station 2600 according to an embodiment are not limited to those of the above-described examples. According to another embodiment, the base station 2600 may include more constituent elements or less constituent elements than the above-described constituent elements. In addition, in a specific case, the transceiver 2610, the controller 2620, and the storage 2630 may be implemented into one chip form. According to another embodiment, the transceiver 2610 may be composed of a transmitter and a receiver. The transceiver 2610 may transmit or receive a signal with the UE. The signal may include control information and data. For this, the transceiver may be composed of an RF transmitter up-converting and amplifying the frequency of the transmitted signal, and an RF receiver low-noise-amplifying the received signal and down-converting the frequency. Further, the transceiver 2610 may receive the signal through a radio channel, output this to the controller 2620, and transmit the signal output from the controller 2620 through the radio channel.

According to the above-described embodiments of the disclosure, the controller 2620 may control a series of processes in which the base station 2600 can operate. For example, the controller 2620 may perform at least one of the method for transmitting the uplink channel/signal and the method for receiving the downlink channel/signal according to an embodiment of the disclosure.

The storage 2630 may store control information, such as uplink-downlink configuration information and guard band configuration information included in the signal obtained from the base station 2600, and may have an area for storing data necessary for the control of the controller 2620 and data generated during the control of the controller 2620.

Meanwhile, embodiments disclosed in the specification and drawings are merely used to present specific examples to easily explain the technical contents of the disclosure and to help understanding of the disclosure, but are not intended to limit the scope of the disclosure. That is, it will be apparent to those of ordinary skill in the art to which the disclosure pertains that other modification examples based on the technical concept of the disclosure can be embodied. Further, as needed, the respective embodiments may be operated in combination.

The invention claimed is:

1. A method by a base station in a communication system, the method comprising:
  transmitting, to a user equipment (UE) via higher layer signaling, uplink rate matching configuration information, wherein the uplink rate matching configuration information includes at least one of time resource allocation information indicating time domain rate matching duration or frequency resource allocation information indicating frequency domain rate matching duration;
  transmitting, to the UE, downlink control information for scheduling uplink data; and
  receiving, from the UE, the uplink data,
  wherein the time domain rate matching duration includes at least one guard symbol,
  wherein the frequency domain rate matching duration includes at least one guard physical resource block (PRB),
  wherein rate matching based on a rate matching resource corresponding to the uplink rate matching configuration information is applied to a resource on which the uplink data is received, and
  wherein the rate matching resource corresponds to at least one of a time resource within the time domain rate matching duration except for the at least one guard symbol or a frequency resource within the frequency domain rate matching duration except for the at least one guard PRB.

2. The method of claim 1, wherein the rate matching is further based on a resource indicator included in the downlink control information.

3. The method of claim 1, wherein zero power sounding reference signal configuration information is transmitted via the higher layer signaling, and
  wherein the zero power sounding reference signal configuration information includes at least one of symbol information of a zero power sounding reference signal, frequency resource information of the zero power sounding reference signal, or resource type information of the zero power sounding reference signal.

4. The method of claim 1, further comprising transmitting, to the UE, downlink control information including information indicating cancellation of transmission of a sounding reference signal,
  wherein the information indicating the cancellation of the transmission of the sounding reference signal indicates the cancellation of the transmission of the sounding reference signal of the UE at a specific time.

5. A method by a user equipment (UE) in a communication system, the method comprising:
  receiving, from a base station via higher layer signaling, uplink rate matching configuration information, wherein the uplink rate matching configuration information includes at least one of time resource allocation information indicating time domain rate matching duration or frequency resource allocation information indicating frequency domain rate matching duration;
  receiving, from the base station, downlink control information for scheduling uplink data;
  and
  transmitting, to the base station, the uplink data on a resource to which rate matching is applied based on a rate matching resource corresponding to the uplink rate matching configuration information,
  wherein the time domain rate matching duration includes at least one guard symbol,
  wherein the frequency domain rate matching duration includes at least one guard physical resource block (PRB), and
  wherein the rate matching resource corresponds to at least one of a time resource within the time domain rate matching duration except for the at least one guard symbol or a frequency resource within the frequency domain rate matching duration except for the at least one guard PRB.

6. The method of claim 5, wherein rate matching is applied to the resource further based on a resource indicator included in the downlink control information.

7. The method of claim 5, wherein zero power sounding reference signal configuration information is received via the higher layer signaling, and
  wherein the zero power sounding reference signal configuration information includes at least one of symbol information of a zero power sounding reference signal, frequency resource information of the zero power sounding reference signal, or resource type information of the zero power sounding reference signal.

8. The method of claim 5, further comprising:
  receiving, from the base station, downlink control information including information indicating cancellation of transmission of a sounding reference signal; and
  cancelling the transmission of the sounding reference signal at a specific time.

9. A base station in a communication system, the base station comprising:

a transceiver; and
a processor configured with the transceiver and configured to:
- transmit, to a user equipment (UE) via higher layer signaling, uplink rate matching configuration information, wherein the uplink rate matching configuration information includes at least one of time resource allocation information indicating time domain rate matching duration or frequency resource allocation information indicating frequency domain rate matching duration;
- transmit, to the UE, downlink control information for scheduling uplink data; and
- receive, from the UE, the uplink data,
wherein the time domain rate matching duration includes at least one guard symbol,
wherein the frequency domain rate matching duration includes at least one guard physical resource block (PRB),
wherein rate matching based on a rate matching resource corresponding to the uplink rate matching configuration information is applied to a resource on which the uplink data is received, and
wherein the rate matching resource corresponds to at least one of a time resource within the time domain rate matching duration except for the at least one guard symbol or a frequency resource within the frequency domain rate matching duration except for the at least one guard PRB.

10. The base station of claim 9, wherein the rate matching is further based on a resource indicator included in the downlink control information.

11. The base station of claim 9, wherein zero power sounding reference signal configuration information is transmitted via the higher layer signaling, and
wherein the zero power sounding reference signal configuration information includes at least one of symbol information of a zero power sounding reference signal, frequency resource information of the zero power sounding reference signal, or resource type information of the zero power sounding reference signal.

12. The base station of claim 9, wherein the processor is further configured to transmit, to the UE, downlink control information including information indicating cancellation of transmission of a sounding reference signal,
wherein the information indicating the cancellation of the transmission of the sounding reference signal indicates the cancellation of the transmission of the sounding reference signal of the UE at a specific time.

13. A user equipment (UE) in a communication system, the UE comprising:
a transceiver; and
a processor configured with the transceiver and configured to:
- receive, from a base station via higher layer signaling, uplink rate matching configuration information, wherein the uplink rate matching configuration information includes at least one of time resource allocation information indicating time domain rate matching duration or frequency resource allocation information indicating frequency domain rate matching duration;
- receive, from the base station, downlink control information for scheduling uplink data; and
- transmit, to the base station, the uplink data on a resource to which rate matching is applied based on a rate matching resource corresponding to the uplink rate matching configuration information,
wherein the time domain rate matching duration includes at least one guard symbol,
wherein the frequency domain rate matching duration includes at least one guard physical resource block (PRB), and
wherein the rate matching resource corresponds to at least one of a time resource within the time domain rate matching duration except for the at least one guard symbol or a frequency resource within the frequency domain rate matching duration except for the at least one guard PRB.

14. The UE of claim 13, wherein zero power sounding reference signal configuration information is received via the higher layer signaling, and
wherein the zero power sounding reference signal configuration information includes at least one of symbol information of a zero power sounding reference signal, frequency resource information of the zero power sounding reference signal, or resource type information of the zero power sounding reference signal.

15. The UE of claim 13, wherein the processor is further configured to:
- receive, from the base station, downlink control information including information indicating cancellation of transmission of a sounding reference signal; and
- cancel the transmission of the sounding reference signal at a specific time.

* * * * *